US012735009B2

United States Patent
Morita

(10) Patent No.: US 12,735,009 B2
(45) Date of Patent: Sep. 15, 2026

(54) VEHICULAR SYSTEM CONTROL METHOD AND APPARATUS

(71) Applicants: DENSO CORPORATION, Kariya-city (JP); TOYOTA JIDOSHA KABUSHIKI KAISHA, Toyota (JP); J-QuAD DYNAMICS Inc., Tokyo (JP)

(72) Inventor: Karin Morita, Tokyo (JP)

(73) Assignees: DENSO CORPORATION, Kariya-city (JP); TOYOTA JIDOSHA KABUSHIKI KAISHA, Toyota (JP); J-QUAD DYNAMICS Inc., Tokyo (JP)

( * ) Notice: Subject to any disclaimer, the term of this patent is extended or adjusted under 35 U.S.C. 154(b) by 33 days.

(21) Appl. No.: 18/920,559

(22) Filed: Oct. 18, 2024

(65) Prior Publication Data

US 2025/0128687 A1 Apr. 24, 2025

(30) Foreign Application Priority Data

Oct. 19, 2023 (JP) ................................ 2023-180326

(51) Int. Cl.
*B60T 8/58* (2006.01)
*B60Q 9/00* (2006.01)
(Continued)

(52) U.S. Cl.
CPC ................ *B60T 8/58* (2013.01); *B60Q 9/008* (2013.01); *B60T 7/22* (2013.01); *B60T 8/171* (2013.01);
(Continued)

(58) Field of Classification Search
CPC ............. G08G 1/166; B60T 2201/022; B60T 2201/03; B60T 2210/32; B60T 7/22;
(Continued)

(56) References Cited

U.S. PATENT DOCUMENTS 10,967,789 B2 * 4/2021 Katou .................... B60Q 9/008
11,618,382 B2 * 4/2023 Kakeshita ......... B60W 30/0956 340/905
(Continued)

FOREIGN PATENT DOCUMENTS

JP 2015-137047 A 7/2015
JP 2016-080539 A 5/2016
(Continued)

*Primary Examiner* — Carl C Staubach
(74) *Attorney, Agent, or Firm* — Precision Patents, P.C.

(57) ABSTRACT

In a control apparatus, upon determination that an obstacle has a collision possibility, an operation determiner determines to instruct a notification system to issue, to an occupant, a notification related to the collision possibility with the obstacle. The operation determiner determines whether a collision-avoidance operation has been carried out by the occupant since the issuance of the notification. The operation determiner determines not to instruct the vehicle motion control system to execute a collision-avoidance assistance operation upon determination that (i) no collision-avoidance operations have been carried out by the occupant since the issuance of the notification and (ii) the obstacle having the collision possibility is a low-height object, the low-height object being defined as an object that has fallen on a road and has a height that is sufficiently low that the vehicle is enabled to pass over the obstacle.

12 Claims, 32 Drawing Sheets

(51) Int. Cl.
*B60T 7/22* (2006.01)
*B60T 8/171* (2006.01)
*B60T 8/172* (2006.01)
*G08G 1/16* (2006.01)

(52) U.S. Cl.
CPC .............. *B60T 8/172* (2013.01); *G08G 1/166* (2013.01); *B60T 2201/022* (2013.01); *B60T 2201/03* (2013.01); *B60T 2210/32* (2013.01)

(58) Field of Classification Search
CPC . B60T 8/171; B60T 8/172; B60T 8/58; B60Q 9/008
See application file for complete search history.

(56) References Cited

U.S. PATENT DOCUMENTS

| | | | | |
|---|---|---|---|---|
| 12,071,128 | B2 * | 8/2024 | Okano | B60W 40/04 |
| 12,427,982 | B2 * | 9/2025 | Yoshikawa | B60W 50/14 |
| 2015/0307091 | A1 * | 10/2015 | Gokan | G01S 7/539 701/70 |
| 2019/0325595 | A1 | 10/2019 | Stein et al. | |
| 2020/0180507 | A1 * | 6/2020 | Katou | G08G 1/163 |
| 2020/0265247 | A1 | 8/2020 | Musk et al. | |
| 2022/0234653 | A1 * | 7/2022 | Kakeshita | B62D 15/0265 |
| 2022/0332349 | A1 | 10/2022 | Benou et al. | |
| 2023/0192192 | A1 * | 6/2023 | Morita | B60W 30/09 |
| 2025/0111683 | A1 * | 4/2025 | Nabatame | G06V 20/586 |
| 2025/0171038 | A1 * | 5/2025 | Ishida | B60W 60/0015 |
| 2025/0304049 | A1 * | 10/2025 | Takahashi | B60W 30/09 |

FOREIGN PATENT DOCUMENTS

| | | | |
|---|---|---|---|
| JP | 2019-002701 | A | 1/2019 |
| WO | 2019/202397 | A2 | 10/2019 |
| WO | 2021/0095354 | A1 | 5/2021 |
| WO | 2021/138619 | A2 | 8/2021 |

* cited by examiner

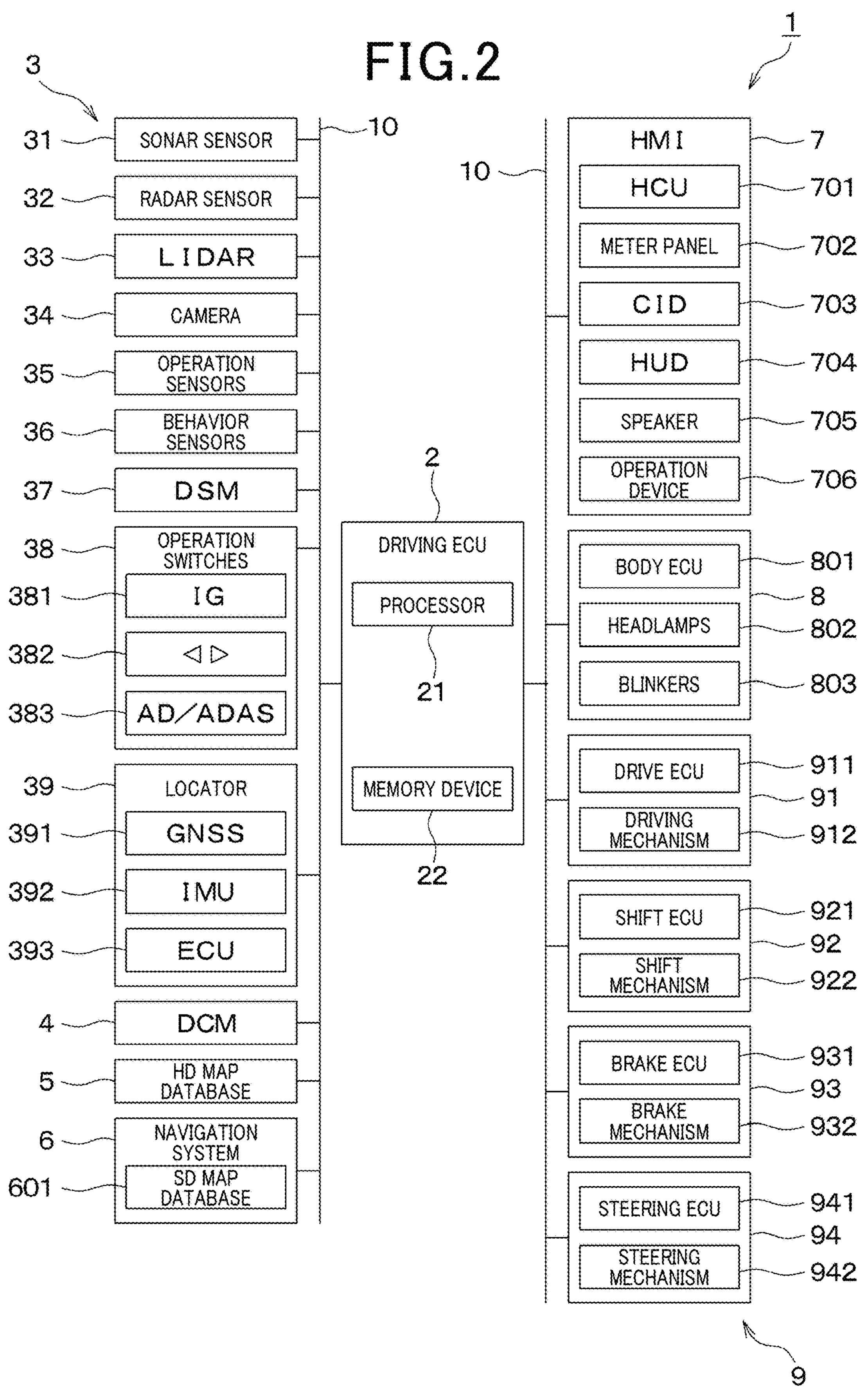
FIG.2
1
3
31
SONAR SENSOR
32
RADAR SENSOR
33
LIDAR
34
CAMERA
35
OPERATION SENSORS
36
BEHAVIOR SENSORS
37
DSM
38
OPERATION SWITCHES
381
IG
382
◁ ▷
383
AD/ADAS
39
LOCATOR
391
GNSS
392
IMU
393
ECU
4
DCM
5
HD MAP DATABASE
6
NAVIGATION SYSTEM
601
SD MAP DATABASE
10
2
DRIVING ECU
PROCESSOR
21
MEMORY DEVICE
22
HMI
7
HCU
701
METER PANEL
702
CID
703
HUD
704
SPEAKER
705
OPERATION DEVICE
706
BODY ECU
801
8
HEADLAMPS
802
BLINKERS
803
DRIVE ECU
911
91
DRIVING MECHANISM
912
SHIFT ECU
921
92
SHIFT MECHANISM
922
BRAKE ECU
931
93
BRAKE MECHANISM
932
STEERING ECU
941
94
STEERING MECHANISM
942
9

LNc
B15
B432
B14
B43
LNm, LNp
Rd
B13
LNs
B431

FIG.27

| TRAFFIC SIGN | | | MEANING |
|---|---|---|---|
| JAPAN | EUROPE | UNITED STATES | |
| | | DO NOT ENTER | DO NOT ENTER |
| 止まれ STOP | STOP | STOP | STOP |
| 50 | 50 | SPEED LIMIT 50 | MAXIMUM SPEED LIMIT |
| | | R R | RAILROAD CROSSING CAUTION |
| | | | NO RIGHT TURN |
| | | | GO ONLY IN DIRECTION OF ARROW (NO RIGHT TURN) |
| ⋮ | | | ⋮ |

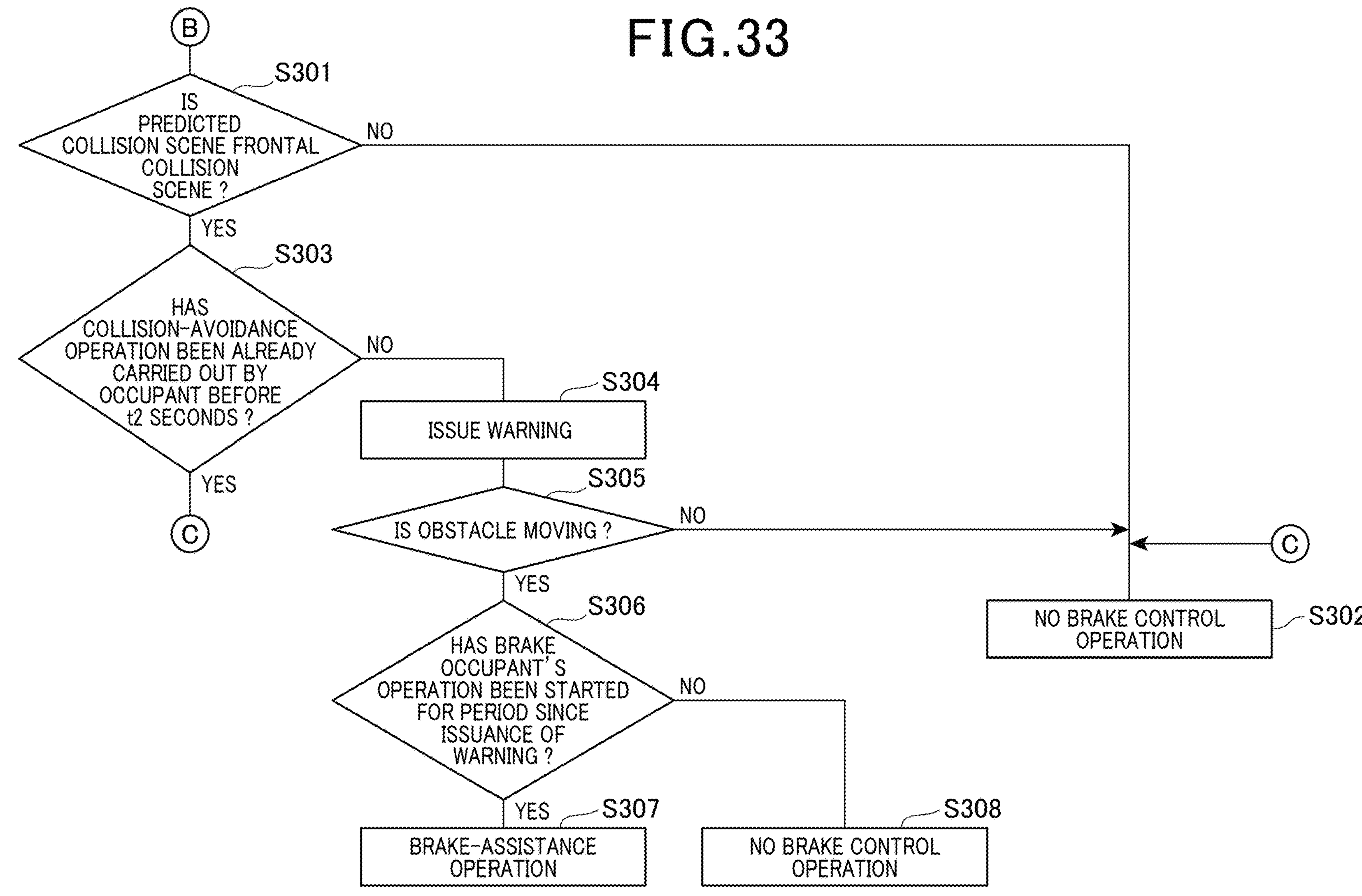
FIG.33
B
S301
IS PREDICTED COLLISION SCENE FRONTAL COLLISION SCENE ?
NO
YES
S303
HAS COLLISION-AVOIDANCE OPERATION BEEN ALREADY CARRIED OUT BY OCCUPANT BEFORE t2 SECONDS ?
NO
YES
C
S304
ISSUE WARNING
S305
IS OBSTACLE MOVING ?
NO
YES
C
S302
NO BRAKE CONTROL OPERATION
S306
HAS BRAKE OCCUPANT'S OPERATION BEEN STARTED FOR PERIOD SINCE ISSUANCE OF WARNING ?
NO
YES
S307
BRAKE-ASSISTANCE OPERATION
S308
NO BRAKE CONTROL OPERATION

FIG.36A

| HEIGHT | COLLISION-AVOIDANCE ASSISTANCE OPERATION |
|---|---|
| ~h1 | DO NOT EXECUTE COLLISION-AVOIDANCE ASSISTANCE OPERATION |
| h1~h2 | DEPEND ON OCCUPANT'S OPERATION |
| h2~ | EXECUTE COLLISION-AVOIDANCE ASSISTANCE OPERATION |

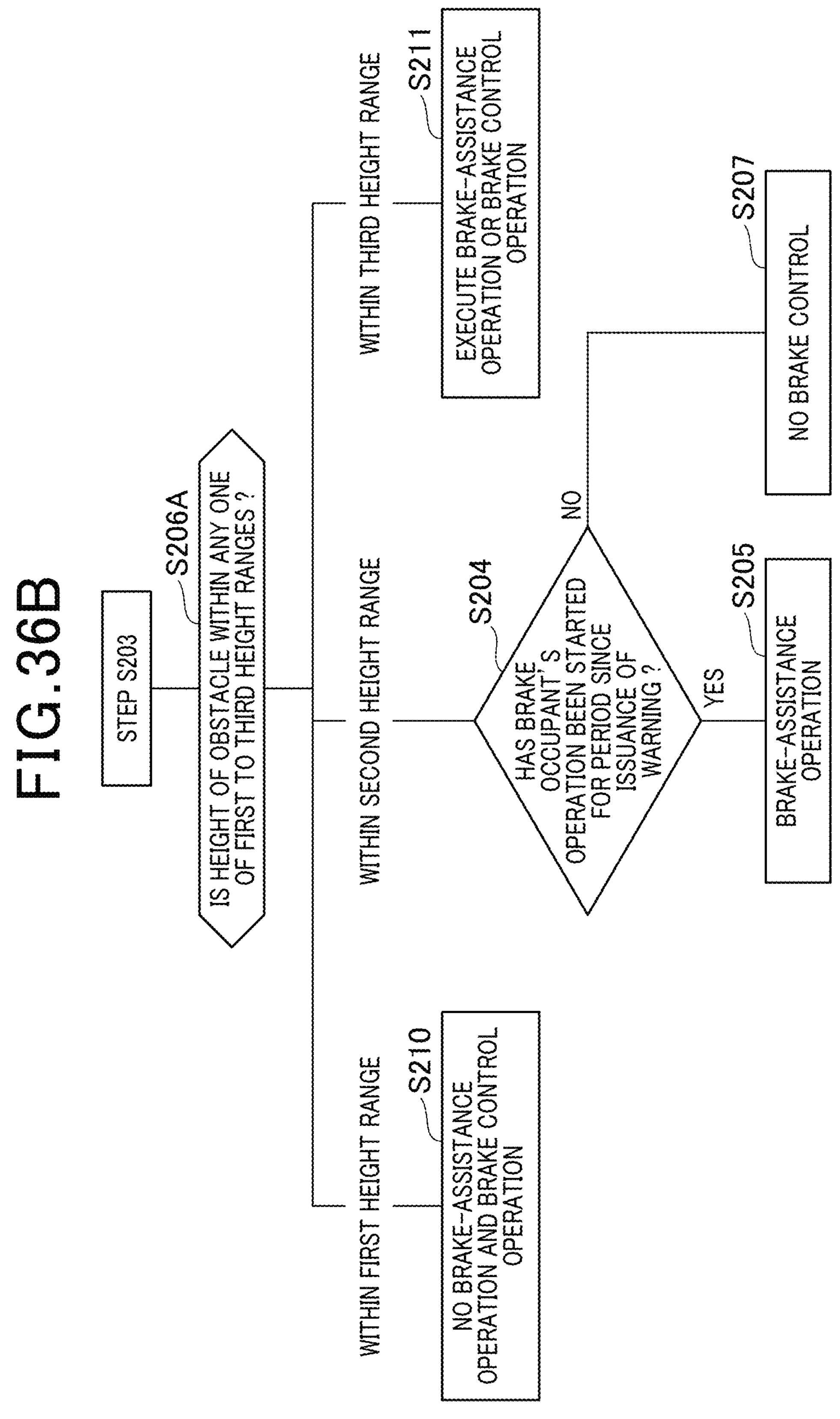
FIG.36B
STEP S203
S206A
IS HEIGHT OF OBSTACLE WITHIN ANY ONE OF FIRST TO THIRD HEIGHT RANGES ?
WITHIN FIRST HEIGHT RANGE
WITHIN SECOND HEIGHT RANGE
WITHIN THIRD HEIGHT RANGE
S210
NO BRAKE-ASSISTANCE OPERATION AND BRAKE CONTROL OPERATION
S204
HAS BRAKE OCCUPANT'S OPERATION BEEN STARTED FOR PERIOD SINCE ISSUANCE OF WARNING ?
YES
NO
S205
BRAKE-ASSISTANCE OPERATION
S207
NO BRAKE CONTROL
S211
EXECUTE BRAKE-ASSISTANCE OPERATION OR BRAKE CONTROL OPERATION

FIG.37A

| DETECTION STATE OF SENSOR | | GROUND SPEED | TYPE OF OBSTACLE | | | | DRIVING-CONTROL TASK | CONTROL TIMING | SCENE |
|---|---|---|---|---|---|---|---|---|---|
| RADAR | CAMERA | | VEHICLE | STRUCTURE | ON-ROAD FALLEN OBJECT | UNKNOWN | | | |
| ○ | ○ | LOW-HIGH | ○ | ○ | — | — | WARNING AND AUTONOMOUS BRAKING | STANDARD TIMING | FRONTAL COLLISION SCENE, TRAVERSING SCENE, RIGHT-TURN COLLISION SCENE, etc. |
| △ | ○ | | | | | | | | |
| ○ | △ | | | | | | | | |
| ○ | ○ | LOW-HIGH | — | — | ○ | — | WARNING AND BRAKE ASSISTANCE OPERATION | STANDARD TIMING | FRONTAL COLLISION SCENE |
| △ | ○ | | | | | | | | |
| ○ | △ | | | | | | | | |
| ○ | — | LOW | — | — | — | ○ | WARNING ONLY | DELAY TIMING | FRONTAL COLLISION SCENE |
| ○ | — | MIDDLE-HIGH | — | — | — | ○ | WARNING AND AUTONOMOUS BRAKING | DELAY TIMING | FRONTAL COLLISION SCENE |
| — | ○ | LOW-HIGH | ○ | ○ | — | — | WARNING AND AUTONOMOUS BRAKING | STANDARD TIMING | FRONTAL COLLISION SCENE, RIGHT-TURN COLLISION SCENE, etc. |
| — | ○ | LOW-HIGH | — | — | ○ | — | WARNING AND BRAKE ASSISTANCE OPERATION | STANDARD TIMING | FRONTAL COLLISION SCENE |

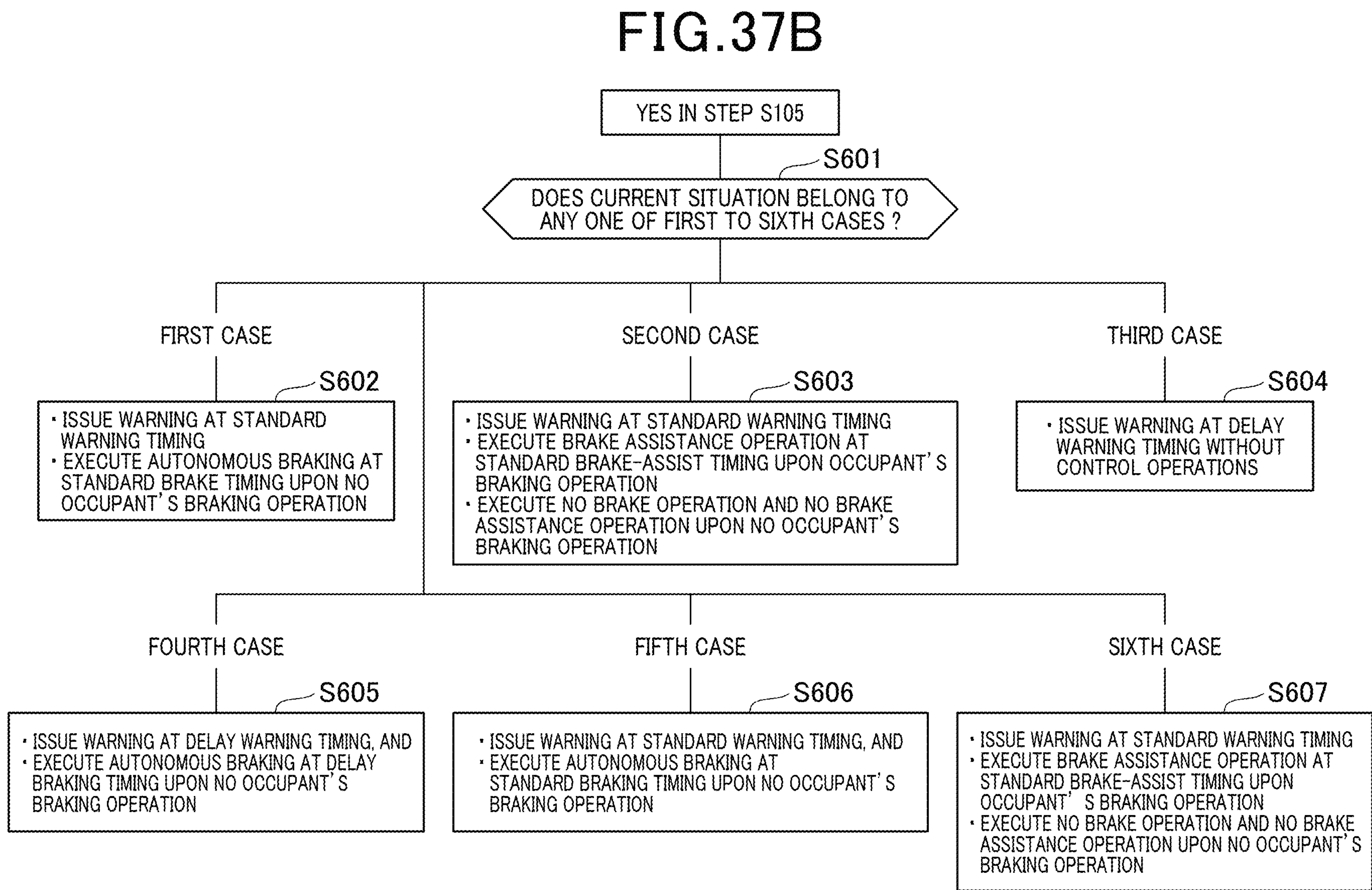
FIG.37B
YES IN STEP S105
S601
DOES CURRENT SITUATION BELONG TO ANY ONE OF FIRST TO SIXTH CASES ?
FIRST CASE
S602
· ISSUE WARNING AT STANDARD WARNING TIMING
· EXECUTE AUTONOMOUS BRAKING AT STANDARD BRAKE TIMING UPON NO OCCUPANT'S BRAKING OPERATION
SECOND CASE
S603
· ISSUE WARNING AT STANDARD WARNING TIMING
· EXECUTE BRAKE ASSISTANCE OPERATION AT STANDARD BRAKE-ASSIST TIMING UPON OCCUPANT'S BRAKING OPERATION
· EXECUTE NO BRAKE OPERATION AND NO BRAKE ASSISTANCE OPERATION UPON NO OCCUPANT'S BRAKING OPERATION
THIRD CASE
S604
· ISSUE WARNING AT DELAY WARNING TIMING WITHOUT CONTROL OPERATIONS
FOURTH CASE
S605
· ISSUE WARNING AT DELAY WARNING TIMING, AND
· EXECUTE AUTONOMOUS BRAKING AT DELAY BRAKING TIMING UPON NO OCCUPANT'S BRAKING OPERATION
FIFTH CASE
S606
· ISSUE WARNING AT STANDARD WARNING TIMING, AND
· EXECUTE AUTONOMOUS BRAKING AT STANDARD BRAKING TIMING UPON NO OCCUPANT'S BRAKING OPERATION
SIXTH CASE
S607
· ISSUE WARNING AT STANDARD WARNING TIMING
· EXECUTE BRAKE ASSISTANCE OPERATION AT STANDARD BRAKE-ASSIST TIMING UPON OCCUPANT' S BRAKING OPERATION
· EXECUTE NO BRAKE OPERATION AND NO BRAKE ASSISTANCE OPERATION UPON NO OCCUPANT'S BRAKING OPERATION

VEHICULAR SYSTEM CONTROL METHOD AND APPARATUS

CROSS REFERENCE TO RELATED APPLICATION

This application is based on and claims the benefit of priority from Japanese Patent Application No. 2023-180326 filed on Oct. 19, 2023, the disclosure of which is incorporated in its entirety herein by reference.

TECHNICAL FIELD

The present disclosure relates to vehicular system control methods and apparatuses.

BACKGROUND

Research and development for drive assist technologies and/or autonomous driving technologies has been proceeding actively. Various types of proposals related to the drive assist technologies and/or autonomous driving technologies have been carried out, one of which is disclosed in International Patent Publication WO 2019/202397.

Drive assist technologies aim to reduce driver's load to enable drivers to drive vehicles comfortably and safely. These drive assist technologies include, for example, technologies related to following distance control, lane keeping assist control, lane-change assist control, parking assist control, obstacle warning, collision-avoidance assist control, or other vehicle-control technologies. These autonomous driving technologies aim to cause vehicles to automatically, i.e., autonomously, travel without the need of driver's driving operations. Various sensing devices, such as cameras and/or radar devices, are installed in a vehicle with such drive assist technologies and/or drive assist technologies. The various sensing devices are configured to detect surrounding situations around the vehicle. Autonomous control operations, such as autonomous steering, autonomous driving, and/or autonomous braking, of a traveling autonomous vehicle are carried out based on, for example, the surrounding situations detected by the sensing devices and/or map information indicative of a visual representation of a region around the current location of the autonomous vehicle. In particular, the autonomous control operations of a traveling autonomous vehicle can be carried out using high-accuracy map information including road data of each lane around the autonomous vehicle, making it possible to improve the safety and reliability of the autonomous control operations of the traveling autonomous vehicle.

SUMMARY

Research and development for these autonomous driving technologies and drive assist technologies has been accelerating recently in view of accuracy improvement of object detection and/or object recognition by sensing devices and improvement of user's convenience. That is, a further improvement of these autonomous driving technologies and drive assist technologies enables the earlier and wider spread of advanced driving assistance vehicles and/or autonomous driving vehicles.

In view of the above circumstances, the present disclosure provides a control apparatus for controlling a vehicular system installed in a vehicle. The control apparatus includes a recognizing unit configured to recognize an obstacle located around the vehicle. The control apparatus includes an operation determiner configured to determine whether the obstacle has a collision possibility that the obstacle is likely to collide with the vehicle. The operation determiner is configured to determine, in response to determination that the obstacle is likely to collide with the vehicle, to instruct a notification system installed in the vehicular system to issue, to at least one occupant of the vehicle, a notification related to the collision possibility with the obstacle in at least one of a visible format and an audible format. The operation determiner is configured to determine whether at least one collision-avoidance operation has been carried out by the at least one occupant since an issuance of the notification related to the collision possibility. The operation determiner is configured to determine not to instruct the vehicle motion control system to execute a collision-avoidance assistance operation upon determination that (i) no collision-avoidance operations have been carried out by the at least one occupant since the issuance of the notification related to the collision possibility, and (ii) the obstacle having the collision possibility is a low-height object, the low-height object being defined as an object that has fallen on a road and has a height that is sufficiently low that the vehicle is enabled to pass over the obstacle.

In view of the above circumstances, the present disclosure provides a method of controlling a vehicular system installed in a vehicle. The method includes detecting an obstacle located around the vehicle, determining whether the obstacle has a collision possibility that the obstacle is likely to collide with the vehicle, and determining, in response to determination that the obstacle has the collision possibility, to instruct a notification system installed in the vehicular system to issue, to at least one occupant of the vehicle, a notification related to the collision possibility with the obstacle in at least one of a visible format and an audible format. The method determines whether at least one collision-avoidance operation has been carried out by the at least one occupant since an issuance of the notification related to the collision possibility. The method executes a collision-avoidance assistance determination of whether to instruct a vehicle motion control system installed in the vehicular system to execute a collision-avoidance assistance operation. The executing determines not to execute the collision-avoidance assistance operation upon determination that (i) no collision-avoidance operations have been carried out by the at least one occupant since the issuance of the notification related to the collision possibility, and (ii) the obstacle having the collision possibility is a low-height object, the low-height object being defined as an object that has fallen on a road and has a height that is sufficiently low that the vehicle is enabled to pass over the obstacle.

In view of the above circumstances, the present disclosure provides a non-transitory storage medium readable by a processor for controlling a vehicular system installed in a vehicle. The non-transitory storage medium includes control program instructions that cause the processor to detect an obstacle located around the vehicle, determine whether the obstacle has a collision possibility that the obstacle is likely to collide with the vehicle, and determine, in response to determination that the obstacle has the collision possibility, to instruct a notification system installed in the vehicular system to issue, to at least one occupant of the vehicle, a notification related to the collision possibility with the obstacle in at least one of a visible format and an audible format. The control program instructions cause the processor to determine whether at least one collision-avoidance operation has been carried out by the at least one occupant since the issuance of the notification related to the collision possibility, and determine not to cause a vehicle motion control system installed in the vehicular system to instruct a collision-avoidance assistance operation upon determination that (i) no collision-avoidance operations have been carried out by the at least one occupant since the issuance of the notification related to the collision possibility, and (ii) the obstacle having the collision possibility is a low-height object, the low-height object being defined as an object that has fallen on a road and has a height that is sufficiently low that the vehicle is enabled to pass over the obstacle.

Note that each parenthesized reference character assigned to a corresponding element in the present disclosure merely represents an example of a relationship between the corresponding element and a corresponding specific element described in an exemplary embodiment described later, and therefore the present disclosure is not limited to the parenthesized reference characters.

BRIEF DESCRIPTION OF THE DRAWINGS

Other aspects of the present disclosure will become apparent from the following description of embodiments with reference to the accompanying drawings in which:

FIG. 2 is a schematic block diagram illustrating an overall structure of the vehicular system illustrated in FIG. 1;

FIG. 27 is a diagram schematically illustrating traffic signs as an eight example of target objects;

FIGS. 31, 32, and 33 are a combination flowchart schematically illustrating a vehicle control routine according to a first specific functional configuration of the present embodiment;

FIG. 36A is a diagram schematically illustrating table-like information according to a fourth specific functional configuration of the present embodiment;

FIG. 36B is a flowchart schematically illustrating a part of a vehicle control routine according to the fourth specific functional configuration of the present embodiment;

FIG. 37A is a diagram schematically illustrating table-like information according to a fifth specific functional configuration of the present embodiment; and FIG. 37B is a flowchart schematically illustrating a part of a vehicle control routine according to the fifth specific functional configuration of the present embodiment.

DETAILED DESCRIPTION OF EMBODIMENTS

Figure 1:
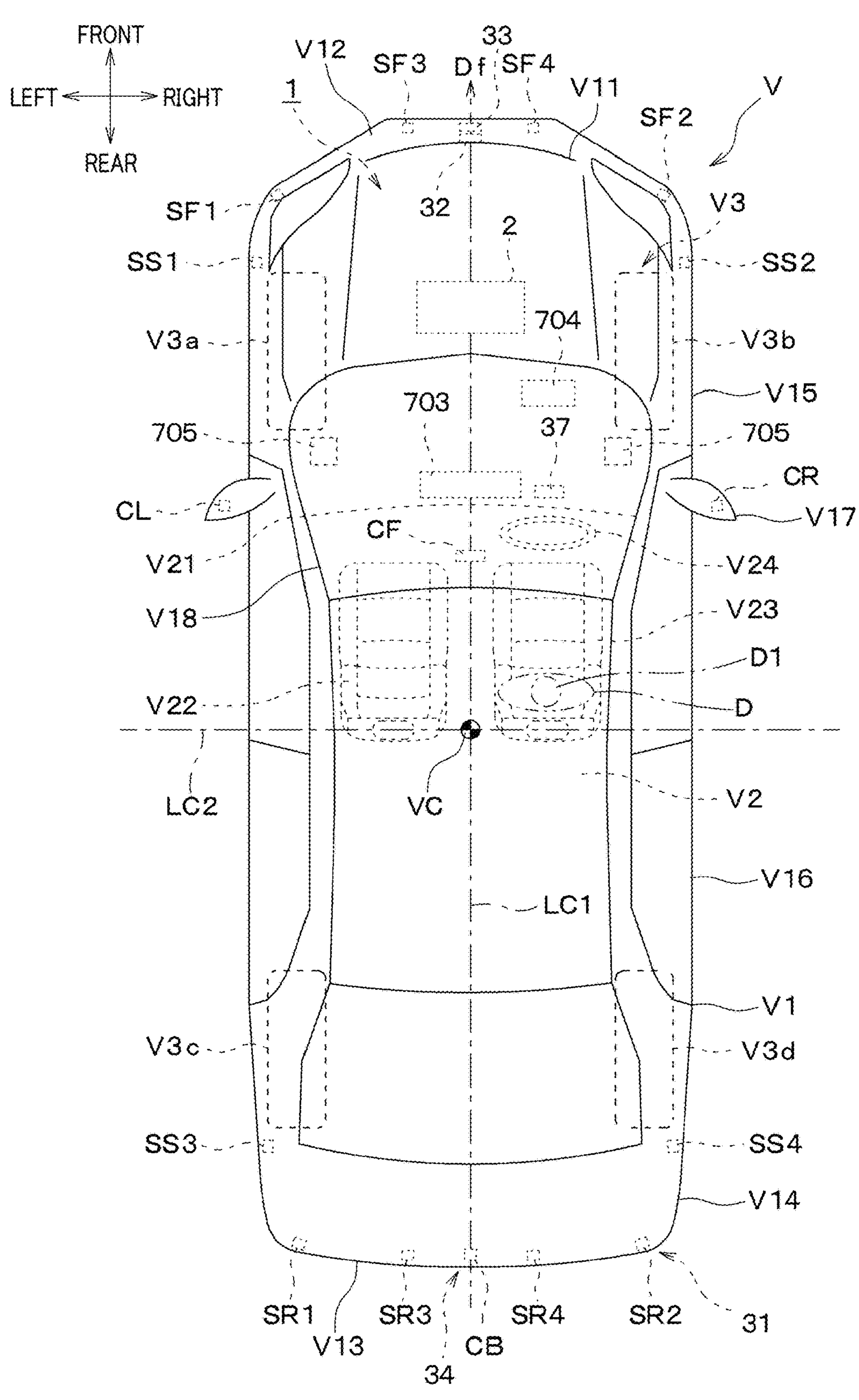
FIG. 1 is a plan view schematically illustrating a vehicle in which a vehicular system including a driving ECU serving as a control apparatus according to an exemplary embodiment.

The following describes an exemplary embodiment and its modifications of the present disclosure with reference to the accompanying drawings. Configurations, functions, and/or examples descried in the following exemplary embodiment and its modifications can be freely modified. In the exemplary embodiment, the specific examples, and their modifications, same reference characters are assigned to equivalent or same components among the exemplary embodiment and its modification. Among the equivalent or same components, descriptions of the former component can be directly used to describe the later component(s) as long as there are no technological contradictions and/or no additional descriptions.

Overall Configuration of Vehicle

FIG. 1 illustrates a system-installed vehicle V according to the exemplary embodiment to which the present disclosure is applied. The system-installed vehicle V is a four-wheel motor vehicle. The system-installed vehicle V has a body V1 having a substantially rectangular shape in plan view. The body, i.e., the vehicle body, V1 has a first center line LC1 defined as a virtual line that passes through a center point VC of the vehicle V and extends in the front-rear direction, i.e., the longitudinal direction, of the system-installed vehicle V. The system-installed vehicle V has a second center line LC2 defined as a virtual line that passes through the vehicle center point VC and extends in the left-right direction, i.e., the width direction, of the system-installed vehicle V. The center point VC of the system-installed vehicle V is defined as a three-dimensional center point of the vehicle body V1.

In FIG. 1, the width direction of the system-installed vehicle V, which will be referred to as a vehicle width direction, corresponds to the horizontal direction therein, a vehicle height direction is defined as a height direction of the system-installed vehicle V, and is parallel to the direction of gravity of the system-installed vehicle V while the system-installed vehicle V is mounted movably and stably on the plane of horizon. The longitudinal direction of the system-installed vehicle V, which will be referred to as a vehicle longitudinal direction, is defined to be perpendicular to both the vehicle width direction and the vehicle height direction.

In the system-installed vehicle V, a front direction, a rear direction, a left direction, and a right direction are defined as illustrated in FIG. 1. That is, the vehicle longitudinal direction is synonymous with the front-rear direction, and the vehicle width direction is synonymous with the left-right direction. The vehicle height direction may be not parallel to the direction of gravity of the system-installed vehicle V depending on the situation where the system-installed vehicle V is mounted on any road and/or the conditions in which the system-installed vehicle V is traveling. The vehicle height direction is usually parallel to the direction of gravity of the system-installed vehicle V.

The vehicle body V1 has defined thereinside an interior V2 serving as a compartment of one or more occupants including a driver of the system-installed vehicle V.

The body V1 has a front-end portion, a rear-end portion, a left-side portion, a right-side portion, a top portion, and four corners that include a front-left corner, a front-right corner, a rear-left corner, and a rear-right corner.

The vehicle V includes four wheels V3, i.e., four wheels V3*a*, V3*b*, V3*c*, and V3*d*, mounted to the respective four corners of the body V1. Specifically, the wheel V3*a*, i.e., the front-left wheel V3*a*, is mounted to the front-left corner of the body V1, the wheel V3*b*, i.e., the front-right vehicle V3*b*, is mounted to the front-right corner of the body V1, the wheel V3*c*, i.e., the rear-left wheel V3*c*, is mounted to the rear-left corner of the body V1, and the wheel V3*d*, i.e., the rear-right vehicle V3*d*, is mounted to the rear-right corner of the body V1. The system-installed vehicle V is not limited to such a four-wheel motor vehicle, and a three-wheel motor vehicle or a six- or an eight-wheel vehicle, such as a cargo truck, can be used as the system-installed vehicle V. The number of driving wheels in the wheels of the system-installed vehicle V can be freely determined, and each driving wheel can be freely located to the body V1 of the system-installed vehicle V.

The system-installed vehicle V includes a front bumper V12 mounted to the front end portion, i.e., a front side, V11 of the body V1. The system-installed vehicle V includes a rear bumper V14 mounted to the rear end portion, i.e., a rear side, V13 of the body V1. The body V1 of the system-installed vehicle V includes a body panel V15 arranged to constitute the left- and right-side portions and the top portion of the body V1. The body panel V15 includes door panels V16. In the exemplary embodiment illustrated in FIG. 1, the body panel V15 includes a front pair of left and right door panels V16 and a rear pair of left and right door panels V16; the left door panels V16 of the front and right pairs are located at the left-side portion of the body V1, and the right door panels V16 of the front and right pairs are located at the right-side portion of the body V1. The system-installed vehicle V includes a pair of door mirrors V17 mounted to the respective left and right doors V16 of the front pair. The body V1 includes a front windshield V18 that covers a front side of the interior V2.

The front windshield V18 has a substantially plate-like shape, and is made of translucent glass or translucent synthetic resin. The front windshield V18 is attached to the body panel V15, and is inclined such that a bottom of the front windshield V18 is located to be closer to the front of the body V1 than a top of the front windshield V18 is when viewed in a side view in parallel to the vehicle width direction.

The system-installed vehicle V includes a dashboard V21 and a plurality of seats V22 that include a driver's seat V23 on which a driver D sits. The dashboard V21 is provided in a front portion of the interior V2, and the seats V22 are located at the rear of the dashboard V21. The system-installed vehicle V includes a steering wheel V24 located in front of the driver's seat V23. The driver D grasps the steering wheel V24 and steers the steering wheel V24 to thereby control the steering of the system-installed vehicle V. The steering wheel V24 typically has a substantially ring shape, a substantially ellipsoidal shape, or a substantially polygonal-ring shape, but can have a bar-like shape or a control-stick shape.

Overall Configuration of Vehicular System

The system-installed vehicle V includes a vehicular system 1 installed therein. The vehicular system 1, which is installed in the system-installed vehicle V, is configured to serve as a driving automation system or an autonomous driving system in the system-installed vehicle V. The system-installed vehicle V will also be referred to as an own vehicle V. The autonomous driving system is configured to implement one of levels 1 to 5 included in all the six autonomous driving levels (0 to 5 levels) defined in SAE J2016 standard opened by SAE international; SAE is an abbreviation for "Society of Automotive Engineers". Any level X in the autonomous driving levels 0 to 5 will also be referred to as an SOE level X. That is, the variable X can take any one of 0, 1, 2, 3, 4, and 5. The higher the SOE level X, the higher the driving automation level. In other words, the greater the number of dynamic driving tasks that the driving system carries out, the higher the autonomous driving level. When the autonomous driving level is changed to be higher, the autonomous driving level increases. In contrast, the lower the SOE level X, the lower the autonomous driving level. In other words, the smaller the number of dynamic driving tasks that the autonomous driving system carries out, the lower the autonomous driving level. When the autonomous driving level is changed to be lower, the autonomous driving level decreases.

Definition of Driving Assist and Autonomous Driving

The SAE levels 0 to 5 will be specifically described below.

Hereinafter, the driver D is an occupant who manages and carries out dynamic driving tasks. The dynamic driving tasks show all operational functions and all maneuver functions that need be carried out in real time by the driver D when the driver D drives the own vehicle V in traffic roads except for strategical functions. Overall driving actions can be categorized into the operational functions, maneuver functions, and strategical functions.

The strategical functions may include functions of planning a travel schedule and selecting one or more places through the planned travel schedule. Specifically, the strategical functions may include functions of determining or selecting a travel schedule that shows (i) whether to go to a destination, (ii) when to go to the destination, and (iii) how to go to the destination.

The maneuver functions may include functions of determining, in various traffic situations, various maneuvers that may include, during the scheduled travel, (i) determining, during the scheduled travel, whether and when to overtake, (ii) determining whether and when to make a lane change, (iii) selectively setting a proper speed of the own vehicle V, and (iv) checking the mirrors.

The operational functions may include driver's instantaneous reactions, such as steering operations, braking operations, accelerating operations, and/or minor adjustments of these operations, in order to keep a position of the own vehicle V in a corresponding lane of a road and/or avoid at least one obstacle and/or at least one danger event on the path of the moving own vehicle V. OEDR is an abbreviation for "Object and Event Detection and Response", and can be called "detection and response of objects and events". OEDR includes the monitoring of driving environment around the own vehicle V. The monitoring of the driving environment around the own vehicle V may include detection, recognition, and classification of one or more objects and/or events. The monitoring of the driving environment around the own vehicle V may additionally include preparation of response for the one or more objects and/or events. Operational Design Domain (ODD) conditions, which will also be called "specific domain conditions", represent specific conditions under which a given autonomous driving system or feature thereof is designed to function. The ODD conditions may include, for example, at least one of a plurality of limiting conditions including, for example, geographic conditions, environmental conditions, velocity conditions, and time conditions.

Level 0 represents No Autonomous driving, which represents that the driver D performs all the dynamic driving tasks.

Level 1 represents Driving Assistance, which represents that an autonomous driving system sustainably executes, under specific ODD conditions, either the lateral vehicle motion control subtasks or the longitudinal vehicle motion control subtasks of the dynamic driving tasks. The longitudinal vehicle motion control subtasks include, for example, forward/backward operation, acceleration/deceleration operation, and stop operation. The lateral vehicle motion control tasks include, for example, steering operation. In particular, the autonomous driving system is configured not to perform both the lateral vehicle motion control subtasks and the longitudinal vehicle motion control subtasks.

Level 2 represents Partial Autonomous driving or Advanced Driving assistance, which represents that an autonomous driving system sustainably executes, under specific ODD conditions, both the lateral vehicle motion control subtasks and the longitudinal vehicle motion control subtasks of the dynamic driving tasks with expectation that the driver D completes OEDR subtasks and supervises the autonomous driving system.

Level 3 represents Conditional Autonomous driving, which represents that a driving automatic system sustainably executes, under specific ODD conditions, all the dynamic driving tasks. Under the specific ODD conditions, the driver D is not required to perform one of the OEDR subtasks of monitoring the traffic environment around the own vehicle V, but, when the driving automatic system has a difficulty continuing at Level 3, the driving automatic system requests the driver D to control the own vehicle V with plenty of time, so that the driver D needs to smoothly respond to the request.

Level 4 represents High Automation, which represents that a driving automatic system sustainably executes, under specific ODD conditions, all the dynamic driving tasks. When the driving automatic system has a difficulty continuing at Level 4, the driving automatic system addresses the difficulty.

Level 5 represents Full Automation, which represents that a driving automatic system on the own vehicle V sustainably executes all the dynamic driving tasks without limitation in all the ODD conditions. When the driving automatic system has a difficulty continuing at Level 5, the driving automatic system addresses the difficulty without limitation in all the ODD conditions.

The vehicular system 1 is configured to perform various driving control tasks and various notifying tasks based on the various driving tasks during driving of the own vehicle V. Specifically, the vehicular system 1 is configured as an autonomous driving system that implements driving assistance for the own vehicle V and/or autonomous driving of the own vehicle V. The autonomous driving corresponds to each of the SAE levels 3 to 5. That is, the autonomous driving in each of the SAE levels 3 to 5 represents that the vehicular system 1 serves as the autonomous driving system to execute all the dynamic driving tasks in the corresponding one of the SAE levels 3 to 5. In contrast, the driving assistance corresponds to each of the SAE levels 1 and 2. That is, the autonomous driving in each of the SAE levels 1 and 2 represents that the vehicular system 1 serves as the autonomous driving system to execute a part of the dynamic driving tasks in the corresponding one of the SAE levels 1 and 2. That is, the driving assistance can include both the SAE level 1 of "Driver Assistance" and the SAE level 2 of "Partial Autonomous driving" or "Advanced Driving assistance" except that the expression "driving assistance of the SAE level 1" is used or the driving assistance is used to be distinguished from the partial autonomous driving of the SAE level 2.

The vehicular system 1 of the exemplary embodiment can be configured to execute (i) the autonomous driving in each of the SAE levels 3 to 5, (ii) the partial autonomous driving, i.e., advanced driving assistance, in the SAE level 2, and the driving assistance in the SAE level 1. The driving assistance that can be carried out by the vehicular system 1 of the exemplary embodiment may include hands-off driving. The hands-off driving enables the vehicular system 1 to automatically move the own vehicle V forward or backward, steer the own vehicle V, accelerate or decelerate the own vehicle V, make lane changes of the own vehicle V, and/or stop the own vehicle V as long as the driver D addresses appropriately an intervening request issued from the vehicular system 1.

The hands-off driving requests the driver D to monitor road conditions around the own vehicle V, traffic situations around the own vehicle V, and information about whether there are one or more obstacles around the own vehicle V without requesting the driver D to be in a hands-on state. The hands-on state represents a state of the driver D in which the driver D is ready to steer the own vehicle V, i.e., ready to intervene in the lateral vehicle motion control subtasks. The hands-on state typically represents a state of the driver D in which the driver D is sit on the driver's seat V23 with a posture enabling driving of the own vehicle V and is ready to operate the steering wheel V24 with his/her hands. The driver D being in the hands-on state grasps the steering wheel V24 with his/her hands. The state in which the driver D touches the steering wheel V24 with his/her hands while being ready to grasp the steering wheel V24 applies to the hands-on state. For example, the state in which the driver D is operating the steering wheel V24, i.e., the driver D is actively operating the steering wheel V24, applies to the hands-on state. The state in which the driver D holds the steering wheel V24 against the controlled steering of the steering wheel V24 by the vehicular system 1 applies to the hands-on state.

Configuration of Vehicular System

The following describes an overall configuration of the vehicular system 1 with reference to FIGS. 1 and 2.

The vehicular system 1 includes a driving electronic control unit (ECU) 2, a driving information input unit 3, a vehicular communication module, in other words, a data communication module (DCM), 4, a high-definition (HD) map database 5, a navigation system 6, a human machine interface (HMI) system 7, a lighting system 8, and a motion control system 9.

The vehicular system 1 is configured such that the driving ECU 2, the driving information input unit 3, the vehicular communication module 4, the HD map database 5, the navigation system 6, the HMI system 7, the lighting system 8, and the motion control system 9 are communicably connected to one another via vehicular communication network 10. The vehicular communication network 10 includes a main network that is in conformity with one of various communication standards, such as Controller Area Network® (INTERNATIONAL REGISTRATION NUMBER 1048262A). The vehicular communication network 10 may include, in addition to the main network being in conformity with CAN®, a subnetwork that is in conformity with Local Interconnect Network (LIN) or FlexRay.

Driving ECU

The driving ECU 2 serves as a control apparatus according to the present disclosure, which is installed in the system-installed vehicle V, and is configured to control overall operations in the vehicular system 1. The driving ECU 2 is configured as an Autonomous Driving/Advanced Driver-Assistance Systems (AD/ADAS) ECU serving as both a driving assistance controller and an autonomous driving controller. Specifically, the driving ECU 2 includes at least one processor 21 and at least one memory device 22 communicably connected to the at least one processor 21.

The at least one processor 21, which will be simply referred to as a processor 21, is comprised of a Center Processing unit (CPU) or a Micro Processing Unit (MPU). The at least one memory device 22 may include, for example, at least a Read Only Memory (ROM) and a Random Access Memory (RAM) selected from various nonvolatile memory devices, such as ROMs, RAMs, and nonvolatile rewritable recording media. Such recording media can be referred to as storage media. These nonvolatile rewritable recording media, such as flash ROMs or EEPROMs, enable information stored therein to be rewritable while being power on, and hold information unwritable while being power off. EEPROM is an abbreviation for Electronically Erasable and Programmable ROM. The ROM or at least one of the nonvolatile rewritable memory devices included in the memory device 22 stores beforehand data and program instructions used for the processor 21. The driving ECU 2 is configured to read the program instructions stored in the memory device 22 and execute the readout program instructions to accordingly perform various tasks and operations, which include own-vehicle control operations and notification operations to the occupants.

Driving Information Input Unit

The driving information input unit 3 is configured to input, to the driving ECU 2, information required for the driving ECU 2 to perform various operations and tasks. Specifically, the driving information input unit 3 may include at least one sonar sensor 31, a radar sensor 32, a laser-radar sensor (LIDAR) 33, at least one camera 34, operation sensors 35, behavior sensors 36, a driver-state monitor 37, operation switches 38, and a locator 39. The sonar sensor 31, radar sensor 32, LIDAR 33, and camera 34 will be collectively referred to as surrounding monitor sensors or ADAS sensors. The following sequentially describes the components of the driving information input unit 3.

Sonar Sensor

Figure 3:
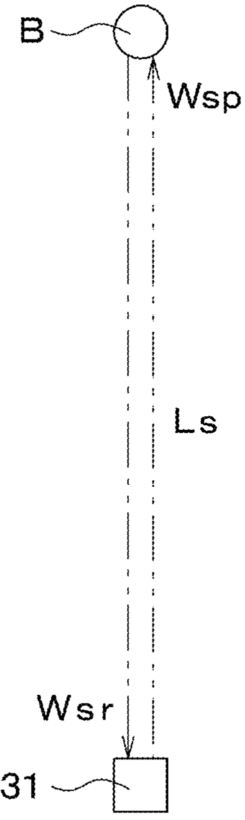
FIG. 3 is a plan view schematically illustrating target-object detection using one of sonar sensors illustrated in FIG. 2.

The at least one sonar sensor, which will be simply referred to as a sonar sensor, 31 is an ultrasonic range sensor mounted to the body V1. The sonar sensor 31 is an ultrasonic sensor, and is configured to, as illustrated in FIG. 3, emit sonar probing waves Wsp within an ultrasonic frequency band toward an external space outside the own vehicle V. The sonar sensor 31 is configured to receive sonar echoes Wsr resulting from reflection of the sonar probing waves Wsp by a target object B to accordingly detect various information about the target object B. In the specification, reference character B is assigned to any target object for the sake of convenience, but target objects to which the same reference character B are assigned may not necessarily represent the same target object.

Specifically, the sonar sensor 31 is configured to calculate a distance of the object B from the sonar sensor 31 based on Time of Flight (TOF) and the speed of sound. The TOF represents time defined from a time of emitting a sonar probing wave, i.e., pulse, Wsp to a time of receiving a sonar echo Wsr through a propagation path Ls of the pulses Wsp and Wsr; the TOF will also be therefore referred to as propagation time.

Figure 4:
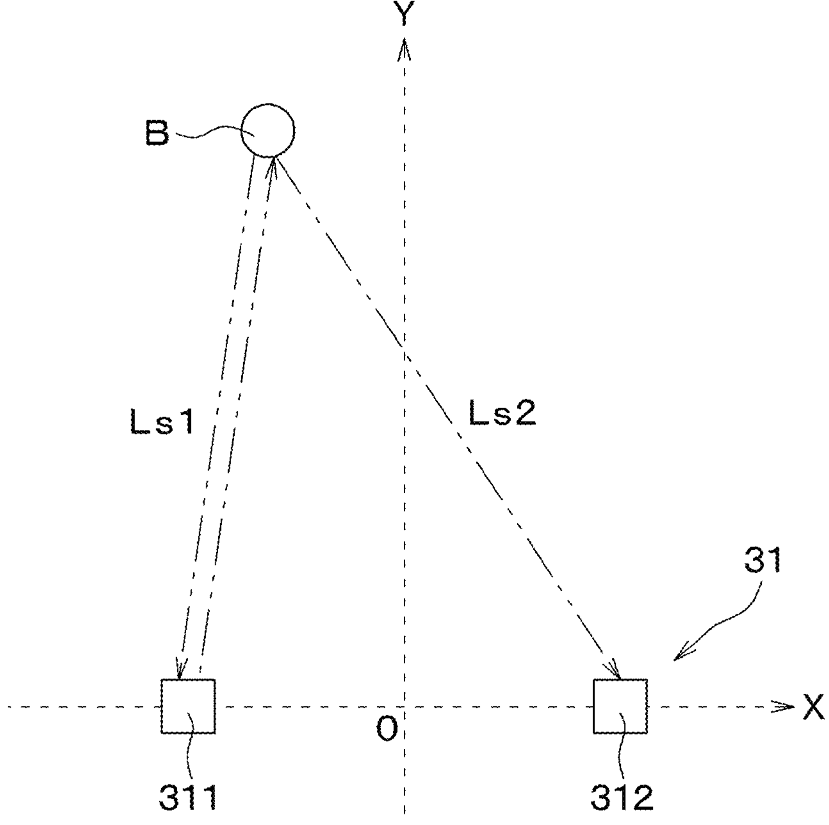
FIG. 4 is a plan view schematically illustrating target-object detection using a pair of sonar sensors illustrated in FIG. 2.

If the driving information input unit 3 includes a pair of sonar sensors 31, i.e., a pair of a first sonar sensor 311 and a second sonar sensor 312 (see FIG. 4), using a known triangulation method enables measurement of a relative distance of the target object B relative to the own vehicle V. In FIG. 4, an X axis is defined along a virtual line connecting between the first and second sonars 311 and 312, and a Y axis is defined to be perpendicular to the X axis. The X and Y axes extend along a reference horizontal plane that is perpendicular to the vehicle height direction.

The first sonar sensor 311 is configured to emit the sonar probing waves Wsp, and each of the first and second sonar sensors 311 and 312 is configured to receive the sonar echoes Wsr resulting from reflection of the sonar probing waves Wsp by the target object B. It is possible to calculate, based on a first TOF through a first propagation path Ls1 and a second TOF through a second propagation path Ls2, a position of the target object B in a two-dimensional XY coordinate system constituted by the X and Y axes. The first propagation path Ls1 is defined as a propagation path through which an ultrasonic wave (pulse) emitted as a sonar probing wave Wsp from the first sonar 311 is propagated through the target object B to be returned to the first sonar 311 as a sonar echo Wsr. Ultrasonic waves (pulses) propagated through the propagation path Ls1 will also be referred to as direct waves (pulses). The second propagation path Ls2 is defined as a propagation path through which an ultrasonic wave (pulse) emitted as a sonar probing wave Wsp from the first sonar 311 is propagated through the target object B to reach the second sonar 312 as a sonar echo Wsr. Ultrasonic waves (pulses) propagated through the propagation path Ls2 will also be referred to as indirect waves (pulses).

For example, the driving information input unit 3 according to the exemplary embodiment includes a plurality of sonar sensors 31 mounted to the body V1 (see FIG. 1). Specifically, the sonar sensors 31 include first, second, third, and fourth front sonars SF1, SF2, SF3, and SF4 mounted to the front bumper V12. Similarly, the sonar sensors 31 include first, second, third, and fourth rear sonars SR1, SR2, SR3, and SR4 mounted to the rear bumper V14. Additionally, the sonar sensors 31 include first, second, third, and fourth side sonars SS1, SS2, SS3, and SS4. The first and third side sonars SS1 and SS3 are mounted to the left side portion of the body V1, and the second and fourth side sonars SS2 and SS4 are mounted to the right side portion of the body V1.

The first to fourth front sonars SF1 to SF4, the first to fourth rear sonars SR1 to SR4, and the first to fourth side sonars SS1 to SS4 will also be collectively referred to simply as a sonar sensor 31 or sonar sensors 31 if it is unnecessary to identify any of the sonars SF1 to SS4.

Figure 5:
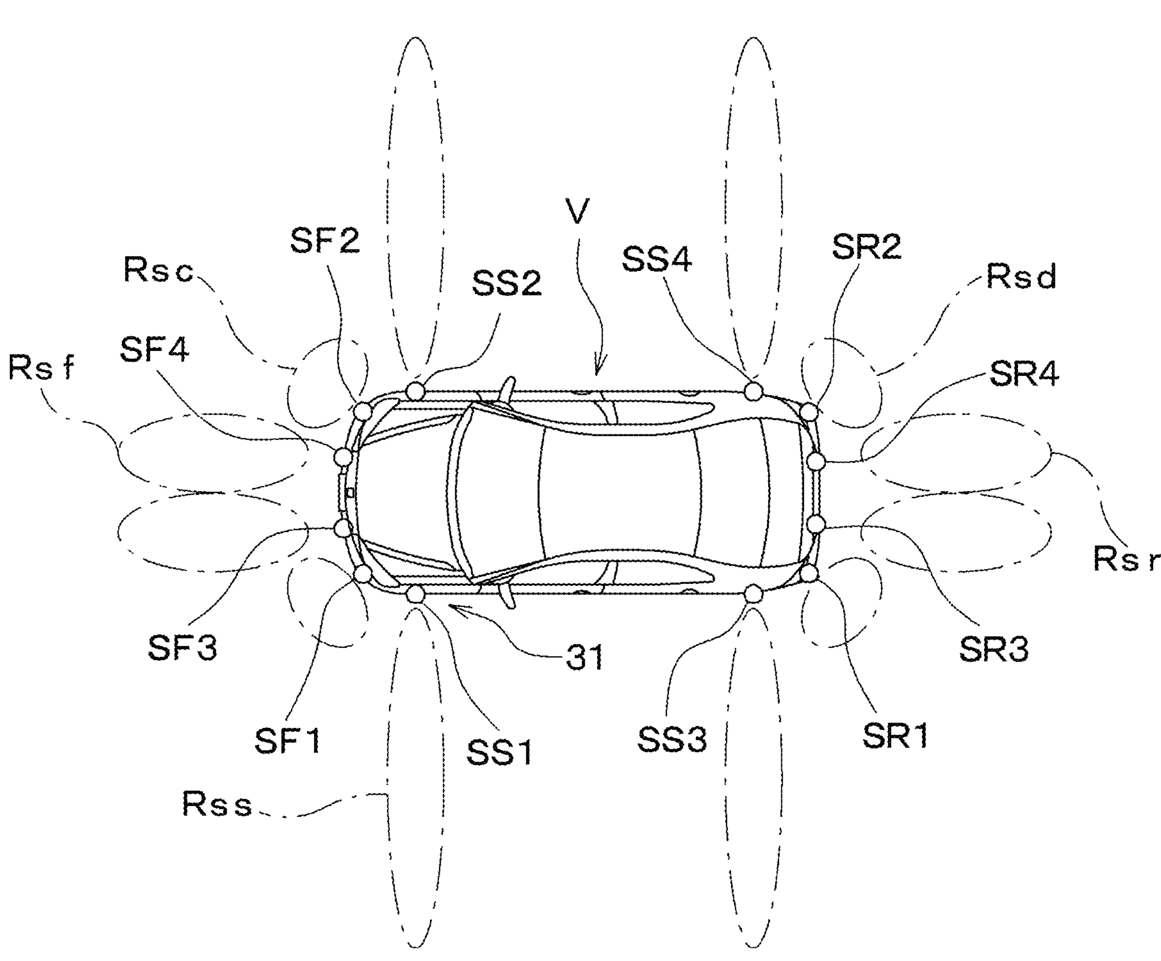
FIG. 5 is a plan view schematically illustrating target-object detection using each sonar sensor illustrated in FIG. 2.

FIG. 5 illustrates a predetermined detection region, i.e., a predetermined sensing region, of each of the sonar sensors 31.

The following sequentially describes the sonar sensors 31 with reference to FIGS. 1 and 5.

The first front sonar SF1 is mounted to a portion of the front bumper V12, which is closer to the left edge of the front bumper V12 than the right edge thereof in the vehicle width direction, and is configured to emit the sonar probing waves Wsp diagonally forward left. The second front sonar SF2 is mounted to a portion of the front bumper V12, which is closer to the right edge of the front bumper V12 than the left edge thereof in the vehicle width direction, and is configured to emit the sonar probing waves Wsp diagonally forward right. The first and second front sonars SF1 and SF2 are arranged symmetrically with respect to the first center line LC1. Each of the first and second front sonars SF1 and SF2 has a predetermined detection region Rsc, and the detection region Rsc, which will also be referred to as a front-corner detection region Rsc, of each of the first and second front sonars SF1 and SF2 is designed such that a detection range of the front-corner detection region Rsc is set to, for example, 60 cm or thereabout. The detection range of a sonar sensor 31 represents a maximum measurable range (distance) of the sonar sensor 31.

The third and fourth front sonars SF3 and SF4 are mounted to a middle portion of the front bumper V12 to be aligned in the vehicle width direction. Specifically, the third front sonar SF3 is arranged between the first front sonar SF1 and the first center line LC1, and is configured to emit the sonar probing waves Wsp substantially forward, and the fourth front sonar SF4 is arranged between the second front sonar SF2 and the first center line LC1, and is configured to emit the sonar probing waves Wsp substantially forward. The third and fourth front sonars SF3 and SF4 are arranged symmetrically with respect to the first center line LC1. Each of the third and fourth front sonars SF3 and SF4 has a predetermined detection region Rsf, and the detection region Rsf, which will also be referred to as a front detection region Rsf, of each of the third and fourth front sonars SF3 and SF4 is designed such that the detection range of the front detection region Rsf is set to, for example, 1 m or thereabout.

The first and third front sonars SF1 and SF3, which are mounted to the left side of the front bumper V12 relative to the first center line LC1, are arranged at different positions in the vehicle width direction, i.e., the horizontal direction. The first and third front sonars SF1 and SF3, which are adjacent to one another in the vehicle width direction, are arranged to have a predetermined positional relationship that enables one of the first and third front sonars SF1 and SF3 to receive, as received echoes, sonar echoes resulting from reflection of the sonar probing waves Wsp emitted from the other of the first and third front sonars SF1 and SF3 by a target object.

Specifically, the first front sonar SF1 is arranged to receive both (i) direct echoes resulting from reflection of the sonar probing waves Wsp emitted from the first front sonar SF1 by a target object, and (ii) indirect echoes resulting from reflection of the sonar probing waves Wsp emitted from the third front sonar SF3 by the target object. Similarly, the third front sonar SF3 is arranged to receive both (i) direct echoes resulting from reflection of the sonar probing waves Wsp emitted from the third front sonar SF3 by a target object, and (ii) indirect echoes resulting from reflection of the sonar probing waves Wsp emitted from the first front sonar SF1 by the target object.

Similarly, the third and fourth front sonars SF3 and SF4, which are mounted to the middle portion of the front bumper V12 in the vehicle width direction, are arranged at different positions in the vehicle width direction, i.e., the horizontal direction. The third and fourth front sonars SF3 and SF4, which are adjacent to one another in the vehicle width direction, are arranged to have a predetermined positional relationship that enables one of the third and fourth front sonars SF3 and SF4 to receive, as received echoes, sonar echoes resulting from reflection of the sonar probing waves Wsp emitted from the other of the third and fourth front sonars SF3 and SF4 by a target object.

The second and fourth front sonars SF2 and SF4, which are mounted to the right side of the front bumper V12 relative to the first center line LC1, are arranged at different positions in the vehicle width direction, i.e., the horizontal direction. The second and fourth front sonars SF2 and SF4, which are adjacent to one another in the vehicle width direction, are arranged to have a predetermined positional relationship that enables one of the second and fourth front sonars SF2 and SF4 to receive, as received echoes, sonar echoes resulting from reflection of the sonar probing waves Wsp emitted from the other of the second and fourth front sonars SF2 and SF4 by a target object.

The first rear sonar SR1 is mounted to a portion of the rear bumper V14, which is closer to the left edge of the rear bumper V14 than the right edge thereof in the vehicle width direction, and is configured to emit the sonar probing waves Wsp diagonally rearward left. The second rear sonar SR2 is mounted to a portion of the rear bumper V14, which is closer to the right edge of the rear bumper V14 than the left edge thereof in the vehicle width direction, and is configured to emit the sonar probing waves Wsp diagonally rearward right. The first and second rear sonars SR1 and SR2 are arranged symmetrically with respect to the first center line LC1. Each of the first and second rear sonars SR1 and SR2 has a predetermined detection region Rsd, and the detection region Rsd, which will also be referred to as a rear-corner detection region Rsd, of each of the first and second rear sonars SR1 and SR2 is designed such that the detection range of the rear-corner detection region Rsd is set to, for example, 60 cm or thereabout.

The third and fourth rear sonars SR3 and SR4 are mounted to a middle portion of the rear bumper V14 to be aligned in the vehicle width direction. Specifically, the third rear sonar SR3 is arranged between the first rear sonar SR1 and the first center line LC1, and is configured to emit the sonar probing waves Wsp substantially rearward, and the fourth rear sonar SR4 is arranged between the second rear sonar SR2 and the first center line LC1, and is configured to emit the sonar probing waves Wsp substantially rearward. The third and fourth rear sonars SR3 and SR4 are arranged symmetrically with respect to the first center line LC1. Each of the third and fourth rear sonars SR3 and SR4 has a predetermined detection region Rsr, and the detection region Rsr, which will also be referred to as a rear detection region Rsr, of each of the third and fourth rear sonars SR3 and SR4 is designed such that the detection distance of the rear detection region Rsr is set to, for example, 1.5 m or thereabout.

The first and third rear sonars SR1 and SR3, which are mounted to the left side of the rear bumper V14 relative to the first center line LC1, are arranged at different positions in the vehicle width direction, i.e., the horizontal direction. The first and third rear sonars SR1 and SR3, which are adjacent to one another in the vehicle width direction, are arranged to have a predetermined positional relationship that enables one of the first and third rear sonars SR1 and SR3 to receive, as received echoes, sonar echoes resulting from reflection of the sonar probing waves Wsp emitted from the other of the first and third rear sonars SR1 and SR3 by a target object.

Specifically, the first rear sonar SR1 is arranged to receive both (i) direct echoes resulting from reflection of the sonar probing waves Wsp emitted from the first rear sonar SR1 by a target object, and (ii) indirect echoes resulting from reflection of the sonar probing waves Wsp emitted from the third rear sonar SR3 by the target object. Similarly, the third rear sonar SR3 is arranged to receive both (i) direct echoes resulting from reflection of the sonar probing waves Wsp emitted from the third rear sonar SR3 by a target object, and (ii) indirect echoes resulting from reflection of the sonar probing waves Wsp emitted from the first rear sonar SR1 by the target object.

Similarly, the third and fourth rear sonars SR3 and SRF4, which are mounted to the middle portion of the rear bumper V14 in the vehicle width direction, are arranged at different positions in the vehicle width direction, i.e., the horizontal direction. The third and fourth rear sonars SR3 and SR4, which are adjacent to one another in the vehicle width direction, are arranged to have a predetermined positional relationship that enables one of the third and fourth rear sonars SR3 and SR4 to receive, as received echoes, sonar echoes resulting from reflection of the sonar probing waves Wsp emitted from the other of the third and fourth rear sonars SR3 and SR4 by a target object.

The second and fourth rear sonars SR2 and SR4, which are mounted to the right side of the rear bumper V14 relative to the first center line LC1, are arranged at different positions in the vehicle width direction, i.e., the horizontal direction. The second and fourth rear sonars SR2 and SR4, which are adjacent to one another in the vehicle width direction, are arranged to have a predetermined positional relationship that enables one of the second and fourth rear sonars SR2 and SR4 to receive, as received echoes, sonar echoes resulting from reflection of the sonar probing waves Wsp emitted from the other of the second and fourth rear sonars SR2 and SR4 by a target object.

Each of the first side sonar SS1 and the third sonar SS3 is mounted to a portion of the left side portion of the body V1, and is configured to emit the sonar probing waves Wsp leftward relative to the own vehicle V. Similarly, each of the second side sonar SS2 and the fourth sonar SS4 is mounted to a portion of the right side portion of the body V1, and is configured to emit the sonar probing waves Wsp rightward relative to the own vehicle V. Each of the first, second, third, and fourth side sonars SS1, SS2, SS3, and SS4 is arranged to receive only direct echoes resulting from reflection of the sonar probing waves Wsp emitted from the corresponding one of the first, second, third, and fourth side sonars SS1, SS2, SS3, and SS4. Each of the first, second, third, and fourth side sonars SS1, SS2, SS3, and SS4 has a predetermined detection region Rss, and the detection region Rss, which will also be referred to as a side detection region Rss, of each of the first to fourth side sonars SS1 to SS4 is designed such that the detection distance of the side detection region Rss is set to be within, for example, a range from 2 to 3 m inclusive.

The first side sonar SS1 is arranged between the first front sonar SF1 and the door mirror V17 mounted to the left door panel V16 of the front pair, which will also be referred to as a left door mirror V17. The first side sonar SS1 is configured to emit the sonar probing waves Wsp leftward relative to the own vehicle V. The second side sonar SS2 is arranged between the second front sonar SF2 and the door mirror V17 mounted to the right door panel V16 of the front pair, which will also be referred to as a right door mirror V17. The second side sonar SS2 is configured to emit the sonar probing waves Wsp rightward relative to the own vehicle V. The first and second side sonars SS1 and SS2 are arranged symmetrically with respect to the first center line LC1. The first and second side sonars SS1 and SS2 can be mounted to the body panel V15 or mounted to portions of the respective left and right edges of the front bumper V12 in the vehicle width direction; the portion of each of the left and right edges of the front bumper V12 to which the corresponding one of the first and second side sonars SS1 and SS2 extends rearward in the vehicle longitudinal direction.

The third side sonar SS3 is arranged between the first rear sonar SR1 and the left door panel V16 of the rear pair. The third side sonar SS3 is configured to emit the sonar probing waves Wsp leftward relative to the own vehicle V. The fourth side sonar SS2 is arranged between the second rear sonar SR2 and the right door panel V16 of the rear pair. The fourth side sonar SS4 is configured to emit the sonar probing waves Wsp rightward relative to the own vehicle V. The third and fourth side sonars SS3 and SS4 are arranged symmetrically with respect to the first center line LC1. The third and fourth side sonars SS3 and SS4 can be mounted to the body panel V15 or mounted to portions of the respective left and right edges of the rear bumper V14 in the vehicle width direction; the portion of each of the left and right edges of the rear bumper V14 to which the corresponding one of the third and fourth side sonars SS3 and SS4 extends forward in the vehicle longitudinal direction.

Figure 6:
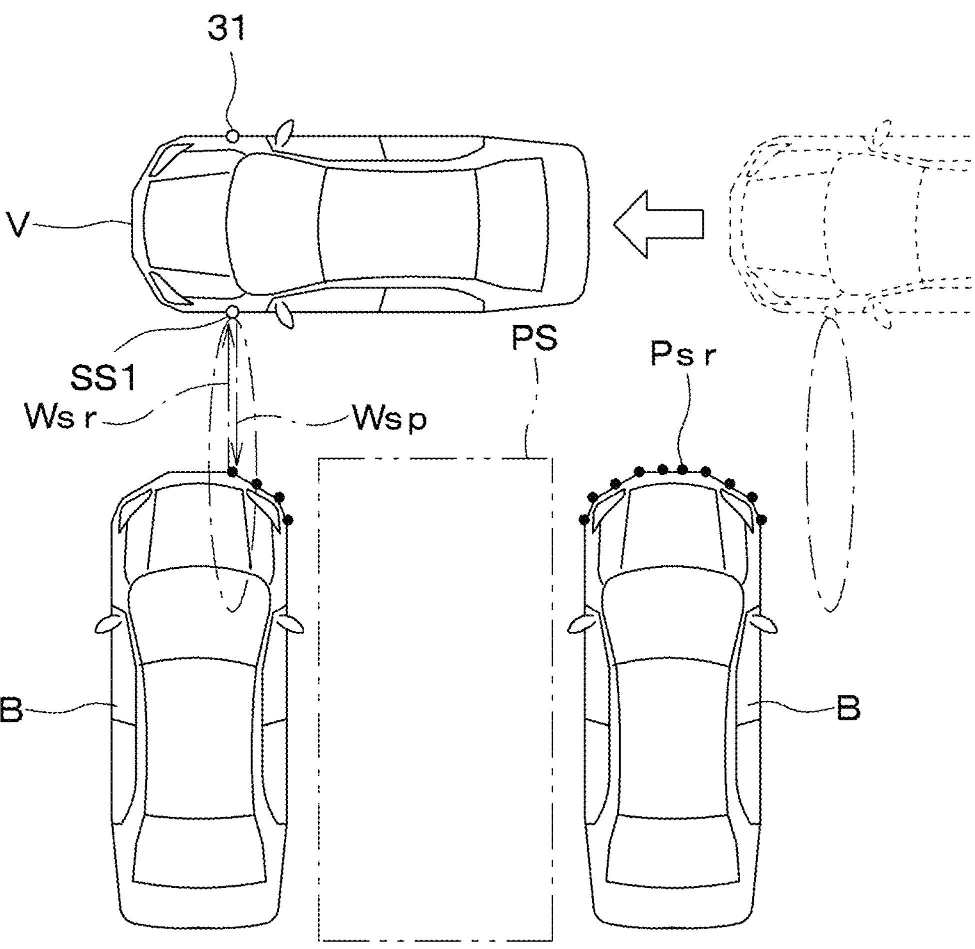
FIG. 6 is a plan view schematically illustrating parking-space detection using a first sonar sensor illustrated in FIG. 2.

FIG. 6 schematically illustrates an example where the driving ECU 2 detects, using the first side sonar SS1, a parking space or a parking slot PS located left-sideward relative to the own vehicle V for performing side-by-side parking. The parking space PS is a rectangular frame-like area in plan view, and represents a space in which a vehicle can be parked. FIG. 6 illustrates sonar detection points Psr that are points by which the sonar probing waves Wsp emitted from any sonar sensor 31 are estimated to be reflected; the sonar detection points Psr can also be referred to as ranging points Psr. As illustrated in FIG. 6, the driving ECU 2 can detect the parking space PS based on a distribution of the sonar detection points Psr that are acquired based on sonar echoes Wsr from target objects B that are parked vehicles arranged side-by-side in the direction of the straight forward movement of the own vehicle V.

Specifically, when acquiring adjacent rows of the sonar detection points Psr arranged in the traveling direction of the own vehicle V when performing a side-by-side parking of the own vehicle V as illustrated in FIG. 6, the driving ECU 2 can determine whether the length of a space between each adjacent pair of rows of the sonar detection points Psr exceeds the entire width of the own vehicle V, and detect, in response to determination that the length of the space between at least one adjacent pair of rows of the sonar detection points Psr exceeds the entire width of the own vehicle V, the space between at least one adjacent pair of rows of the sonar detection points Psr as location of a parking space PS.

Radar Sensor

Figure 7:
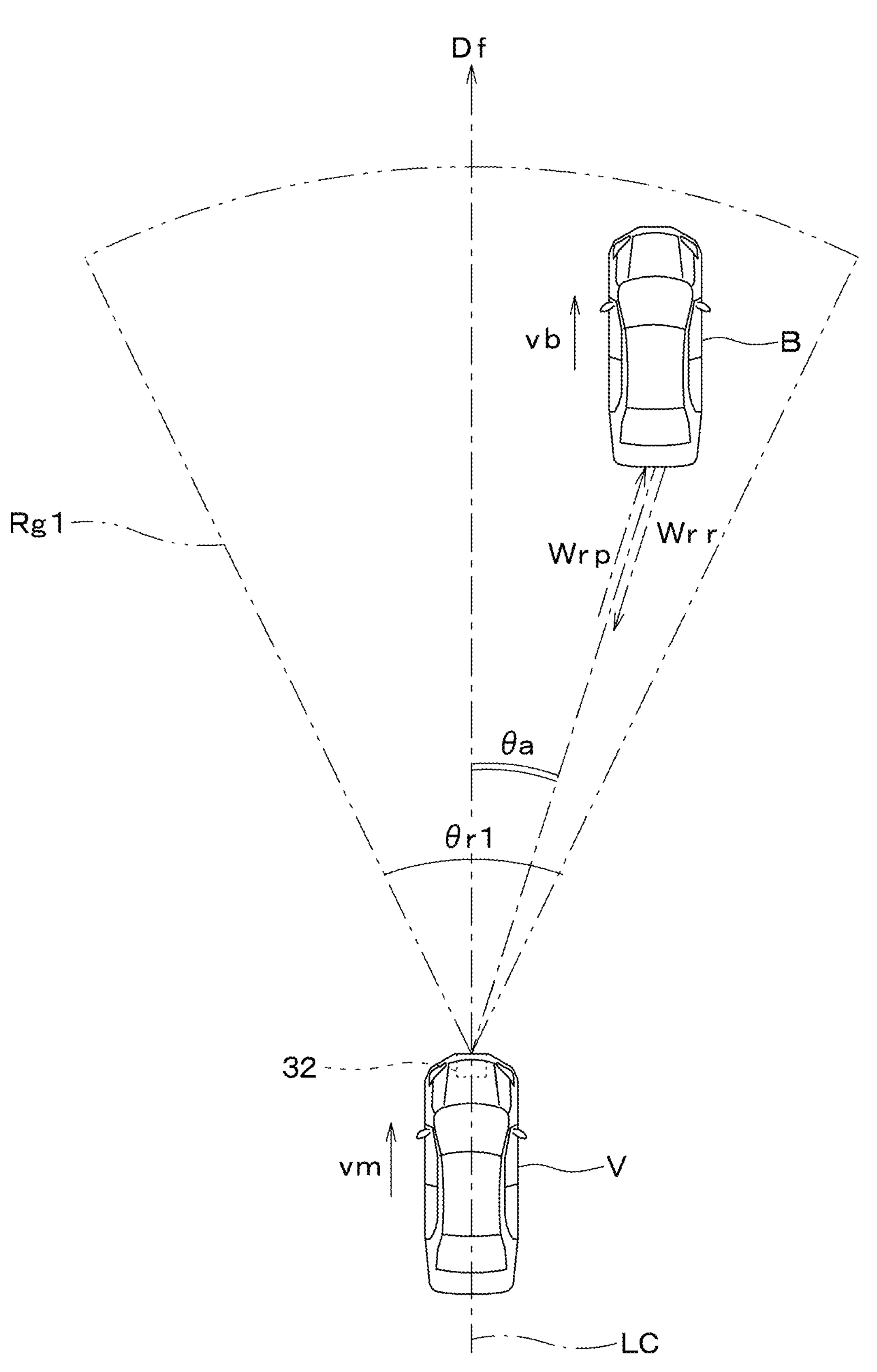
FIG. 7 is a plan view schematically illustrating target-object detection using a radar sensor illustrated in FIG. 2.

Referring to FIGS. 1 and 2, the radar sensor 32 is configured to transmit millimetric radar waves or sub-millimetric radar waves and receive reflected radar waves to accordingly detect a target object B. The radar sensor 32 of the exemplary embodiment is mounted to the middle of a front portion V11 of the body V1 in the vehicle width direction. The radar sensor 32 is, as illustrated in FIG. 7, a long-range radar having a substantially fan-like radar detection region Rg1 in plan view. The fan-like radar detection region Rg1 has a predetermined detection range from 10 to 250 m inclusive and has a radar scan angle θr1 around a forward movement direction Df of the own vehicle V. The radar sensor 32 is configured as a phased-array radar sensor or a beam-forming radar sensor. The forward movement direction Df represents the direction of a virtual line extending forward from the first center line LC1, and represents the traveling direction of the own vehicle V with a current shift position of a shift lever being set to any position except for the reverse position. The forward movement direction Df of the own vehicle V matches the traveling direction of the own vehicle V when the own vehicle V is moving straight forward, and becomes the direction of a tangent to a travel path of the own vehicle V when the own vehicle V is traveling around a curve.

The radar sensor 32 is configured to emit radar probing waves Wrp, scan the emitted radar probing waves Wrp within the radar scan angle θr1, and receive radar waves Wrr resulting from reflection of the radar probing waves Wrp by a target object B located in the radar detection region Rg1.

Specifically, the radar sensor 32 is comprised of an FMCW radar device equipped with an array antenna, and is configured to detect, based on differences in frequency between the emitted millimeter waves and received millimeter waves and/or differences in phase between the emitted millimeter waves and received millimeter waves, (i) a distance to the target object B therefrom, (ii) an azimuth angle θa of the target object B, (iii) a relative speed of the target object B relative to the own vehicle V. The azimuth angle θa of the target object B is defined as an angle made by a first virtual line generated by extending the first center line LC1 forward the own object V and a second virtual line connecting between the radar sensor 32 and the target object B; the first center line CL1 represents the center line of the radar detection range Rg1.

The relative speed of the target object B relative to the own vehicle V is defined as a difference between a moving speed vb of the target object B and a traveling speed vm of the own vehicle V.

Specifically, the radar sensor 32 is configured to transmit radar probing waves Wrp generated based on a transmission signal having a predetermined modulated frequency, and receive radar waves Wrr resulting from reflection of the radar probing waves Wrp by the target object B to accordingly detect, based on the received radar waves Wrr, received signals that represent frequency characteristics of the received radar waves Wrr. Then, the radar sensor 32 is configured to calculate deviations between the modulated frequency of the transmission signal and the frequencies of the received signals to accordingly generate beat signals based on the respective frequency deviations. The radar sensor 32 is configured to perform first Fourier transform on the beat signals to accordingly calculate a frequency-power spectrum of each of the beat signals. Then, the radar sensor 32 is configured to analyze the frequency-power spectrum of each beat signal to accordingly obtain beat frequencies, and calculate, based on the beat frequencies, a distance of the target object B from the radar sensor 32 and the relative speed of the target object B relative to the own vehicle V.

In addition to the long-range radar sensor 32, a middle-range radar sensor or a short-range radar sensor can be installed in the vehicular system 1. Such a middle-range radar sensor has, for example, a predetermined detection range from 1 to 100 m inclusive, and such a short-range radar sensor has, for example, a predetermined detection range from 15 cm to 30 m.

Laser-Radar Sensor

Figure 8:
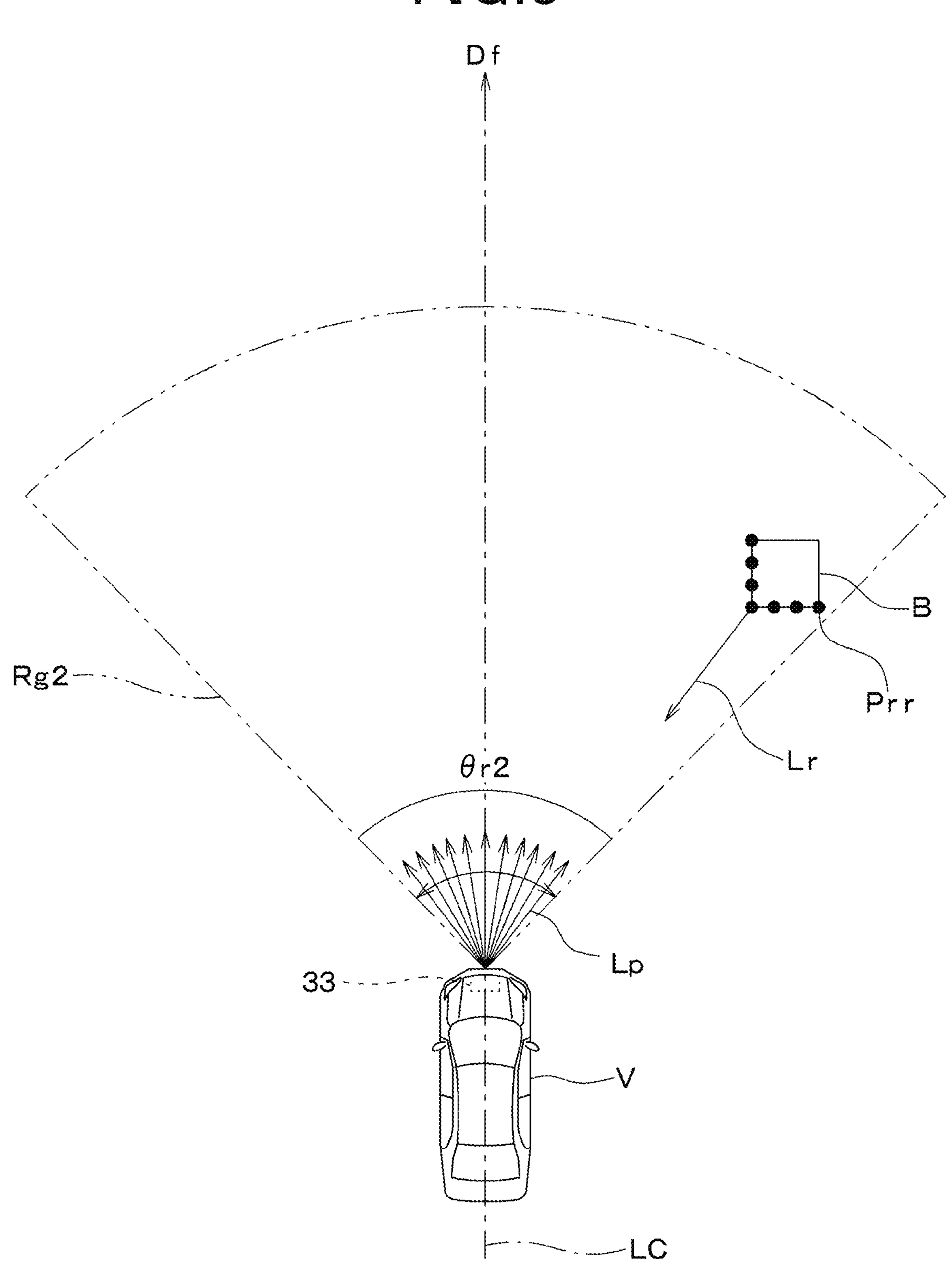
FIG. 8 is a plan view schematically illustrating target-object detection using a laser-radar sensor illustrated in FIG. 2.

The laser-radar sensor 33 is configured to, as illustrated in FIG. 8, irradiate the outside of the own vehicle V with detection light Lp, i.e., laser light within an infrared frequency band, and receive reflected light Lr resulting from reflection of the detection light Lp by a target object B to accordingly detect the target object B. The laser-radar sensor 33 can also be called LIDAR, which is an abbreviation for Light Detection and Ranging or Laser Imaging Detection and Ranging. The vehicular system 1 of the exemplary embodiment includes, as the laser-radar sensor 33, a long-range laser-radar sensor 33 including a scanning LIDAR. The laser-radar sensor 33 is mounted to, as illustrated in FIG. 1, the middle of the front portion V11 of the body V1 in the vehicle width direction.

The laser-radar sensor 33 has a substantially fan-like LIDAR detection region Rg2 in plan view. The fan-like radar detection region Rg2 has a predetermined radius of, for example, 200 m or more and has a LIDAR scan angle θr2 around the forward movement direction Df of the own vehicle V. The laser-radar sensor 33 is configured to horizontally scan the laser detection light Lp within the LIDAR scan angle θr2 to accordingly detect a target object B located in the LIDAR detection region Rg2.

Figure 9:
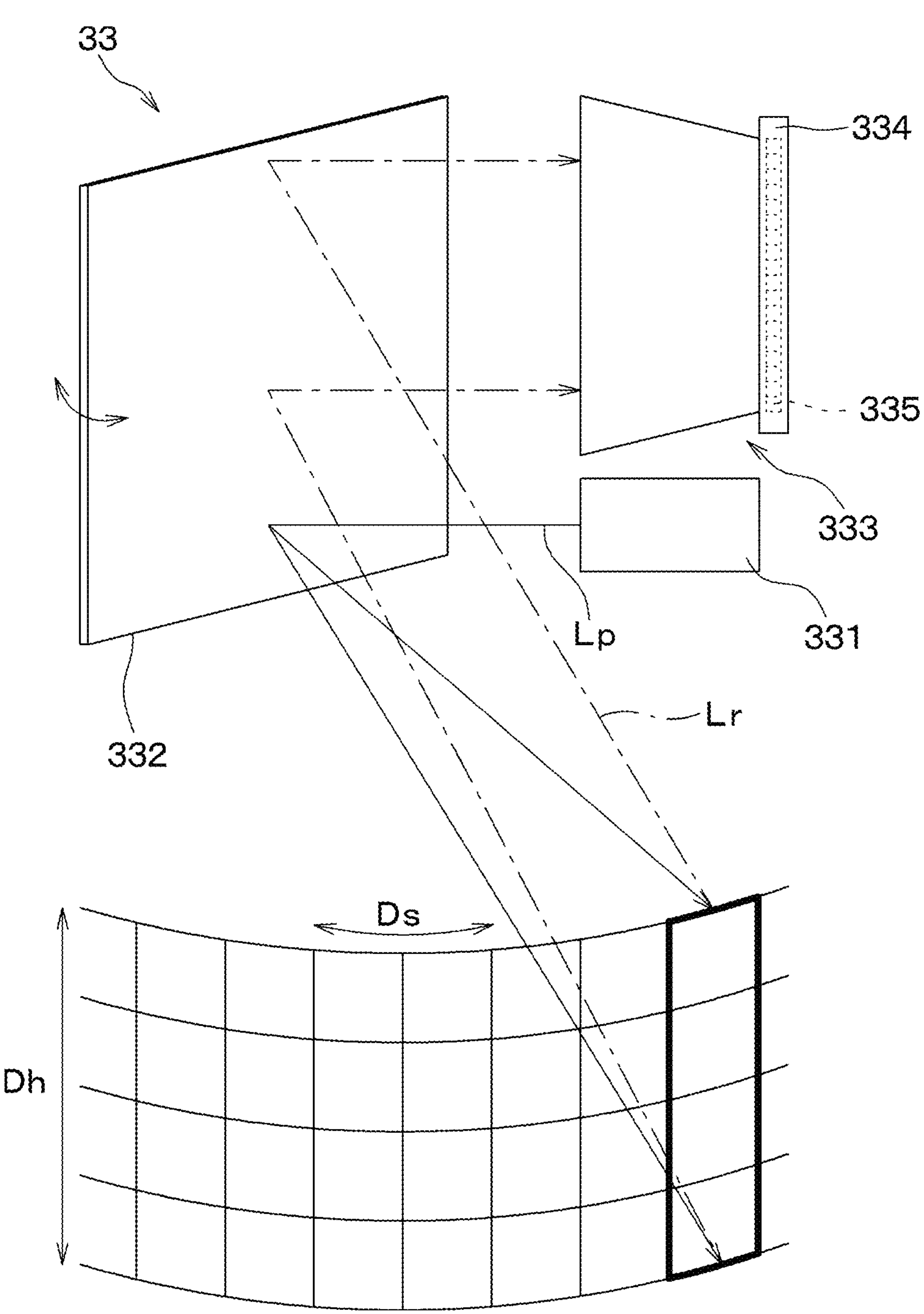
FIG. 9 is perspective view schematically illustrating a configuration and operations of the laser-radar sensor illustrated in FIG. 8.

FIG. 9 illustrates a schematic configuration of the laser-radar sensor 33. The laser-radar 33 includes a light emitting unit 331, a scanning unit 332, and a light receiving unit 333.

The light emitting unit 331 is configured to emit the detection light Lp. The scanning unit 332 is comprised of a MEMS mirror unit that includes at least one reflection mirror located on a light pash of the detection light Lp emitted by the light emitting unit 331 and a MEMS mechanism that, for example, rotates the at least one reflection mirror to accordingly change a direction of light reflected by the at least one reflection mirror; MEMS is an abbreviation for Micro Electro Mechanical Systems. Specifically, the scanning unit 332 is configured to electrically control the MEMS mechanism so that the MEMS mechanism rotates the at least one reflection mirror, thus scanning the detection light Lp emitted by the light emitting unit 331 in both a horizontal scanning direction Ds and a vertical scanning direction Dh.

The light receiving unit 333 includes a light receiving sensor 334 that is a two-dimensional image sensor. Specifically, the light receiving sensor 334 is comprised of a plurality of light-receiving elements 335 two-dimensionally arranged in a horizontal direction corresponding to the horizontal scanning direction Ds and a vertical direction corresponding to the vertical scanning direction Dh. Each of the light-receiving elements 335, which is comprised of an Avalanche Photo Diode (APD) or a Single Photon Avalanche Diode (SPAD), is configured to detect a corresponding part of the reflected light Lr resulting from reflection of the detection light Lp by at least one target object B.

The laser-radar sensor 33 is configured to generate, based on the reflected light Lr received by the light receiving unit 333, at least one detection-point data cloud, and detect, based on the at least one detection-point data cloud, the at least one target object B.

The at least one detection-point data cloud represents, like an image, i.e., a frame image, a two-dimensional array of a plurality of LIDAR detection points Prr, which are close to one another, two-dimensionally arranged in the horizontal scanning direction Ds and the vertical scanning direction Dh (see FIG. 9). Each LIDAR detection point Prr, which is arranged to a corresponding light receiving element 335, represents a point of the at least one target object B that is estimated to reflect a part of the detection light Lp; a part of the reflected light Lr received by the corresponding light receiving element 335 corresponds to the part of the detection light Lp. This therefore results in the LIDAR detection points Prr two-dimensionally arranged in the horizontal scanning direction Ds and the vertical scanning direction Dh including positional information and range information on the two-dimensional array. This therefore enables the at least one detection-point data cloud to also be referred to as at least one range-point data cloud.

That is, the laser-radar sensor 33 is configured to detect the at least one detection-point data cloud comprised of the LIDAR detection points Prr two-dimensionally arranged, like a frame image, in the horizontal scanning direction Ds and the vertical scanning direction Dh. This therefore enables the laser-radar sensor 33 to also be referred to as a type of an image sensor.

That is, if there are target objects B, the laser-radar sensor 33 is configured to detect, for each of the target objects B, the detection-point data cloud comprised of the LIDAR detection points Prr two-dimensionally arranged, like a frame image, in the horizontal scanning direction Ds and the vertical scanning direction Dh.

Camera

Referring to FIGS. 1 and 2, the at least one camera 34 serving as an image sensor is mounted to the own vehicle V. The at least one camera 34 is configured to capture images of a peripheral field of view around the own vehicle V while moving together with the own vehicle V. That is, the at least one camera 34 is configured to generate image information, which will also be referred to as image data, on each captured image around the own vehicle V.

The at least one camera 34 is configured as a digital camera device comprised of an image sensor, such as a Charge Coupled Device (CCD) image sensor or a Complementary Metal Oxide Semiconductor (CMOS) image sensor. The image sensor of the at least one camera 34 is comprised of a plurality of light-sensitive elements, such as photodiodes, which respectively correspond to a plurality of pixels, two-dimensionally arranged in both the vertical direction, i.e., the vehicle height direction, and the horizontal direction, i.e., the vehicle width direction, of the own vehicle V.

The driving information input unit 3 of the exemplary embodiment includes a plurality of cameras, i.e., a front camera CF, a rear camera CB, a left-side camera CL, and a right-side camera CR mounted to the own vehicle V. The front camera CF, rear camera CR, left-side camera CL, and right-side camera CR will also be collectively referred to simply as a camera 34 or cameras 34 if it is unnecessary to identify any of the cameras CF, CR, CL, and CR.

The front camera CF is mounted to a substantially middle of an upper end of the front windshield V18 in the vehicle width direction in the top of the interior V2, and has a front field of view in front of the own vehicle V. That is, the front camera CF is located on the first center line LC1 in plan view. The front camera CF can be mounted to the front portion V11 of the body V1. The front camera CF is configured to capture an image of the front field of view to accordingly acquire information on the captured image of the front field of view.

The rear camera CB is mounted to a substantially middle of a rear end V13 of the body V1 in the vehicle width direction, and has a rear field of view located at the rear of the own vehicle V. The rear camera CR is configured to capture an image of the rear field of view to accordingly acquire information on the captured image of the rear field of view.

The left-side camera CL is mounted to the left door mirror V17, and has a left-side field of view located at the left side of the own vehicle V. The left-side camera CL is configured to capture an image of the left-side field of view to accordingly acquire information on the captured image of the left-side field of view.

The right-side camera CR is mounted to the right door mirror V17, and has a right-side field of view located at the right side of the own vehicle V. The right-side camera CR is configured to capture an image of the right-side field of view to accordingly acquire information on the captured image of the right-side field of view.

The image captured by each camera 34 is comprised of two-dimensionally arranged pixels respectively corresponding to the two-dimensionally arranged light-sensitive elements of the corresponding camera 34.

The driving ECU 2 can recognize a target object B based on the images captured by any camera 34, i.e., determine, based on the images captured by any camera 34, at least a location of a target object B and a type of the target object B.

Figure 10:
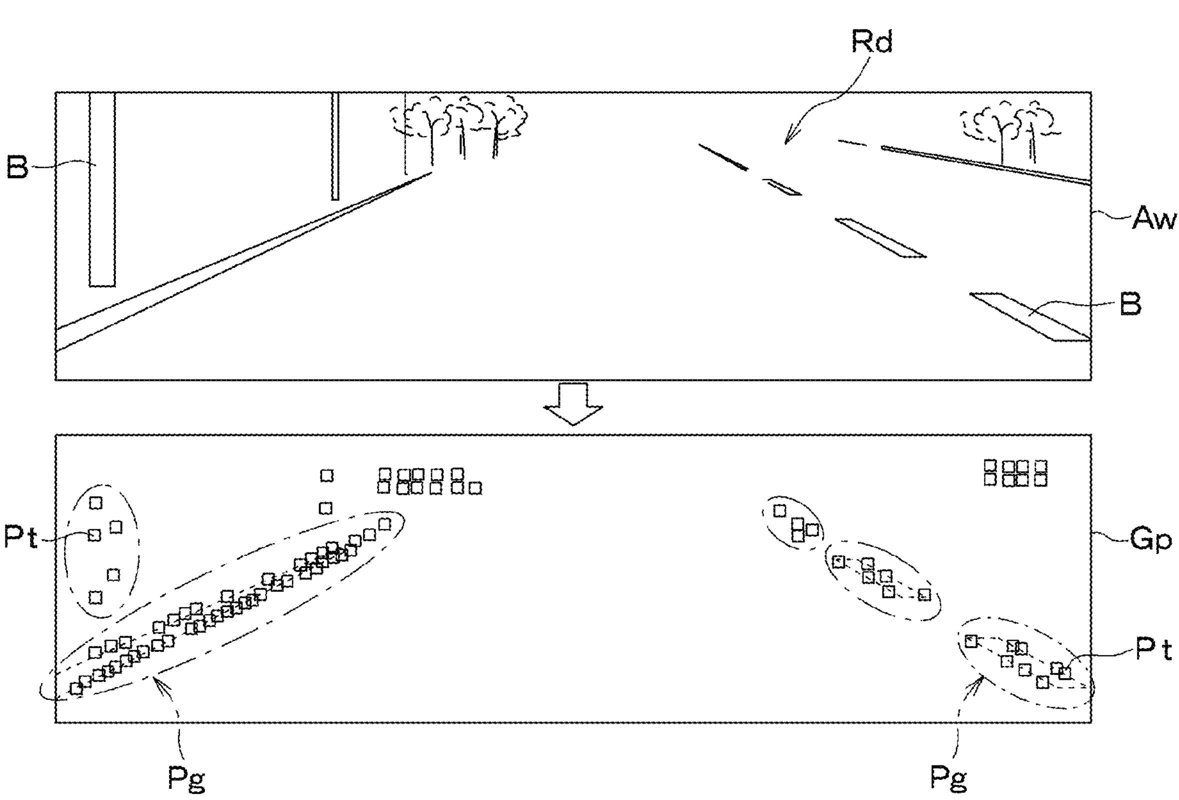
FIG. 10 is a diagram schematically illustrating target-object detection using a camera illustrated in FIG. 2.

FIG. 10 illustrates an example of how the driving ECU 2 recognizes target objects B included in the front field of view in accordance with an image of the front field of view captured by the front camera CF; the front field of view includes a road Rd in front of the own vehicle V. In the specification, reference character Rd is assigned to any road for the sake of convenience, but roads to which the same reference character Rd are assigned may not necessarily represent the same road.

Specifically, the driving ECU 2 sets, in a captured image, a detection region Aw. The detection region Aw represents a part or a whole of an entire region of the captured image, i.e., an entire view-angle region of the front camera CF. Then, the driving ECU 2 acquires, based on pixel feature parameters of the image data included in the detection region Aw, a feature-point image Gp. The pixel feature parameters of the image data represent feature parameters of each pixel constituting the image data based on corresponding received light, and can include, for example, a luminance, a contrast, and a hue of each pixel of the image data. The luminance of each pixel can be referred to as the brightness of the corresponding pixel, and the hue of each pixel can be referred to as the chroma of the corresponding pixel.

The feature-point image Gp is comprised of feature points Pt two-dimensionally arranged in the horizontal direction and the vertical direction like a frame image; each of the feature points Pt is extracted from the image data included in the detection region Aw based on, for example, the difference and/or change gradient between a corresponding adjacent pair of the pixels of the image data. The feature points Pt characterize the shape of a target object B included in the detection region Aw of a captured image. In other words, the feature points Pt are characteristic points, i.e., characteristic pixels, of the image data included in the detection region Aw.

The driving ECU 2 performs a pattern matching task of matching one or more feature-point clouds Pg, each of which is an assembly of the corresponding feature points Pt, with predetermined patterns stored therein to accordingly identify, for each of the feature-point clouds Pg, the type of a corresponding one of the target objects B based on the corresponding one of the feature-point clouds Pg.

Various methods of extracting, from the image data included in the detection region Aw, the feature points Pt have been well known. For example, an extraction method using Sobel filter, an extraction method using Laplacian filter, an extraction method using a Canny algorithm can be used to extract, from the image data included in the detection region Aw, the feature points Pt. Therefore, detailed descriptions of one of the well-known extraction methods used in the specification are omitted. Extraction of the feature points Pt from the image data included in the detection region Aw can be expressed as detection of the feature points Pt from the image data included in the detection region Aw.

The driving ECU 2 can estimate a relative position of the recognized target object B relative to the own vehicle V and/or a distance, i.e., a range, of the recognized target object B relative to the own vehicle V.

Figure 11:
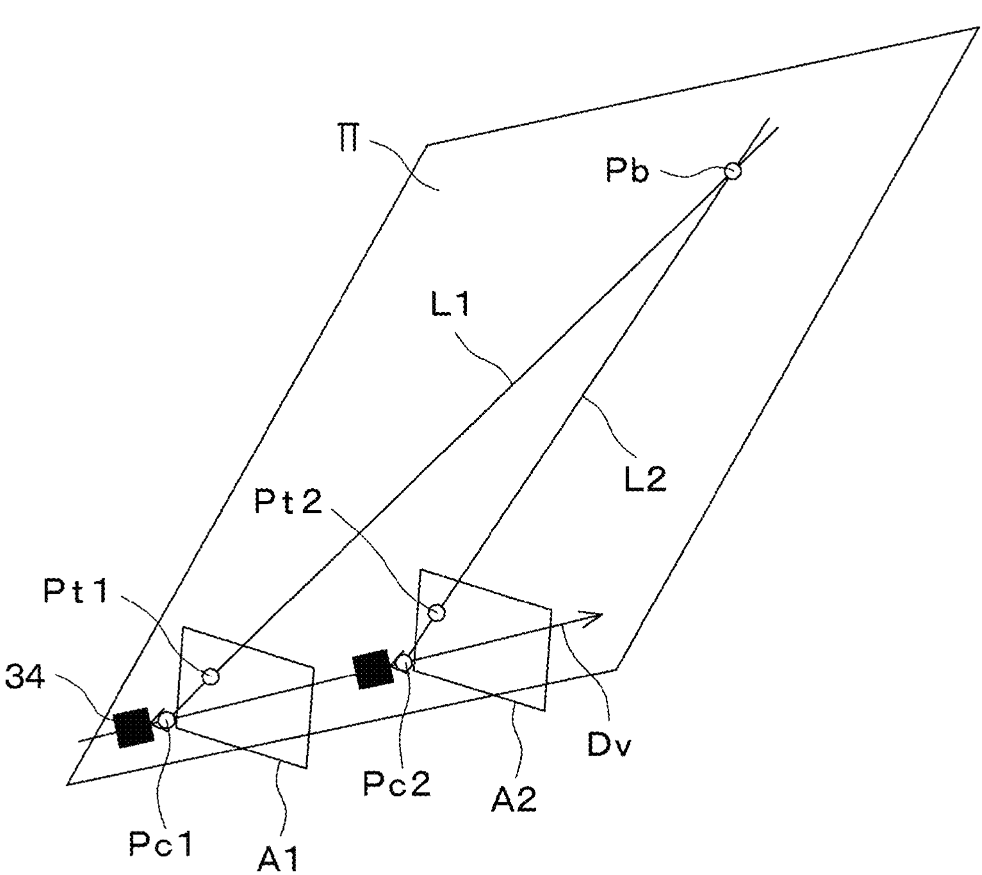
FIG. 11 is a diagram schematically illustrating target-object detection using a camera illustrated in FIG. 2.

FIG. 11 illustrates an example where the driving ECU 2 calculates an estimated point Pb as an estimation result of three-dimensional positions of each feature point Pt corresponding to a target object B using, for example, a monocular motion stereo method, in other words, a Structure from Motion (SFM) method. The present disclosure can calculate the estimated point Pb as the estimation result of the three-dimensional positions of each feature point Pt corresponding to a target object B using a selected one of the other calculation methods. That is, each camera 34 can be configured as a compound-eye stereo camera.

Let us assume that, as illustrated in FIG. 11, the camera 34 is moving, together with the own vehicle V, toward the own-vehicle movement direction Dv of the own vehicle V. The position of the camera 34 at time t1 will be referred to as a first camera position Pc1, and the position of the camera 34 at time t2 after the time t1 will be referred to as a second camera position Pc2. A first captured image A1 is an image captured by the camera 34 at the first camera position Pc1, and a second captured image A2 is an image captured by the camera 34 at the second camera position Pc2.

A first feature point Pt1 is a feature point Pt extracted from the first captured image A1, and a second feature point Pt2, which is extracted from the second captured image A2, is estimated correspond to the first feature point Pt1 at the time t1. That is, the second feature point Pt2 is a point to which a point on the target object B corresponding to the first feature point Pt1 is estimated to have moved for an elapsed time (t2−t1) from the time t1 to the time t2. The driving ECU 2 can determine whether the first feature point Pt1 and the second feature point Pt1 are based on the same point on the target object B, i.e., the first feature point Pt1 on the target object B corresponds to the second feature point Pt2 thereon, using one of well-known methods, such as an optical-flow method. Then, the driving ECU 2 defines a first line L1 passing through the first camera position Pc1 and the first feature point Pt1 and a second line L2 passing through the second camera position Pc2 and the second feature point Pt2, and calculates a point of intersection of the first and second lines L1 and L2 as the estimated point Pb. The estimated point Pb represents, in a three-dimensional coordinate system defined relative to the own vehicle V, a point on the target object B, which corresponds to both the first feature point Pt1 and the second feature point Pt2. If the estimated point Pb is a stationary point, the estimated point Pb satisfies epipolar constraint. The epipolar constraint is an epipolar-geometric constraint that the first camera position Pc1, the second camera position Pc2, and the estimated point Pb lie on the same plane Π at any time t1 or t2.

Various Sensors

Referring to FIGS. 1 and 2, the operation sensors 35 are each provided in the own vehicle V for outputting a parameter indicative of a corresponding driver's operated state of the own vehicle V. The parameters to be outputted from the respective operation sensors 35, each of which represents the corresponding driver's operated state of the own vehicle V, may for example include (i) a driver's operated quantity of an accelerator pedal of the own vehicle V, (ii) a driver's operated quantity of a brake pedal of the own vehicle V, (iii) a driver's set current shift position of the shift lever, (iv) a driver's operated steering angle of the steering wheel V24, and (v) a driver's applied steering torque of the steering wheel V24. That is, the operation sensors 35 include known sensors including, for example an accelerator-pedal sensor, a brake-pedal sensor, a shift-position sensor, a steering-angle sensor, and a steering-torque sensor. That is, these known sensors are collectively referred to as the operation sensors 35 for the sake of simple illustration and simple descriptions. The operation sensors 35 can include a steering-wheel sensor for detecting information indicative of whether the driver D grasps the steering wheel V24.

The behavior sensors 36 are each provided in the own vehicle V for outputting a parameter indicative of a corresponding drive behavior of the own vehicle V. The parameters to be outputted from the respective behavior sensors 36, each of which represents the corresponding behavior of the own vehicle V, may for example include (i) a speed of the own vehicle V, (ii) a yaw rate of the own vehicle V, (iii) an acceleration of the own vehicle V in the longitudinal direction, and (iv) an acceleration of the own vehicle V in the vehicle width direction. That is, the behavior sensors 36 include known sensors including, for example a vehicle speed sensor, a yaw-rate sensor, and acceleration sensors. That is, these known sensors are collectively referred to as the behavior sensors 36 for the sake of simple illustration and simple descriptions.

Driver-State Monitor

Referring to FIGS. 1, 2, 12, and 13, the driver-state monitor 37 is configured to sequentially capture images of the driver D, and sequentially detect driver's state parameters representing the driver's states based on the captured images of the driver D. The driver's conditions include, for example, information indicative of whether the driver D is in an awake state.

Specifically, the driver-state monitor 37 includes a driver monitor camera having a predetermined field of view; the driver monitor camera is located in the interior V2 such that at least the head D1 of the driver D2 who is sitting on the driver's seat V23 lies within the field of view of the driver monitor camera. This enables the driver monitor camera to capture, from the front, images of the face D2 of the driver D. The driver monitor camera can be configured as a near-infrared camera.

The driver-state monitor 37 includes an image processing unit configured to perform image-processing tasks on the images captured by the driver monitor camera to accordingly detect the driver's state parameters.

Figure 12:
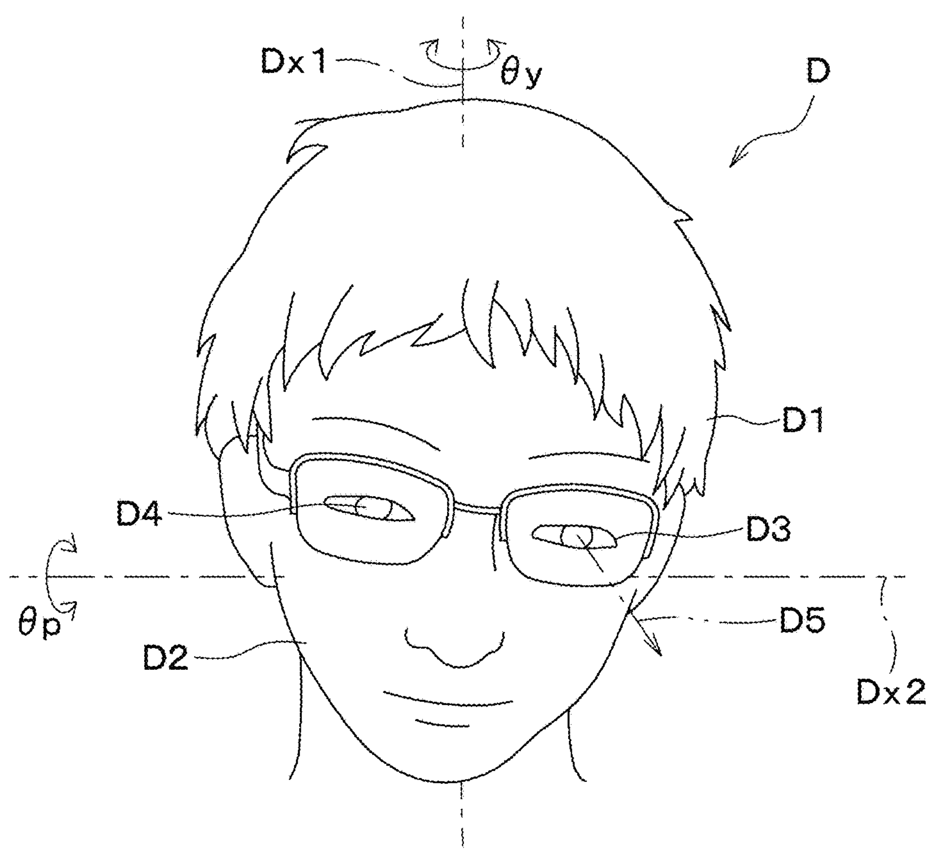
FIG. 12 is a diagram schematically illustrating driver-state detection using a driver-state monitor illustrated in FIG. 2.
Figure 13:
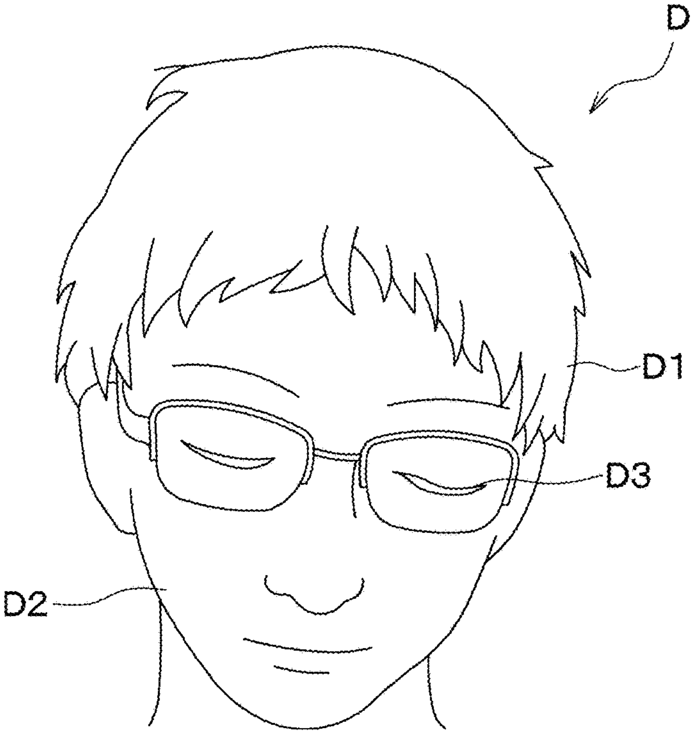
FIG. 13 is a diagram schematically illustrating driver-state detection using a driver-state monitor illustrated in FIG. 2.

The driver's state parameters to be detected by the driver-state monitor 37 for example include, as illustrated in FIGS. 12 and 13, (i) the direction of the face D2 of the driver D, (ii) the degree of opening of each driver's eye D3, and (iii) the position of each pupil D4 of the driver D. The direction of the face D2 of the driver D is defined by a yaw angle θy and a pitch angle θp of the face D2 of the driver D. The yaw angle θy represents a rotational angle of the face D2 of the driver D around a vertical axis Dx1 extending vertically through the head D1 of the driver D. When the face D2 of the driver D faces the front, the yaw angle θy is 0°. That is, the yaw angle θy becomes a corresponding positive degree when the face D2 of the driver D faces to the left relative to the front, and becomes a corresponding negative degree when the face D2 of the driver D faces to the right relative to the front.

The pitch angle θp represents a rotational angle of the face D2 of the driver D around a horizontal axis Dx2 extending horizontally through the face D2 of the driver D. When the face D2 of the driver D faces the front, the pitch angle θp 0°. That is, the pitch angle θp becomes a corresponding positive degree when the face D2 of the driver D faces upward relative to the front, and becomes a corresponding negative degree when the face D2 of the driver D faces downward relative to the front.

FIG. 12 is an example of an image captured by the driver-state monitor 37 in which the driver D is in the awake state, and FIG. 13 is an example of an image captured by the driver-state monitor 37 in which the driver D is not in the awake state. FIGS. 12 and 13 show that the driver's state parameters of (i) the direction of the face D2 of the driver D, (ii) the degree of open of each driver's eye D3, and (iii) the position of each pupil D4 of the driver D enable the driving ECU 2 to detect the driver's states including, for example, (i) information about whether the driver D is in the awake state and (ii) information about the driver's line of sight D5.

Operation Switches

Referring to FIGS. 1 and 2, the operation switches 38 are various switches that can be operated by the driver E when the driver E is driving the own vehicle E, and are provided at predetermined positions in the interior V2. Each of the operation switches 38 is a switch whose operated quantity and operated state are exempted from being detected by the operation sensors 35. Specifically, the operation switches 38 for example include an ignition switch 381, a blinker switch 382, and one or more AD/ADAS switches 383. The ignition switch 381, which can be called a start switch or a power switch, is a switch for activating or deactivating the system-installed vehicle V, i.e., the vehicular system 1. The blinker switch 382 is configured to detect a driver's operated state of a blinker lever of the own vehicle V. The AD/ADAS switches 383 are switches that enable the driver E, when operating them, to input, to the driving ECU 2, various instructions related to the driving assistance or the autonomous driving of the own vehicle V; the various instructions related to the driving assistance or the autonomous driving of the own vehicle V include, for example, a start instruction, a stop instruction, a level setting instruction, and a function selection instruction.

The locator 39 is configured to acquire highly accurate position information, which will also be referred to as complex position data, on the own vehicle V. Specifically, the locator 39 is configured as a complex positioning system for acquiring the complex position data of the own vehicle V, and is comprised of a GNSS receiver 391, an inertia detector 392, and a locator ECU 393.

The GNSS is an abbreviation for Global Navigation Satellite System, and the highly accurate position information on the own vehicle V is positional information on the own vehicle V, which has at least a position accuracy usable by the advanced driving assistance in the SAL level 2 or more, in other words, a position accuracy with an error of lower than or equal to 10 cm. As the locator 39, a commercially available positioning system, such as a POSLV system for land vehicles, in other words, a positioning azimuth system for land vehicles, manufactured by Applanix Corporation, can be used.

The GNSS receiver 391 can be configured to receive the navigation signals transmitted from at least one positioning satellite, that is, at least one artificial satellite. In particular, the GNSS receiver 391 is configured to be able to receive receiving the navigation signals from a positioning satellite included in at least one GNSS selected from the GPS, the QZSS, the GLONASS, the GLONASS, the Galileo, the IRNSS, and the Beidou Navigation Satellite System. GPS is an abbreviation for Global Positioning System, QZSS is an abbreviation for Quasi-Zenith Satellite System, GLONASS is an abbreviation for Global Navigation Satellite System, and IRNSS is an abbreviation for Indian Regional Navigation Satellite System.

The inertia detector 392 is configured to detect (i) linear accelerations acting on the own vehicle V in respective three axes corresponding to the vehicle longitudinal direction, the vehicle width direction, and the vehicle height direction, and (ii) angular velocities acting on the own vehicle V around the respective three axes. For example, the locator 39 has a substantially box-shaped housing, and an inertia detector 392 is comprised of a three-axis accelerometer and a three-axis gyro sensor installed in the housing.

The locator ECU 393 includes a vehicular microcomputer comprised of a CPU, a ROM, a RAM, an input/output (I/O) interface, and other peripheral devices. The locator ECU 393 is configured to sequentially determine the current position and/or the current azimuth of the own vehicle V in accordance with the navigation signals received by the GNSS receiver 391 and the linear accelerations and angular velocities detected by the inertia detector 392.

Vehicular Communication Module

The vehicular communication module 4, which will also be referred to as a DCM 4, can be configured to communicate information with base stations located around the own vehicle V using wireless communications that are compliant with a predetermined communication standard, such as Long Term Evolution (LTE) or 5th Generation (5G).

Specifically, the vehicular communication module 4 is configured to acquire traffic information, such as traffic-jam information, from probe servers and/or predetermined databases in a cloud computing environment. The traffic-jam information includes, for example, the location and the length of at least one traffic-jam section. Specifically, the traffic-jam information includes, for example, various information items about at least one traffic-jam section, such as the head of the at least one traffic-jam section, the tail of the at least one traffic-jam section, an estimated length of the at least one traffic-jam section, and an estimated time for the at least one traffic-jam section. The traffic information will also be referred to as road traffic information.

Additionally, the vehicular communication module 4 is configured to retrieve, from at least one of the probe servers, latest HD map information, and store the HD map information in the HD map database 5.

HD Map Database

The HD map database 5 is comprised of mainly one or more non-volatile rewritable memories, and is configured to store the HD map information to be rewritable while holding the stored HD map information even if power supplied to the HD map database 5 is shut off. The HD map information will also be referred to as HD map data.

The HD map information includes higher-definition map information than map information stored in a standard (SD) map database 601 of the navigation system 6. That is, the higher-definition map information has a positional error lower than or equal to an error of approximately several meters of the map information stored in the SD map database 601.

Specifically, the HD map information database 5 stores, as the HD map information, for example, map information available by the advanced driving assistance or the autonomous driving, that includes, for example, (i) information about three-dimensional road shapes, (ii) information about the number of lanes in each road, and (iii) information about road traffic regulations. The HD map information is stored in the HD map information database 5 to be in conformity with a predetermined standard, such as ADASIS.

Navigation System

The navigation system 6 is configured to calculate a scheduled travel route from the current position of the own vehicle V to a destination. The navigation system 6 of the exemplary embodiment is configured to calculate the scheduled travel route based on (i) the destination inputted by, for example the driver D through, for example, the HMI system 7, (ii) the HD map information stored in the HD map database 5 or the SD map information stored in the SD map database 601, and (iii) the position information on the own vehicle V, such as the current position and the current azimuth of the own vehicle V. The navigation system 6 is additionally configured to provide various information including the scheduled travel route to one or more selected components of the vehicular system 1, such as the driving ECU 2 and/or the HMI system 7, through the vehicular communication network 10. That is, the navigation system 6 is capable of instructing the HMI system 7 to sequentially display navigation images that show, for example, maps on which the current position of the own vehicle V and the scheduled travel route respectively appear.

HMI System

The HMI system 7 is designed as a vehicular HMI system, and is configured to implement information communications between the own vehicle V and one or more occupants including the driver D of the own vehicle V.

Specifically, the HMI system 7 is configured to provide, i.e., display, various information items at least visibly to the one or more occupants, and enable occupant's input on information input relative to the provided information items. The various information items to be provided to the one or more occupants include, for example, various guide information items, information items on input-operation guidance, notification of inputted information, and/or warnings.

The HMI system 7 is typically comprised of I/O components mounted to the steering wheel V24 or installed in the dashboard V21, which is so-called "dashboard HMI". At least one of the I/O components of the HMI system 7 can be mounted to at least one portion in the interior V2 except for the dashboard V21, such as the cell in the interior V2 or a center console located between the driver's seat V23 and the passenger's seat V22 adjacent to the driver's seat V23.

The HMI system 7 includes an HMI control unit (HCU) 701, a meter panel 702, a main display device 703, a head-up display 704, a speaker 705, and operation devices 706.

The HCU 701 includes a vehicular microcomputer comprised of a CPU, a ROM, a RAM, an input/output (I/O) interface, and other peripheral devices. The HCU 701 is configured to perform overall control of display output and/or audible output through the HMI system 7. That is, the HCU 701 is configured to control operations of each of the meter panel 702, the main display device 703, the head-up display 704, and the speaker 705.

The meter panel 702 is installed in the dashboard V21 to be arranged to face the driver's seat V23. The meter panel 702 is configured to display metered values including, for example, the speed of the own vehicle V, the temperature of the coolant, and the fuel level. The meter panel 702 is additionally configured to display various information items including, for example, the current date and time, the outside temperature, the receivable radio broadcasts.

The main display device 703, which is also called a center information display (CID) device, is installed in the middle of the dashboard V21 in the vehicle width direction, which enables the one or more occupants to visibly recognize information displayed thereon.

The main display device 703 has a housing and a screen installed in the housing, and can be configured to successively display, on the screen, the navigation images generated by the navigation system 6, which show, for example, maps on which the current position of the own vehicle V and the scheduled travel route respectively appear. The main display device 703 can be additionally configured to display, on the screen, various information and contents different from the navigation images. For example, the main display device 703 can be configured to display a drive-mode setting image on which icons of plural driving modes are selectably displayed; the plural driving modes include a comfort drive mode, a normal driving mode, a sport driving mode, and a circuit drive mode. The main display mode 703 is moreover configured to display, on the screen, a second-task image on which icons of plural second tasks are selectably displayed; the second tasks, which are other than the driving tasks of the own vehicle V, are usable by the driver D during the autonomous driving of the own vehicle V. For example, the secondary tasks include (i) a task of reading digital books, (ii) a task of operating a mobile communication terminal, and (iii) a task of watching video contents, such as movies, concert videos, music videos, or television broadcasts. The second tasks can be called secondary activities or other tasks.

Referring to FIGS. 1, 2, 14, and 15, the head-up display 704 is configured to display a virtual image M including letters, figures, and/or characters in the driver's forward view. The head-up display 704 of the exemplary embodiment is configured to project the virtual image M in front of the driver D using AR technologies to accordingly superimpose the virtual image M on the forward scenery including the road surface FR located on the traveling course of the own vehicle V; AR is abbreviated for Augmented Reality. The task of superimposing the virtual image M on the forward scenery can display information included in the virtual image M, which is related to at least one focusing target included in the forward scenery, to be positionally linked to the at least one focusing target.

For example, the task of superimposing the virtual image M on the forward scenery can display the information included in the virtual image M while superimposing the information on the at least one focusing target, or display the information included in the virtual image M while being adjacent to the at least one focusing target. The at least one focusing target is, for example, at least one target object on which the driver D driving the own vehicle V should focus, i.e., to which the driver D driving the own vehicle V should pay attention. The at least one focusing target includes, for example, a road-surface marking (a road marking), a road sign, a forward vehicle, and/or a pedestrian. For example, the head-up display 704 can be configured to superimpose the scheduled travel route, a traveling direction of the own vehicle V, traffic information, and other similar information on a forward road surface FR as the focusing target.

An area on the front windshield V18 on which the virtual image M is projected will be referred to as a projection area AP.

Figure 14:
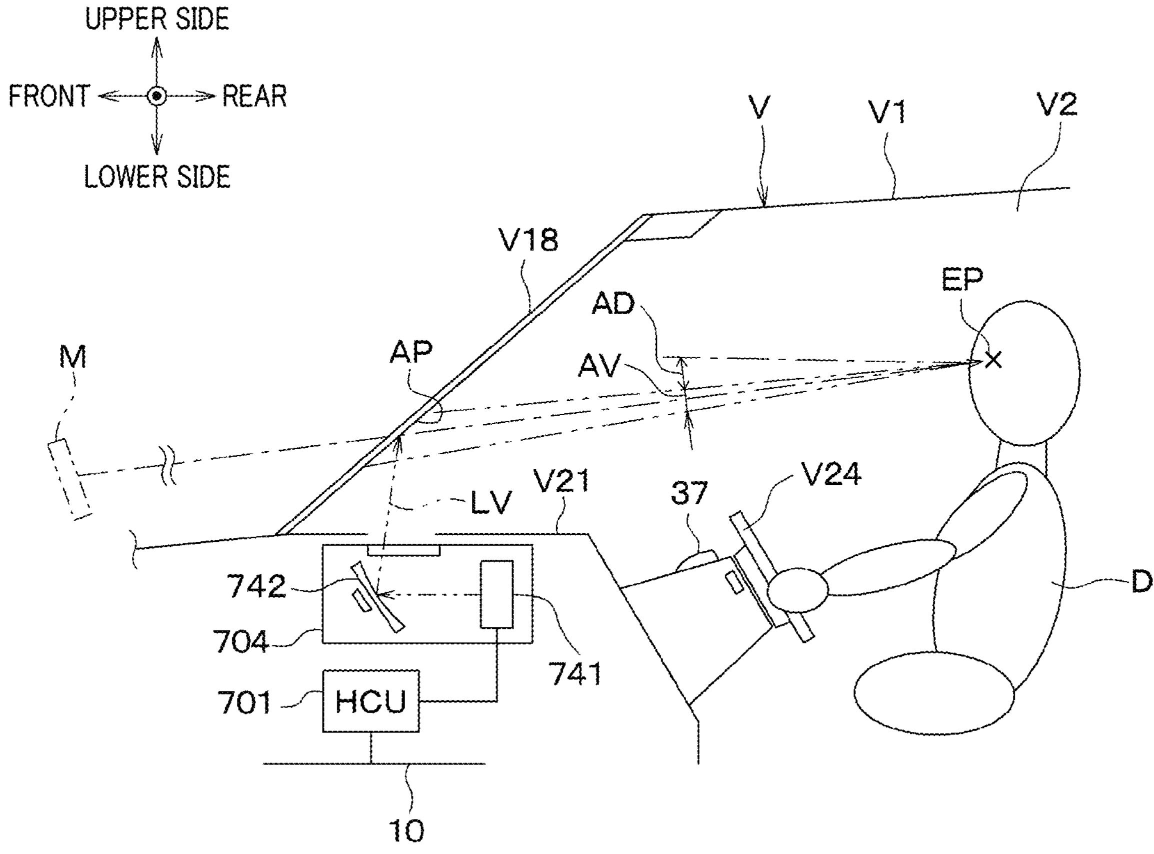
FIG. 14 is a diagram illustrating a schematic configuration of a head-up display illustrated in FIG. 2.

The head-up display 704 has, as illustrated in FIG. 14, a depression angle AD of, for example, a positive degree more than 0°. The depression angle AD of the head-up display 704 is defined, in for example side view illustrated in FIG. 14, as an angle formed between a virtual horizontal plane passing through the eyepoints EP of the driver D and a virtual plane passing through the eyepoints EP of the driver D and a top edge of the projection area AP. The depression angle AD becomes a positive value when the eyepoints EP look down the top edge of the projection area AP, or becomes a negative value when the eyepoints EP look up the top edge of the projection area AP.

The head-up display 704 has a vertical angle of view AV and a horizontal angle of view, and the vertical angle of view AV defines a vertical width of the projection area AP, and the horizontal angle of view defines a horizontal width of the projection area AP. The horizontal angle of view being set to be greater than the vertical angle of view AV results in the projection area AP having a substantially rectangular shape. The vertical angle of view AV can be defined, in for example left side view illustrated in FIG. 14, as an angle formed between the virtual line passing through the left eyepoint EP of the driver D and the top edge of the projection area AP and a virtual line passing through the left eyepoint EP of the driver D and a bottom edge of the projection area AP. That is, the virtual angle of view AV represents an angular range in the vertical direction within which the left eyepoint EP can view the virtual image M, which can be called a vertical view angle in the vertical direction.

The head-up display 704 includes, as illustrated in FIG. 14, a projector 741 and a magnifying optical system 742. The projector 741 is configured to generate, based on a display image signal generated by the HCU 701, a light-based image LV, and emit the light-based image to the magnifying optical system 742. The magnifying optical system 742 includes a plurality of optical components including a concave mirror, and an actuator configured to control the alignment of the optical components. The magnifying optical system 742 is configured to project, using the optical components, a magnified image of the light-based image LV onto the front windshield V18 while controlling, through the actuator, the alignment of the optical components based on the location of the eyepoints EP detected by the driver-state monitor 37 to accordingly adjust the projected state of the magnified image onto the front windshield V18. This results in the magnified image based on the light-based image LV being projected in the projection area AP of the front windshield V18. This enables the driver D to visibly recognize the virtual image M based on reflected light of the magnified image projected in the projection area AP of the front windshield V18.

Figure 15:
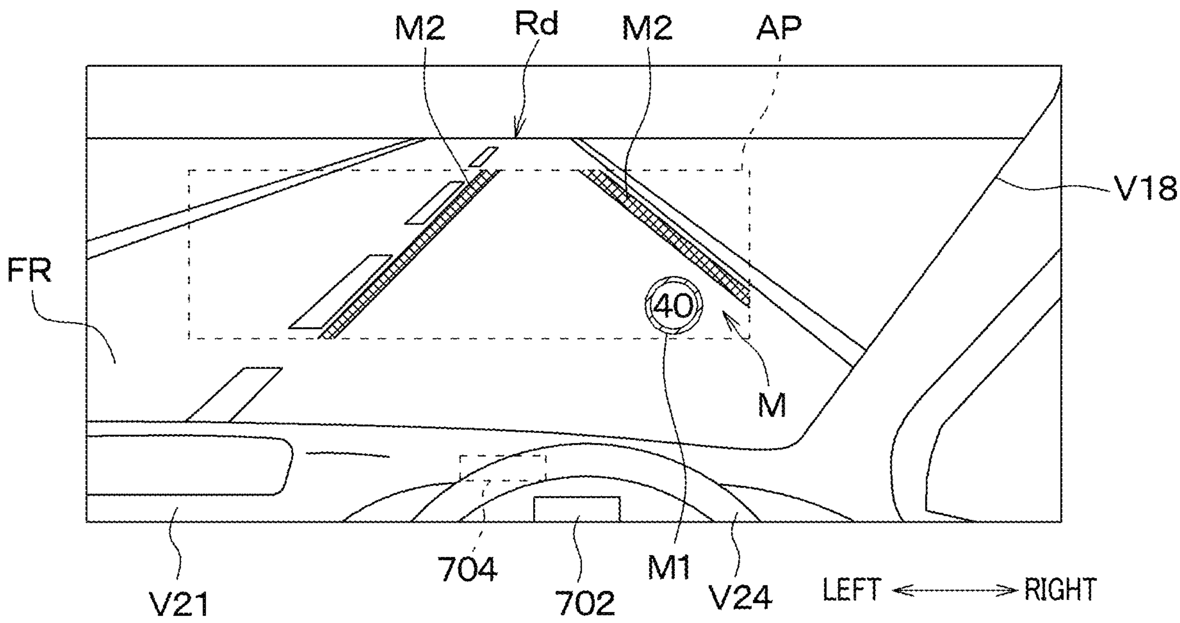
FIG. 15 is a schematic diagram illustrating (i) a road surface in front of an own vehicle through a front windshield and (ii) a part of a dashboard when viewed from a driver illustrated in FIG. 14.

FIG. 15 illustrates an example of the virtual image M. The virtual image M for example is comprised of a transparent base image, one or more information contents M1 contained in the transparent base image, and one or more graphic contents M2 contained in the transparent base image. The one or more information contents M1 are information contents displaying, for example, the maximum speed limit for a road Rd in which the own vehicle V is traveling, the current speed of the own vehicle V, the distance to the destination, an estimated arrival time to the destination, and the name of at least one building appearing in the forward scenery. The one or more graphic contents M2 are graphic contents indicative of lines and/or arrows, which are used to display information indicative of (i) the traveling direction of the own vehicle V and (ii) selection of lanes.

The head-up display 704 can be configured to display the virtual image M containing superimposed contents and non-superimposed contents. The superimposed contents are image contents linked to one or more specific focusing targets included in the forward scenery and superimposed on the one or more specific focusing targets. In contrast, the non-superimposed contents are image contents that are not linked to the one or more specific focusing targets included in the forward scenery and are not superimposed on the one or more specific focusing targets.

In the virtual image M illustrated as an example in FIG. 15, linear graphic contents, which are an example of the graphic contents M2, are superimposed on a lane on which the own vehicle V is traveling, and an information content indicative of the maximum speed limit for the current road of the own vehicle V, which is an example of the information contents M1, is located at a predetermined position of the virtual image M while being not superimposed on the graphic contents M2.

The HMI system 7 described above serves as a notifying unit for notifying information of the one or more occupants including the driver D in the own vehicle V.

Referring to FIGS. 1 and 2, the speaker 705 is configured to output voice related to information indicated by each of the meter panel 702, the main display device 703, and the head-up display 704. The speaker 705 can be configured to output voice, such as music and/or radio sound, which are not related to the information indicated by each of the meter panel 702, the main display device 703, and the head-up display 704.

The operation devices 706 are input devices that are not included in the operation switches 38, and operated quantities and operated states of the operation devices 706 are exempted from being detected by the operation sensors 35. Specifically, the operation devices 706 include, for example, switches mounted to the housing of the main display device 703 around the screen, and a transparent touch panel mounted to cover the screen of the main display device 703. The operation devices 703 may include switches mounted to a spoke of the steering wheel V24, and pointing devices, such as a touch panel, mounted to the center console.

The switches, pointing devices, and the touch panel of the operation devices 706 enable the one or more occupants, who are operating them, to enter various information items respectively corresponding to the switches, pointing devices, and touch panel.

The lighting system 8 includes a body ECU 801, headlamps 802, and blinkers 803.

The body ECU 801 includes a vehicular microcomputer comprised of a CPU, a ROM, a RAM, an input/output (I/O) interface, and other peripheral devices. The body ECU 801 is configured to control how the headlamps 802 light up in accordance with information inputted from the driving ECU 2 and/or the driving information input unit 3, and control how the blinkers 803 light up in accordance with information inputted from the driving ECU 2 and/or the driving information input unit 3, in particular information inputted from the blinker switch 382.

The motion control system 9 is configured to control motions of the own vehicle V, i.e., traveling behaviors of the own vehicle V, in accordance with information inputted by the driving ECU 2 and/or the driving information input unit 3.

Specifically, the motion control system 9 includes, for example, a drive system 91, a shift system 92, a brake system 93, and a steering system 94.

The drive system 91 includes a drive ECU 911 and a driving mechanism 912. The drive ECU 911 includes a vehicular microcomputer comprised of a CPU, a ROM, a RAM, an input/output (I/O) interface, and other peripheral devices. The drive ECU 911 is configured to receive, from the accelerator-pedal sensor or the driving ECU 2, an accelerator signal indicative of an acceleration request, and control operations of the drive mechanism 912 in accordance with the acceleration request. The drive mechanism 912 is configured to generate drive power that causes the system-installed vehicle V to travel. Specifically, the drive mechanism 912 includes an engine, i.e., an internal combustion engine, and one or more motors. That is, the system-installed vehicle V is any one of a gasoline-fueled vehicle, a diesel engine vehicle, a biofuel vehicle, a hydrogen engine vehicle, a hybrid vehicle, a battery electric vehicle (BEV), a fuel-cell vehicle, or other vehicles.

The shift system 92 includes a shift ECU 921 and a shift mechanism 922. The shift ECU 921 includes a vehicular microcomputer comprised of a CPU, a ROM, a RAM, an input/output (I/O) interface, and other peripheral devices. The shift ECU 921 is configured to receive, from the shift position sensor, a shift position signal indicative of the current shift position set by the shift lever or the driving ECU 2, and control operations of the shift mechanism 922 in accordance with the current shift position of the shift lever. The shift mechanism 922 is provided between the driving wheels of the wheels V3 and the drive mechanism 912 and includes an automatic transmission. Specifically, the shift ECU 921 is configured to control, in accordance with the shift position signal indicative of the current shift position set by the shift lever or the driving ECU 2, the shift mechanism 922 to perform (i) a first task of causing forward drive power generated by the drive mechanism 912 to transmit to the driving wheels for forward traveling of the own vehicle V, (ii) a second task of causing reverse drive power generated by the drive mechanism 912 to transmit to the driving wheels for rearward traveling of the own vehicle V, (iii) a third task of shutting off the drive power to the driving wheels to accordingly stop the own vehicle V, and/or (iv) a fourth task of changing a speed ratio between an input speed from the drive mechanism 912 to the shift mechanism 922 and an output speed outputted from the shift mechanism 922 to the driving wheels in forward movement of the own vehicle V. The shift system 92 can be configured as so-called shift-by-wire configuration.

The brake system 93 includes a brake ECU 931 and a brake mechanism 932. The brake ECU 931 includes a vehicular microcomputer comprised of a CPU, a ROM, a RAM, an input/output (I/O) interface, and other peripheral devices. The brake ECU 931 is configured to receive, from the brake-pedal sensor or the driving ECU 2, a braking signal indicative of a braking request, and control operations of the brake mechanism 932 in accordance with the braking request. The brake mechanism 932 includes a friction mechanism for each of the wheels V3. That is, the brake ECU 931 is configured to control, in accordance with the braking request, the friction mechanism for each wheel V3 to accordingly apply friction to each wheel V3, resulting in the own vehicle V being slowed down. The brake mechanism 932 can include a regenerative brake mechanism configured to rotate, by the kinetic energy of the own vehicle V, the driving wheels to accordingly slow down the own vehicle V due to load of the rotation of the driving wheels, and convert the kinetic energy of the own vehicle V into electrical power. The brake system 93 can be configured as so-called brake-by-wire configuration.

The steering system 94 includes a steering ECU 941 and a steering mechanism 942. The steering ECU 941 includes a vehicular microcomputer comprised of a CPU, a ROM, a RAM, an input/output (I/O) interface, and other peripheral devices. The steering ECU 941 is configured to receive, from the steering-angle sensor or the driving ECU 2, a steering signal indicative of a steering request, and control operations of the steering mechanism 942 in accordance with the steering request. That is, the steering ECU 941 is configured to control, in accordance with the steering request, the steering mechanism 942 to change the direction of each steered wheel, for example, each front wheel V3*a*, V3*b*, to accordingly change the traveling direction of the own vehicle V. The steering mechanism 942 can be configured to change the direction of each of the front and rear wheels V3*a*, V3*b*, V3*c*, and V3*d*. That is, the own vehicle V can be configured as a four-wheel steering vehicle. The steering system 94 can be configured as so-called steering-by-wire configuration.

Driving Control Based on Identification Results of at Least One of the ADAS Sensors 31 to 34

Figure 16:
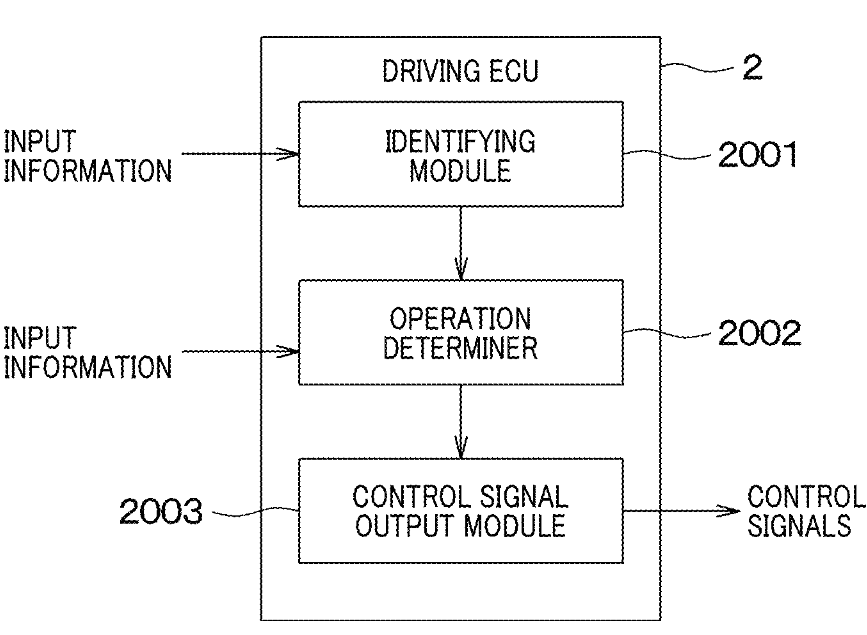
FIG. 16 is a block diagram illustrating a schematic functional configuration to be implemented by the driving ECU illustrated in FIG. 2.
Figure 17:
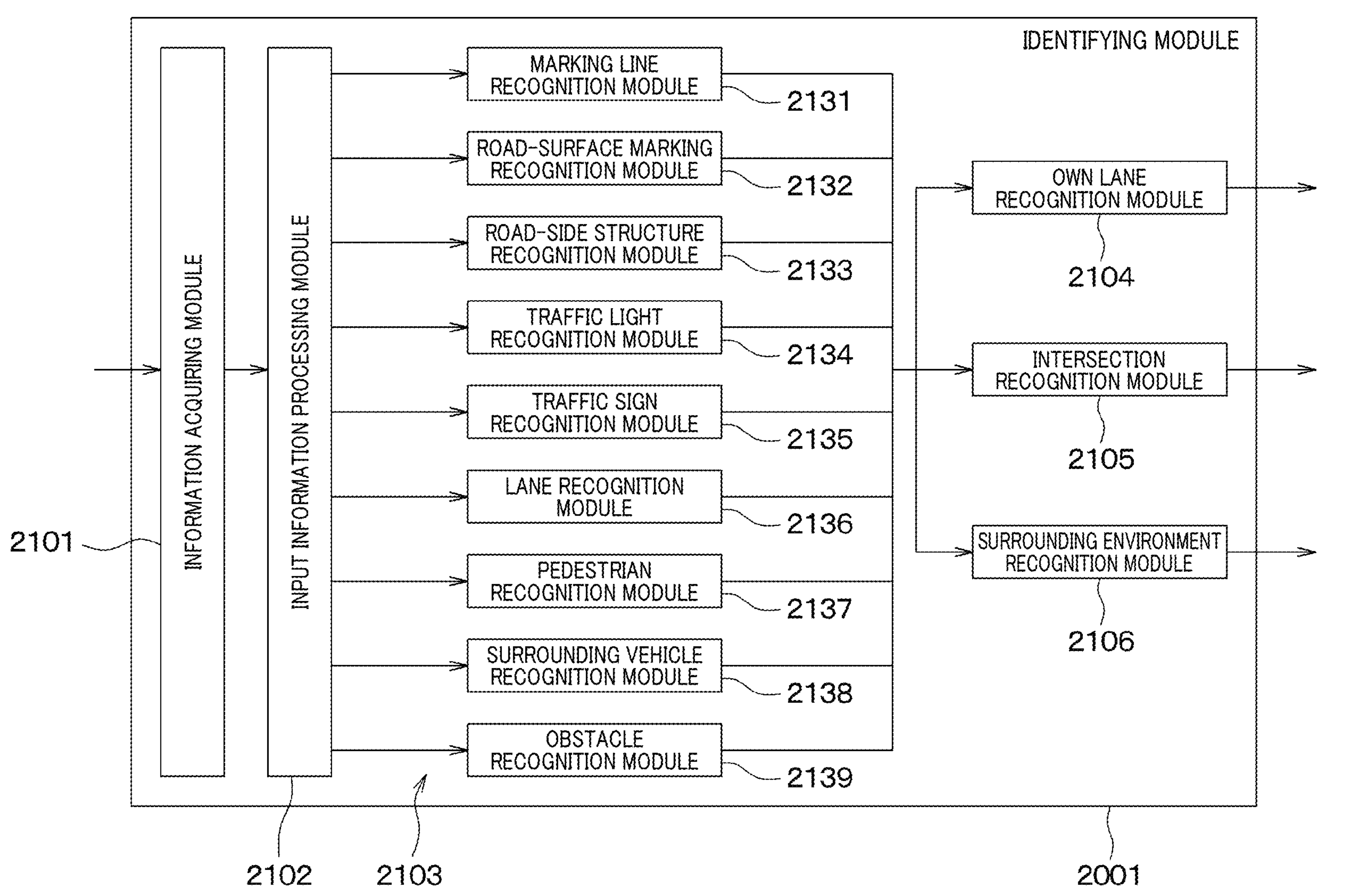
FIG. 17 is a block diagram illustrating a schematic functional configuration to be implemented by an identifying unit illustrated in FIG. 16.

FIGS. 16 and 17 schematically illustrate an example of functions implemented by the driving ECU 2. That is, the processor 21 executes the program instructions stored in the memory device 22 to accordingly implement the functions illustrated in FIGS. 16 and 17.

The following describes a summary of the autonomous driving of the own vehicle V carried out by the driving ECU 2 based on identification results of at least one of the ADAS sensors 31 to 34 around the own vehicle V.

Note that, in the exemplary embodiment, "identification" conceptually includes "detection", "classification", and "recognition" or "perception". Detection is to find a target object B based on at least one detection-point data cloud and/or images captured by the cameras 34. Detection of a target object B is to determine that there is a target object B, and not to identify the shape and/or attribute of the target object B. Classification of a target object B is to classify the shape and/or the attribute of the detected target object B into one of various object types, such as "humans", "vehicles", "buildings", and so on. In other words, a classified target object is a target object that has been detected and classified into one of the various object types. Recognition or perception of a target object B is to determine whether the detected and classified target object B should be considered in driving control of the own vehicle V.

Detection of an object can include sensing of an object. Detection can conceptually include classification and/or recognition (perception), classification can conceptually include detection and/or recognition (perception), and recognition can conceptually include detection and classification.

Referring to FIG. 16, the driving ECU 2 includes, as functional components implemented by the processor 21, an identifying module 2001, an operation determiner 2002, and a control signal output module 2003.

The identifying module 2001 is operative to perform an identifying task for one or more target objects B around the own vehicle V in accordance with information items inputted from the surrounding monitor sensors 31 to 34, the operation sensors 35, and the behavior sensors 36. The operation determiner 2002 is operative to determine, based on an identified result of the identifying module 2001 and the information items inputted from the operation sensors 35 and the behavior sensors 36, one or more control tasks that are required at present to control the own vehicle V. The one or more control tasks for example include a collision avoiding task, an emergency stop task, and a warning task for the driver D.

The control signal output module 2003 is operative to output control signals based on the determined control tasks to selected components of the vehicular system 1. The control signals include, for example, a signal indicative of the steering signal indicative of a steering amount, the braking signal indicative of the amount of braking, and a message code signal indicative of a warning message.

Referring to FIG. 17, the identifying module 2001 includes an input information acquiring module 2101, an input information processing module 2102, a target object recognition module 2103, an own lane recognition module 2104, an intersection recognition module 2105, and a surrounding environment recognition module 2106.

The information acquiring module 2101 acquires the information items inputted from the surrounding monitor sensors 31 to 34, the operation sensors 35, and the behavior sensors 36, and holds the acquired information items in a sequential order. The input information processing module 2102 applies one or more predetermined tasks, such as a noise removal task and/or a coordinate conversion task, to the information items held in the information acquiring module 2101.

The target object recognition module 2103 is operative to perform a target object recognition task in accordance with the information items subjected to the predetermined tasks.

Specifically, the target object recognition module 2103 includes, for example, a marking line recognition module 2131, a road-surface marking recognition module 2132, a road-side structure recognition module 2133, a traffic light recognition module 2134, a traffic sign recognition module 2135, a lane recognition module 2136, a pedestrian recognition module 2137, a surrounding vehicle recognition module 2138, and an obstacle recognition module 2139.

Figure 18:
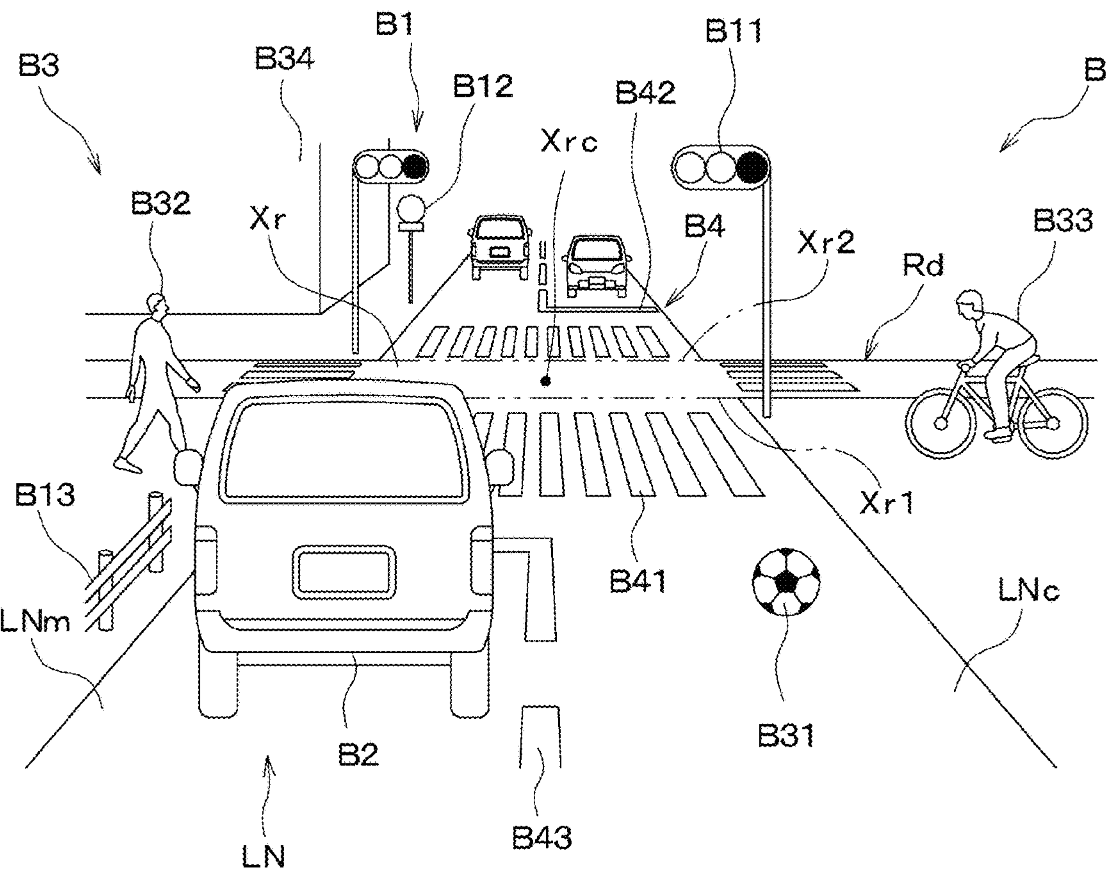
FIG. 18 is a schematic view illustrating a first example of target objects to be identified by the exemplary embodiment.
Figure 19:
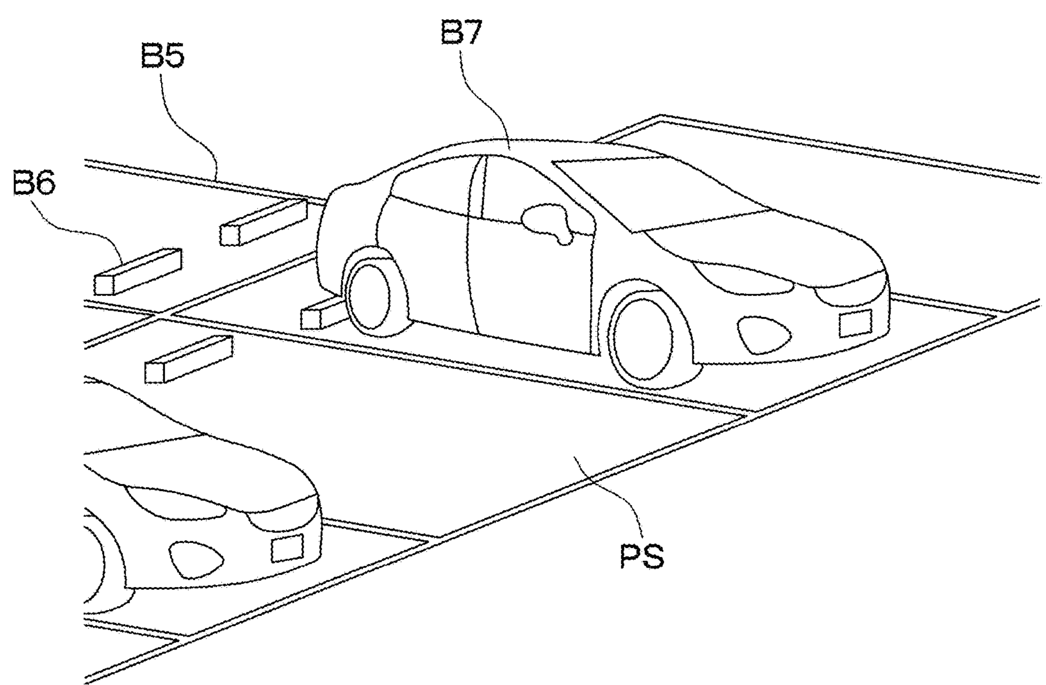
FIG. 19 is a schematic view illustrating a second example of target objects to be identified by the exemplary embodiment.

Target objects B to be recognized by the identifying module 2001 are illustrated as examples in FIG. 18 or FIG. 19.

Referring to FIG. 18, target objects B broadly include, for example, traffic-related three-dimensional objects B1, other vehicles B2, general three-dimensional objects B3, and road-surface markings B4. The target objects B to be recognized by the identifying module 2001 additionally include, as illustrated in FIG. 19, parking-slot segment lines B5, wheel stoppers B6, and parked vehicles B7, which are related to detection of the parking slots PS and/or execution of parking assistance. The parking-slot segment lines B5 are for example painted lines to define the shape and area of each parking slot PS. Each of the wheel stoppers B6 is a block-like solid installed in each parking space PS to stop wheels of a corresponding parked vehicle B7. Each of the parked vehicles B7 is a vehicle parked in the corresponding parking slot PS.

The traffic-related three-dimensional objects B1 are three-dimensional objects, such as traffic lights B11 and traffic signs B12, used for road-traffic safety. Each of the other vehicles B2 may become a target vehicle that the traveling own vehicle V tracks or an obstacle for the traveling own vehicle V, so that the parked vehicles B7 are excluded from the other vehicles B2. The general three-dimensional objects B3 are solid objects except for the traffic-related three-dimensional objects B1, the other vehicles B2, the wheel stoppers B6, and the parked vehicles V7, and may mainly constitute obstacles.

It is possible to recognize lanes LN in accordance with the recognized results of the target objects B that are acquired based on captured images. Specifically, although the parking slots PS or the lanes LN are different from the target objects B that are direct recognition targets by the ADAS sensors 31 to 34, these parking slots PS and the lanes LN can be indirect recognition targets based on the recognition results of the target objects B. The lanes LN as the indirect targets include, for example, an own lane LNm on which the own vehicle V is traveling and oncoming lanes LNc. The recognition targets to be recognized by the identifying module 2001 will be described in detail later.

The own lane recognition module 2104 is operative to recognize, based on the recognized results of the target objects B by the target object recognition module 2103, the location of the own vehicle V in a road in a width direction of the road; the road is a road in which the own vehicle V is traveling. The width direction of the road will be referred to as a road width direction, and a direction perpendicular to the road width direction will be referred to as a road extending direction. The road extending direction is a direction extending along the road, and can be referred to as a road extension direction or a road elongation direction. If the road Rd includes a plurality of lanes LN, the own lane recognition module 2104 is operative to recognize, as the own lane LNm, any one of the plural lanes LN arranged in the road width direction.

The intersection recognition module 2105 is operative to recognize, based on the recognized results of the target objects B by the target object recognition module 2103, an intersection Xr around the own vehicle V.

Specifically, the intersection recognition module 2105 is operative to recognize an intersection Xr that the own vehicle V is approaching in accordance with (i) whether there is a traffic light B11, (ii) which of color signal lights outputted from the traffic light B11 if it is determined that there is the traffic light B11, (iii) whether there is a stop line B42 as one of the road-surface markings B4, (iv) a location of an intersection entrance Xr1, (v) a location of an intersection exit Xr2, and (vi) traffic signs or marks, each of which indicates a corresponding traveling direction.

The surrounding environment recognition module 2106 is operative to recognize, based on the recognized results of the target objects B by the target object recognition module 2103, a surrounding environment around the own vehicle V, for example, how one or more obstacles are located around the own vehicle V.

These recognition results by the recognition modules 2103 to 2106 are used for the operation determiner 2002 that determines one or more control tasks that are required at present to control the own vehicle V.

Figure 20:
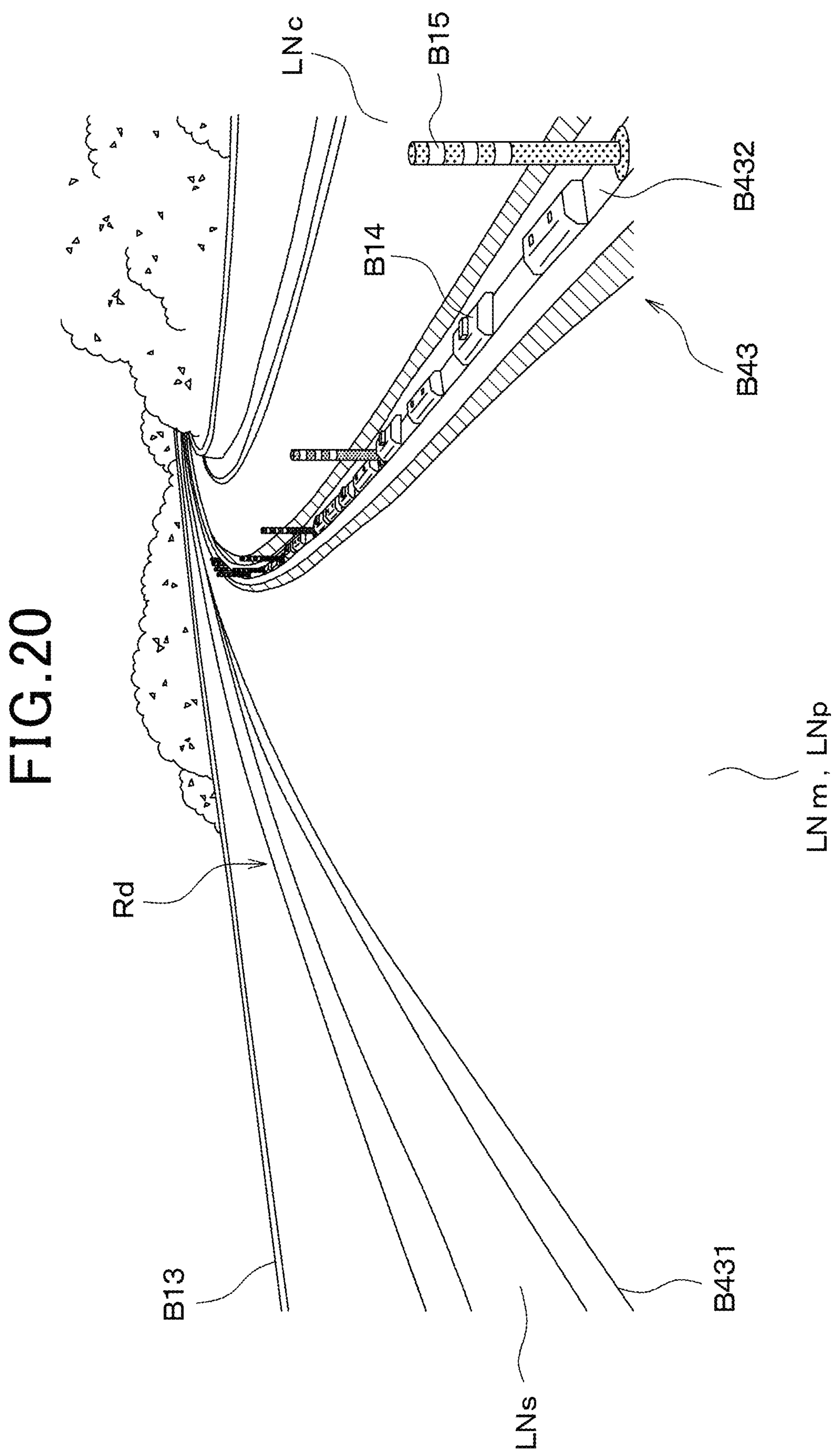
FIG. 20 is a schematic view illustrating a third example of target objects to be identified by the exemplary embodiment.

FIG. 18 is an example of forward scenery from the own vehicle V in a situation where the own vehicle V is approaching an intersection Xr that constitutes a crossroad and includes therein a signal light B11. An intersection Xr constituting a crossroad will be merely referred to as a cross intersection Xr. The recognition results of the signal light B11 and the traffic signs B12 included in the traffic-related three-dimensional objects B1 can be used for the HMI system 7 to notify information of the driver D and/or output warnings to the driver D. The recognition results of the signal light B11 and the traffic signs B12 included in the traffic-related three-dimensional objects B1 can also be used for the driving ECU 2 to perform motion control of the own vehicle V in the autonomous driving of the own vehicle V and/or in the driving assistance of the own vehicle V. The traffic-related three-dimensional objects B1 include, in addition to the signal lights B11 and the traffic signs B12, road-side structures B13, such as guardrails and curbstones. The traffic-related solid objects B11 also include, as illustrated in FIG. 20, road studs B14 and poles B15. The road studs may be recognized as obstacles depending on (i) the heights of the road studs and/or (ii) how the road studs are provided around the own vehicle V. The poles B15 are recognized as obstacles when the driving ECU 2 performs traveling control of the own vehicle V.

Referring to FIG. 18, the general three-dimensional objects B3 include, for example, on-road fallen objects B31, pedestrians B32, cyclists B33, and buildings B34. The on-road fallen objects B31, the pedestrians B32, and cyclists B33 are recognizes as obstacles when the driving ECU 2 performs traveling control of the own vehicle V. The buildings B34 are not recognized as obstacles, because the buildings B34 are located outside a road Rd, but may become contents to be superimposed on the forward scenery when the head-up display 704 displays the virtual image M.

Figure 21:
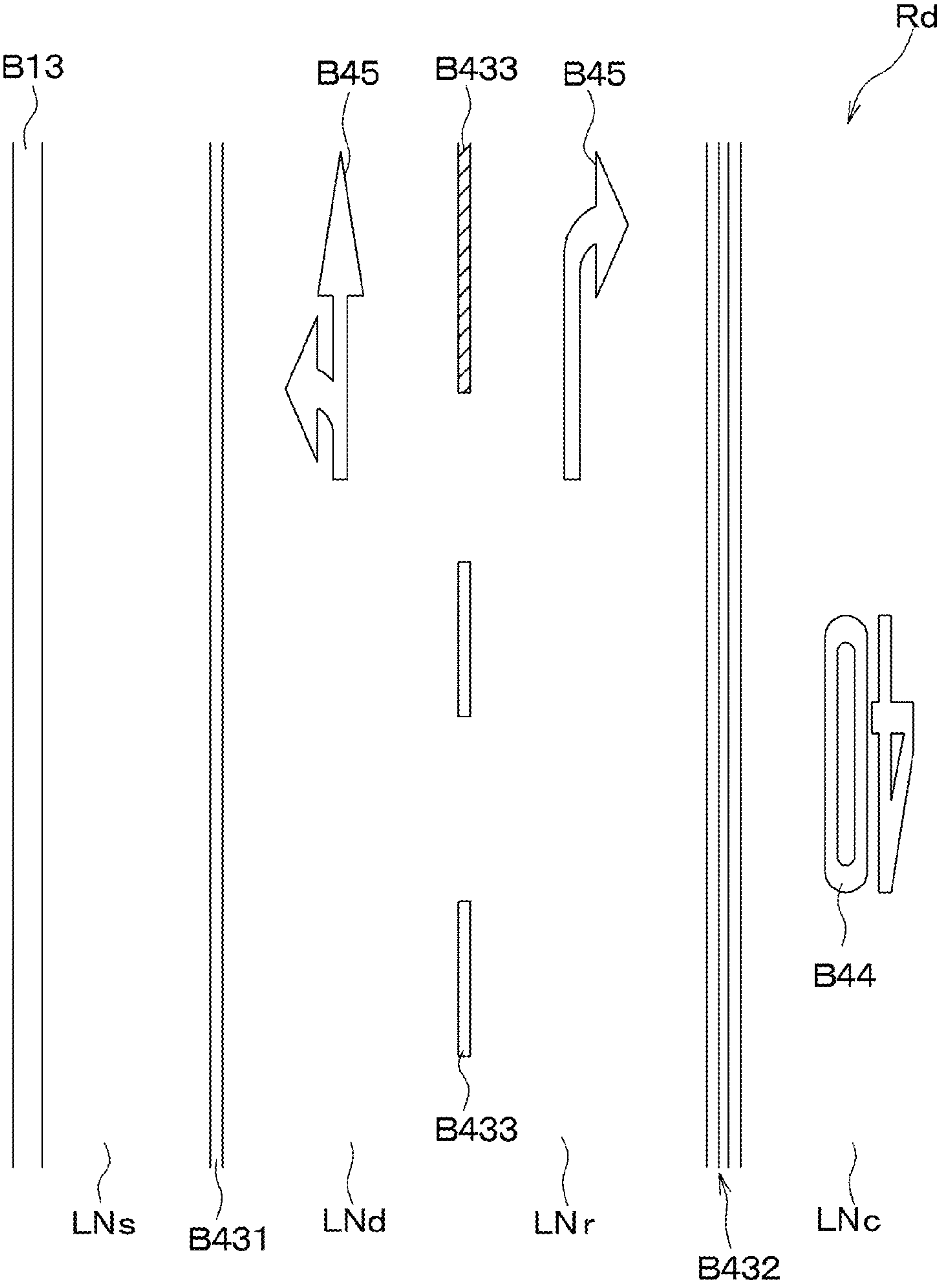
FIG. 21 is a schematic view illustrating a fourth example of target objects to be identified by the exemplary embodiment.

The road-surface markings B4 include, for example, pedestrian-crossing markings B41, stop lines B42, and road marking lines B43. The road-surface markings B41 additionally include, as illustrated in FIG. 21, letter markings B44 and symbol markings B45. The letter markings B44 include, for example, a numeral indicative of the maximum speed limit, vehicle traffic zones, such as “BUS ONLY”, or restriction letters, such as “STOP”. The symbol markings B45 include, for example, arrows indicating respective mandatory directions, and attention symbols for forward pedestrian crossings.

The recognition results of the road traffic markings B4 are used to estimate the location of each of the intersection entrance Xr1 and the intersection exit Xr2 and the location of the intersection center Xrc. The intersection entrance Xr1 represents an edge of a focusing intersection that the own vehicle V is going to enter. The focusing intersection is the nearest intersection Xr which (i) the own vehicle V is approaching and (ii) the own vehicle V is scheduled to pass through or is likely to pass through. An intersection which the own vehicle V is likely to pass through is, if no scheduled travel route and destination of the own vehicle V are determined by the navigation system 6, an intersection which is estimated, based on (i) a distance to the intersection from the own vehicle V and (ii) the speed of the own vehicle V, for the own vehicle V to pass through at a high probability. The intersection exit Xr2 represents an edge of the focusing intersection from which the own vehicle V is going to exit. The intersection center Xrc is the center of the focusing intersection.

Figure 22:
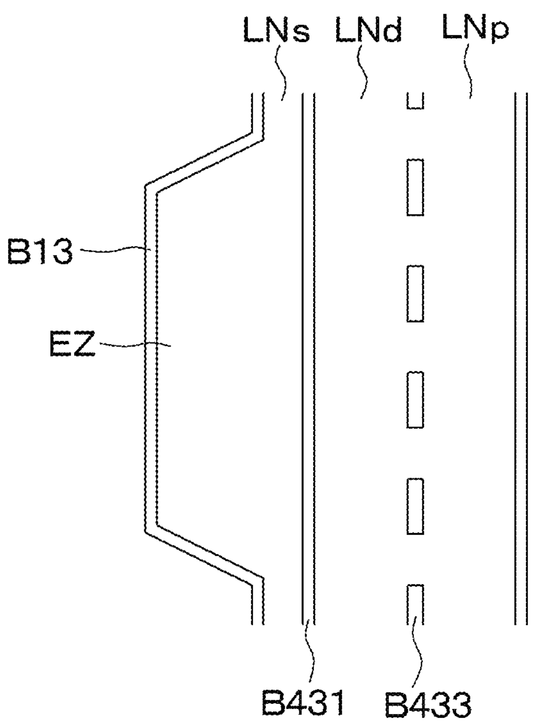
FIG. 22 is a schematic view illustrating a fifth example of target objects to be identified by the exemplary embodiment.
Figure 23:
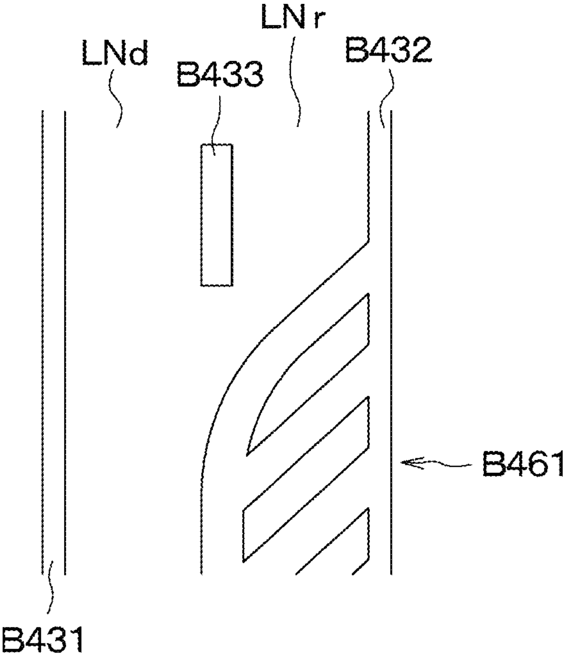
FIG. 23 is a schematic view illustrating a sixth example of target objects to be identified by the exemplary embodiment.

As illustrated in FIGS. 22 and 23, the road marking lines B43 include, for example, vehicle-road edge lines B431, centerlines B432, and lane lines B433. The vehicle-road edge lines B431 are provided for each vehicle-road, and they respectively show the left and right edges of the corresponding vehicle-road in the road width direction. The vehicle-road of a road Rd represents a section of the road Rd in which vehicles can travel. Each centerline B432 represents a line down the center of a two-way road, and divides the two-way road into two sections in the respective opposite traveling directions. Each centerline B432 is comprised of a single straight line pattern or a single broken line pattern, a double line pattern, or a triple line pattern. The lane lines B433 are provided for a road Rd with two or more lanes each way, and they divide the road Rd into two or more lanes each way. Each of the lane lines B433 is a painted white line or a painted yellow line. FIG. 20 illustrates, as an example, that a centerline B432 is comprised of a triple line pattern that is comprised of a white solid line and a pair of yellow lines located at both sides of the white line. The road studs B14 and the poles B15 are mounted on the white line of the triple line pattern of the centerline B432 illustrated in FIG. 20. FIG. 21 illustrates, as another example, that a centerline B432 is comprised of a double line pattern that is comprised of white solid lines, and the lane line B433 is comprised of a white broken line and a yellow solid line extending from the white broken line. It is possible to recognize, based on the recognition results of the road-side structures B13 and the road marking lines B43, (i) a traveling lane LNd or an own lane LNm on which the own vehicle V is traveling (see for example FIGS. 20 and 21), (ii) oncoming lanes LNc (see for example FIGS. 20 and 21), (iii) a passing lane LNp (see for example, FIG. 20), (iv) a right turn lane LNr (see FIG. 21), (v) a road shoulder LNs (see FIGS. 20 to 22), and (vi) an emergency parking zone EZ (see FIG. 22).

The road traffic markings B4 additionally include, for example, diversion zone markings, i.e., zebra zone markings, B461, safety zone markings B462, no trespassing zone markings B463, and no stopping zone markings B464.

The diversion zone marking B461 is painted on a road and indicates a diversion zone where it is necessary to guide the safe and smooth running of vehicles. As described above, the diversion zone marking B461 is a marking that indicates a diversion zone for guiding the safe and smooth running of vehicles, and vehicles are legally not prohibited from entering the diversion zone. The diversion zone marking B461 can be provided to be adjacent to (i) an intersection Xr, (ii) a junction of roads, or (iii) a fork in a road.

Figure 24:
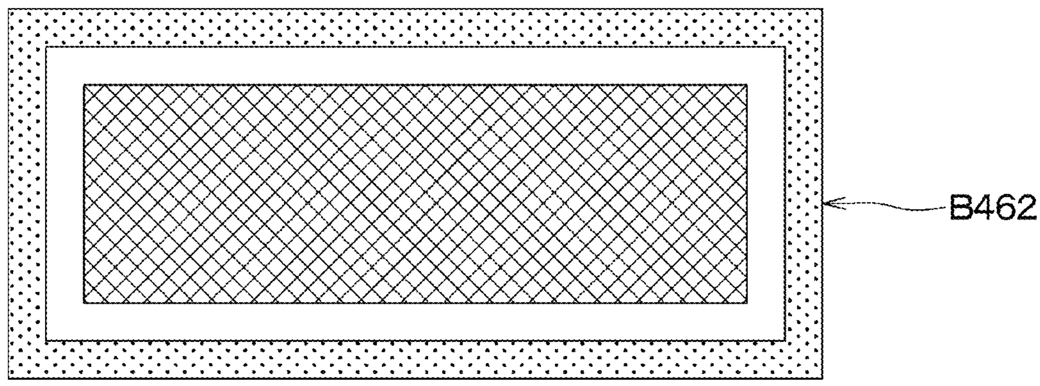
FIG. 24 is a schematic view illustrating a fifth example of a target object to be identified by the exemplary embodiment.

The safety zone marking B462 illustrated in FIG. 24 is used to indicate a safety zone. The safety zone represents, on a road, a zone provided to ensure safety of, for example, pedestrians B32, so that vehicles cannot regally enter the safety zone.

Figure 25:
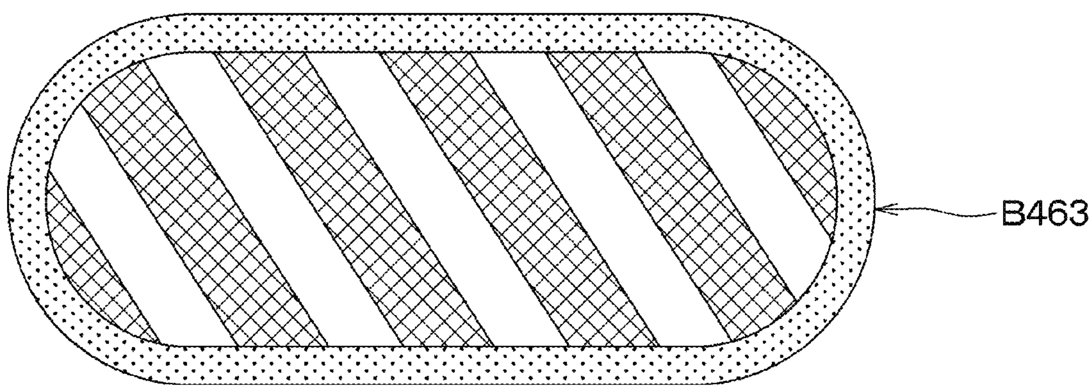
FIG. 25 is a schematic view illustrating a sixth example of a target object to be identified by the exemplary embodiment.

The no trespassing zone marking B463 illustrated in FIG. 25 is used to indicate a no entry zone. The no trespassing zone represents, on a road, a zone that cannot be used for traveling of vehicles, so that vehicles cannot enter the inside of the no trespassing zone.

Figure 26:
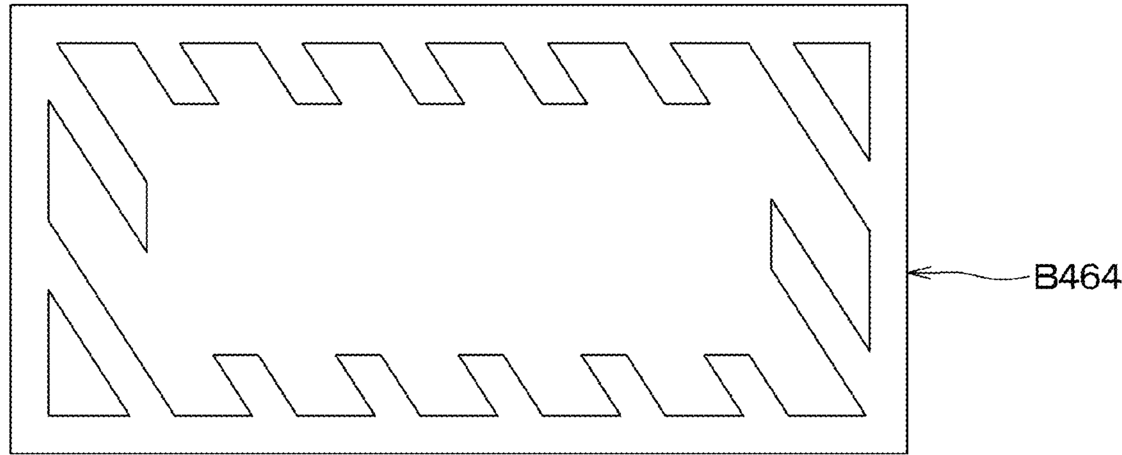
FIG. 26 is a schematic view illustrating a seventh example of a target object to be identified by the exemplary embodiment.

The no stopping zone marking B464 illustrated in FIG. 26 is used to indicate a no stopping zone. The no stopping zone represents, on a road, a zone that, when a vehicle is likely to be stopped depending on the situations in front of the vehicle, the vehicle should not enter. That is, when any vehicle waits for a traffic light or is in a traffic jam, the vehicle should not be stopped inside the no stopping zone marking B464.

FIG. 27 illustrates examples of the traffic signs B12. Each of the traffic signs B12 are installed adjacent to corresponding one or more roads Rd or installed above the corresponding one or more roads Rd. Each of the traffic signs B12 is comprised of a display board designed to offer corresponding necessary information to users who face the corresponding one of the traffic signs B12. The display board of each traffic sign B12 has (i) a designed shape, (ii) one or more colors painted on at least one major surface thereof, and (iii) one or more symbols. The one or more colors include, for example, white, black, red, blue, and yellow. In FIG. 27 cross hatching represents red, diagonal hatching represents blue, dot hatching represents yellow, and shaded portion represents black. Each symbol used in the traffic signs B12 includes, for example, one or more letters, one or more figures, and a combination of one or more letters and one or more figures.

FIG. 27 illustrates examples of the traffic signs B12 in Japan (JP), the European Union (EU), and the United States (US) categorized by meaning. As typical examples of the traffic signs B12 in EP, examples of the traffic signs B12 in German and/or France are used.

For example, traffic signs of respective JP, EU, and US, which means "DO NOT ENTER" or "NO ENTRY", have substantially the same design. In contrast, traffic signs of respective JP, EU, and US, which means "STOP" have substantially the same color and symbol, and the shape of the board of the traffic sign of EU is substantially identical to that of US, but the shape of the board of the traffic sign of JP is different from that of EU and US.

Traffic sings of respective JP and EU, which means "MAXIMUM SPEED LIMIT" by the letter "50", have substantially the same design except for the difference in letter's color, but a traffic sing of US, which means "SPEED LIMIT" by the letter "50", is different in the shape of the board and color from those of the respective JP and EU.

Traffic sings of respective JP, EU, and US, which means "RAILROAD CROSSING CAUTION", have a low level of commonality in design.

Traffic signs of respective EU and US, which means "NO RIGHT TURN", have substantially the same design, and there is no corresponding traffic sign in JP.

A traffic sign of JP, which means "GO ONLY IN DIRECTION OF ARROW", and indicates, using white arrows, the forward direction and left-turn direction, illustrated in FIG. 27, similarly represents "NO RIGHT TURN".

Precise recognition of the traffic signs B12 enables autonomous driving and/or advanced driving assistance to be implemented smoothly and safely. As described above, the designs of some of the traffic signs B12 vary considerably between JP, EU, and US. For this reason, the memory device 22 stores beforehand at least one database that stores information indicative of patterns of the traffic signs used in, for example, each of all the countries in the world or each of all the regions in the world. Pattern matching between a recognized traffic sign B12 and the information stored in the at least one database enables the meaning of the recognized traffic sign B12 to be detected. The at least one database can be configured as a common database all over the world, or can be comprised of a plurality of databases provided for all the counties in the world, each of the databases stores information indicative of patterns of the traffic signs used in the corresponding one of the countries in the world. The at least one database can be stored in a host computer in place of or in addition to the memory device 22; the driving ECU 2 is communicably connected, based on vehicle-to-everything technologies (V2X), to the host computer through the vehicular communication module 4. This enables the driving ECU 2 to freely access the at least one database stored in the host computer.

Figure 28:
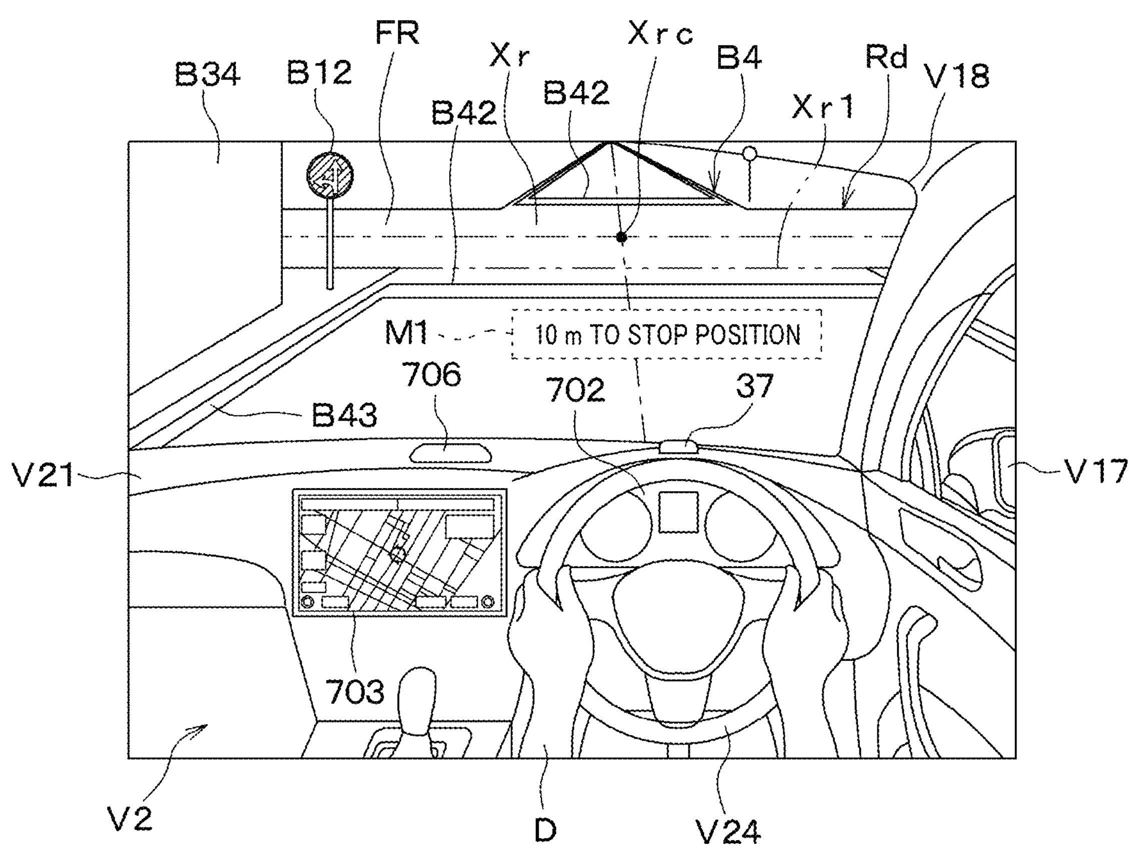
FIG. 28 is a schematic diagram illustrating a first example indicative of how to use recognition results of target objects.

FIG. 28 schematically illustrates a first example indicative of how to use the recognition results of target objects B in a situation where the own vehicle V is approaching a cross intersection. In this situation, the head-up display 704 can superimpose, on the stop line B42, an information content M1 indicating a message "10 m to a stop position" representing the distance of 10 m to the stop line B42. Additionally, the HMI system 7 can output, using the speaker 705, a sound message indicative of "10 m to stop line". This efficiently assists the driver D, who uses the advanced driving assistance, to reliably cause the own vehicle V to pause before the stop line B42. Alternatively, the sound message outputted from the HMI system 7 enables the one or more occupants of the own vehicle V to reliably grasp, beforehand, the occurrence of a temporary stop event of the own vehicle V, thus avoiding reduction in the comfort of the one or more occupants of the own vehicle V.

Figure 29:
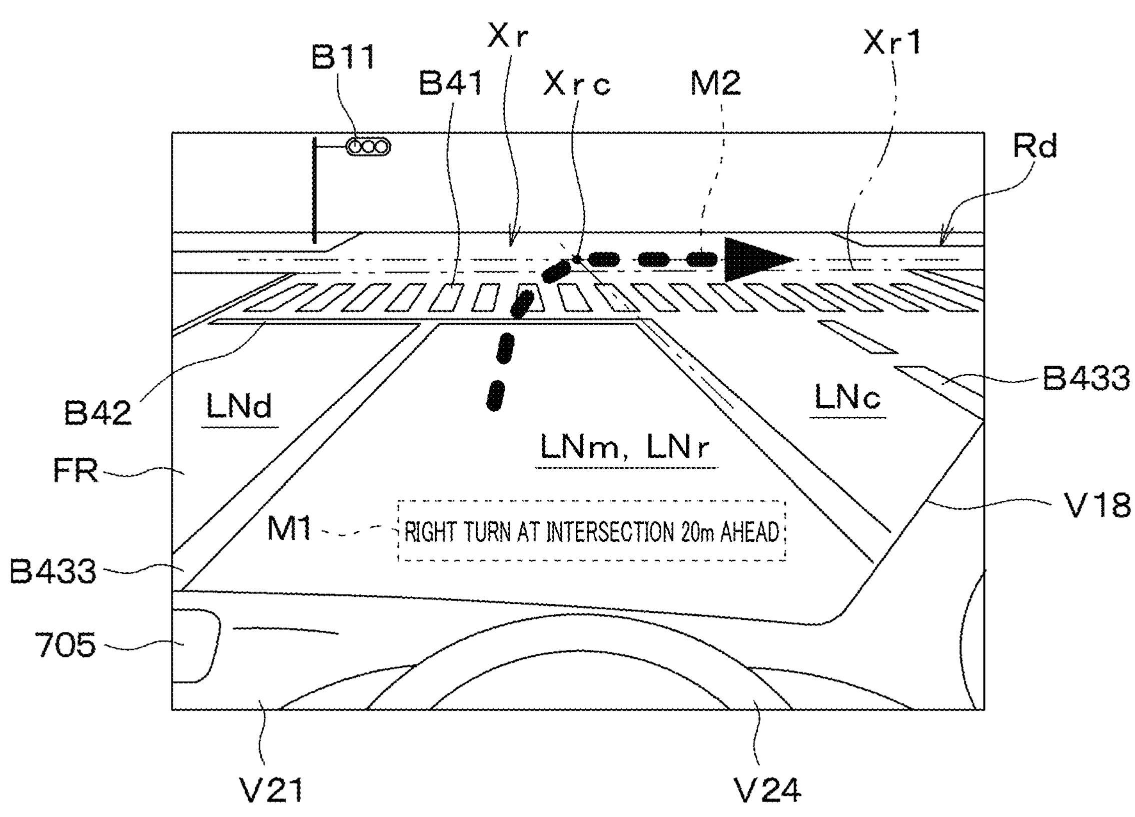
FIG. 29 is a schematic diagram illustrating a second example indicative of how to use recognition results of target objects.

FIG. 29 schematically illustrates a second example indicative of how to use the recognition results of target objects B in a situation where the own vehicle V is approaching a cross intersection with a traffic light B11 and the own vehicle V is going to turn right in the cross intersection. In this situation, the head-up display 704 can superimpose, on the own lane LN, i.e., the right-turn lane LNr, of the road surface FR in front of the own vehicle V, an information content M1 indicating a message "right turn at intersection 20 m ahead". The HMI system 7 also can output, using the speaker 705, a sound message indicative of "right turn at intersection 20 m ahead". Additionally, the HMI system 7 can superimpose, on the road surface FR, a graphic content M2 of an arrow extending from the right-turn lane LNr up to a target road Rd through the center Xrc of the intersection or thereabout. This efficiently offers, to the one or more occupants including the driver D of the own vehicle V, the traveling direction guidance of the own vehicle V and/or an advance notice of the behavior of the own vehicle V subjected to lateral acceleration during right turning. This therefore enables the one or more occupants of the own vehicle V to reliably grasp, beforehand, the occurrence of the behavior of the own vehicle V, thus avoiding reduction in the comfort of the one or more occupants of the own vehicle V.

Referring to FIG. 17, the target object recognition module 2103 is operative to recognize the type and the state of at least one target object B in accordance with the recognition results of the at least one target object B and the HD map information stored in the HD map information database 5. The state of the at least one target object B includes, for example, positional information about the at least one target object B. The positional information about the at least one target object B includes, for example, the distance of the at least one target object B relative to the own vehicle V, the relative position of the at least one target object B relative to the own vehicle V, and, if the at least one target objects B is one of the plural lanes LN, the position of one of the lanes LN.

Specifically, the marking line recognition module 2131 of the target object recognition module 2103 is operative to recognize the road marking lines B43 in a peripheral region around the own vehicle V, which includes the road surface FR of a road Rd located on the traveling course of the own vehicle V. For example, the marking line recognition module 2131 is operative to recognize, for example, whether each of the vehicle-road edge lines B431, the centerlines B432, and/or the lane lines B433, which are illustrated in FIGS. 20 to 23, (i) has white or yellow, (ii) is a solid line or a dashed line, (iii) has a single line pattern or a multiple line pattern. Because the recognition technologies of the road marking lines B43 are well-known at the time of filing the present application, detailed descriptions of the recognition technologies of the road marking lines B43 are omitted in the present disclosure.

The road-surface marking recognition module 2132 of the target object recognition module 2103 is operative to recognize the type, the meaning, and the position of each of the road-surface markings B4 except for the road marking lines B43; the recognition targets of the road-surface marking recognition module 2132 include, for example, the pedestrian-crossing markings B41, the stop lines B42, and the symbol markings B45.

The road-side structure recognition module 2133 is operative to recognize the type and the position of at least one road-side structure B13 located around the own vehicle V in accordance with, for example, at least one of (i) the recognition results based on the images captured by cameras 34, (ii) the recognition results based on the at least one detection-point data cloud detected by the laser-radar sensor 33, and (iii) the HD map information stored in the HD map information database 5.

The traffic light recognition module 2134 is operative to recognize (i) whether a traffic light B11 is located on the traveling course of the own vehicle V and (ii) the position of the traffic light B11 and which of the color signal lights outputted from the traffic light B11 if it is recognized that the signal light B11 is located on the traveling course of the own vehicle V.

The traffic sign recognition module 2135 is operative to recognize the traffic signs B12 located around the own vehicle V.

The lane recognition module 2136 is operative to perform a lane recognition task of recognizing the number of lanes LN in a road Rd in which the own vehicle V is traveling, and the type of each lane LN in the road Rd. That is, the lane recognition module 2136 is operative to perform the lane recognition task in accordance with, for example, (i) the recognition results based on the images captured by the front camera CF of the cameras 34, (ii) the recognition results based on the at least one detection-point data cloud detected by the laser-radar sensor 33, and (iii) the HD map information stored in the HD map information database 5.

Specifically, the lane recognition module 2136 can be normally operative to perform the lane recognition task in accordance with the recognition results based on sed on the images captured by cameras 34 or, if necessary arises, perform a sensor-fusion lane recognition task in accordance with combination of (i) the recognition results based on the images captured by the front camera CF of the cameras 34 and at least one of (ii) the recognition results based on the at least one detection-point data cloud detected by the laser-radar sensor 33 and (iii) the HD map information stored in the HD map information database 5.

The pedestrian recognition module 2137 is operative to recognize one or more pedestrians B32 located around the own vehicle V. The surrounding vehicle recognition module 2138 is operative to recognize one or more other vehicles B2 located around the own vehicle V. The obstacle recognition module 2139 is operative to recognize one or more obstacles, such as one or more on-road fallen objects B31.

Hereinafter, target objects B to be recognized by the driving ECU 2 for collision avoidance except for protective target objects are called "obstacles". Such protective target objects may include humans as protective targets, such as pedestrians B32 and cyclists B33. Pedestrians B32 as the protective target objects include "lying humans" who are lying on the road Rd. One or more other vehicles B2 including parked vehicles B7 can be each included in the "obstacles" independently of whether there is at least one occupant in the corresponding other vehicle B2. Each of the pedestrian recognition module 2137, the surrounding vehicle recognition module 2138, and the obstacle recognition module 2139 can perform such a sensor-fusion task of recognizing a corresponding one of recognition targets.

How each of the traffic light recognition module 2134, the traffic sign recognition module 2135, the lane recognition module 2136, the pedestrian recognition module 2137, the surrounding vehicle recognition module 2138, and the obstacle recognition module 2139 recognizes corresponding one or more target objects is well-known at the time of filing the present application, and therefore detailed descriptions of how each of the modules 2134 to 2139 recognizes corresponding one or more target objects are omitted in the present disclosure.

Collision-Avoidance Assistance Control

The following describes, in detail, collision-avoidance assistance control carried out by the driving ECU 2 that is executing the driving assistance in the SAE level 1 or 2. The collision-avoidance assistance control for example includes brake assistance control that assists collision-avoidance operations of one or more occupants including the driver D of the own vehicle V. The collision-avoidance assistance control additionally includes, for example, collision-avoidance control, in other words, pre-crash safety control (PCS control), including braking control and/or steering control through the corresponding components of the vehicular system 1, in response to determination that there are no occupant's collision-avoidance operations.

Each or the combination of the driving ECU 2 serving as a control apparatus according to the present embodiment, (ii) computer programs, i.e., computer-program instructions, to be executed by the driving ECU 2, i.e., the processor 21, according to the present embodiment, and (iii) a storage medium storing the computer programs according to the present embodiment will also be collectively referred to as the present embodiment.

The present embodiment is configured to execute collision-avoidance assistance operations in accordance with detection results or recognition results of one or more target objects B located in the traveling course of the own vehicle V. The collision-avoidance assistance operations may include a collision possibility notification operation and/or collision-avoidance action assistance operations. The collision possibility notification operation is that the HMI system 7 issues, in at least one of a visible format and an audible format, a notification, to the one or more occupants including the driver D, related to a possibility or a risk that the own vehicle V may collide with a recognized target object. For example, the meter panel 702 and/or head-up display 704 display a possibility that the own vehicle V may collide with a recognized target object. The collision possibility notification will also be referred to as simply as "notification". The "notification" may include "warning". The warning represents a higher warning level of notification for the one or more occupants than normal notification.

The collision-avoidance action assistance operations represent intervening operations to the vehicle actions for collision avoidance, such as brake-control operations, brake-assistance operations, and/or steering-control operations.

Referring to FIGS. 2 and 16, the identifying module 2001, which serves as a detection unit, is operative to detect and recognize one or more obstacles located around the own vehicle V. Specifically, the identifying module 2001 is configured to recognize the existence, type, size, and moving state of each obstacle located around the own vehicle V. The moving state of an obstacle may include the relative speed of the obstacle relative to the own vehicle V, and the relative moving direction of the obstacle relative to the own vehicle V. The identifying module 2001 or the operation determiner 2002 can be operative to calculate a ground speed, i.e., an absolute speed, and a moving direction of each obstacle located around the own vehicle V based on information about (i) the relative speed and relative moving direction of the corresponding obstacle and (ii) information about the moving speed and moving direction of the own vehicle V.

The operation determiner 2002 is operative to determine whether there is a collision possibility between the own vehicle V and an obstacle detected and recognized by the identifying module 2001 in accordance with, for example, (i) the absolute speed, moving direction, relative speed, and relative moving direction of the obstacle and (ii) the moving speed and moving direction of the own vehicle V.

The operation determiner 2002 is additionally operative to determine the operation details of each selected system and/or unit included in the vehicular system 1, such as the operation details of each of the HMI system 7 and the motion control system 9 in accordance with the result of the determination of whether there is a collision possibility, i.e., a risk of collision, between the own vehicle V and the obstacle.

Specifically, the operation determiner 2002 can be operative to determine, upon it being determined that there is a collision possibility between the own vehicle V and the obstacle, to instruct the HMI system 7 to issue the notification related to the collision possibility between the own vehicle V and the obstacle. Additionally, the operation determiner 2002 can be operative to determine, upon it being determined that there is a collision possibility between the own vehicle V and the obstacle, to cause, if necessity arises, the motion control system 9 to execute the collision-avoidance action assistance operations.

Then, the control signal output module 2003 is operative to generate control signals based on the determined operation details for each selected system and/or unit included in the vehicular system 1, and output the generated control signals, i.e., control instructions, to the corresponding selected system and/or unit included in the vehicular system 1.

Figure 30:
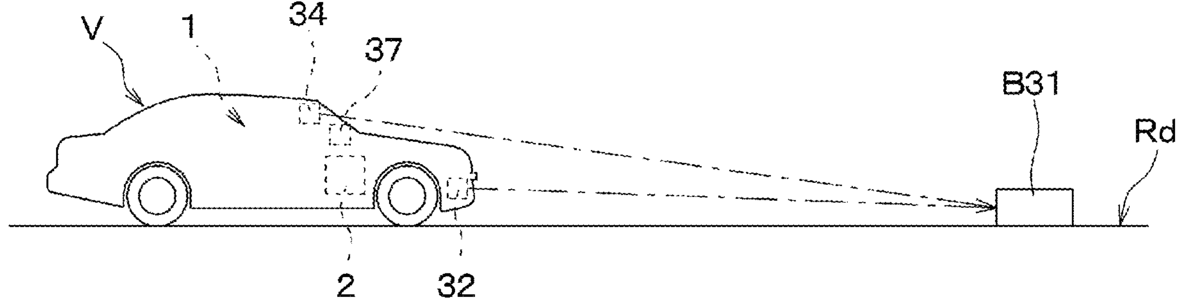
FIG. 30 is a view schematically illustrating a situation where there is an on-road fallen object on a road located on a traveling course of the vehicle according to the present embodiment.

FIG. 30 schematically illustrates a situation where there is an on-road fallen object B31 on the road Rd located on the traveling course of the own vehicle V. As illustrated in FIG. 30, the on-road fallen object B31 can be detected by the radar sensor 32 and/or the at least one camera 34. The on-road fallen object B31, which is detected by the radar sensor 32 and/or the at least one camera 34, may be a low-height object defined as an object that has fallen on the road Rd and has a height that is sufficiently low that the own vehicle (V) is enabled to pass over the on-road fallen object B31. Such a low-height object may have, for example, a height being within a predetermined height range from approximately 15 to 50 cm, a lateral width being within a predetermined lateral-width range from approximately 30 cm to 2.2 m, and a depth being within a predetermined depth range from approximately 30 cm to 2.2 m. These dimension-range examples of such a low-height object are used to distinguish the low-height object from other objects, such as speed bumps and/or road studs, and therefore dimensions of each low-height object according to the present embodiment are not limited to the dimension examples.

Let us assume that the driving ECU 2, i.e., the operation determiner 2002, determines that there is a collision possibility between the own vehicle V and such a low-height object, so that the HMI system 7 executes the notification related to the possible collision between the own vehicle V and the low-height object.

In this assumption, there may be no collision-avoidance operations by the one or more occupants, such as the driver D, of the own vehicle V even if the notification is executed by the HMI system 7. It may be difficult for the radar sensor 32 and the at least one camera 34 to detect such a low-height object. If any one of the radar sensor 32 and the at least one camera 34 does not detect such a low-height object, the present situation around the own vehicle V is an uncertain situation where it is difficult to reliably determine that there are one or more obstacles. Under this uncertain situation, execution of the collision avoidance task, such as brake-control operations and/or steering-control operations, would result in the one or more occupants feeling uncomfortable.

From this viewpoint, the present embodiment is configured to determine, even if it is determined that there is a collision possibility between the own vehicle V and a detected obstacle, not to instruct the motion control system 9 to execute the collision-avoidance action assistance operations as long as it is determined that (i) the obstacle is a low-height object and (ii) there are no executions of occupant's collision-avoidance operations.

Specifically, the present embodiment is configured to determine whether the one or more occupants execute one or more collision-avoidance operations after the notification. Then, the present embodiment is configured to determine not to instruct the motion control system 9 to execute the collision-avoidance action assistance operations upon determination that (i) the one or more occupants execute no collision-avoidance operations after the notification and (ii) the obstacle is such a low-height object.

That is, upon determination that (i) the one or more occupants execute no collision-avoidance operations after the notification and (ii) the obstacle is such a low-height object, the present embodiment is configured to entrust the one or more occupants including the driver D to execute or not to execute the collision-avoidance task. In other words, the present embodiment is configured such that (i) occupant's operating conditions and (ii) determination of whether the detected obstacle is such a low-height object B31 fallen on a road are used as determination factors of whether to execute the collision-avoidance operations.

This configuration of the present embodiment interrupts the intervention of the vehicular system 1 and entrusts operations and/or determination of the one or more occupants, such as the driver D, thus making a suitable response to detection of an obstacle. The present embodiment therefore smoothly avoids undesired vehicular-system's interventions to driving control of the own vehicle V, making it possible to improve convenience of the vehicular system 1 to the one or more occupants.

First Specific Functional Configuration

Figure 31:
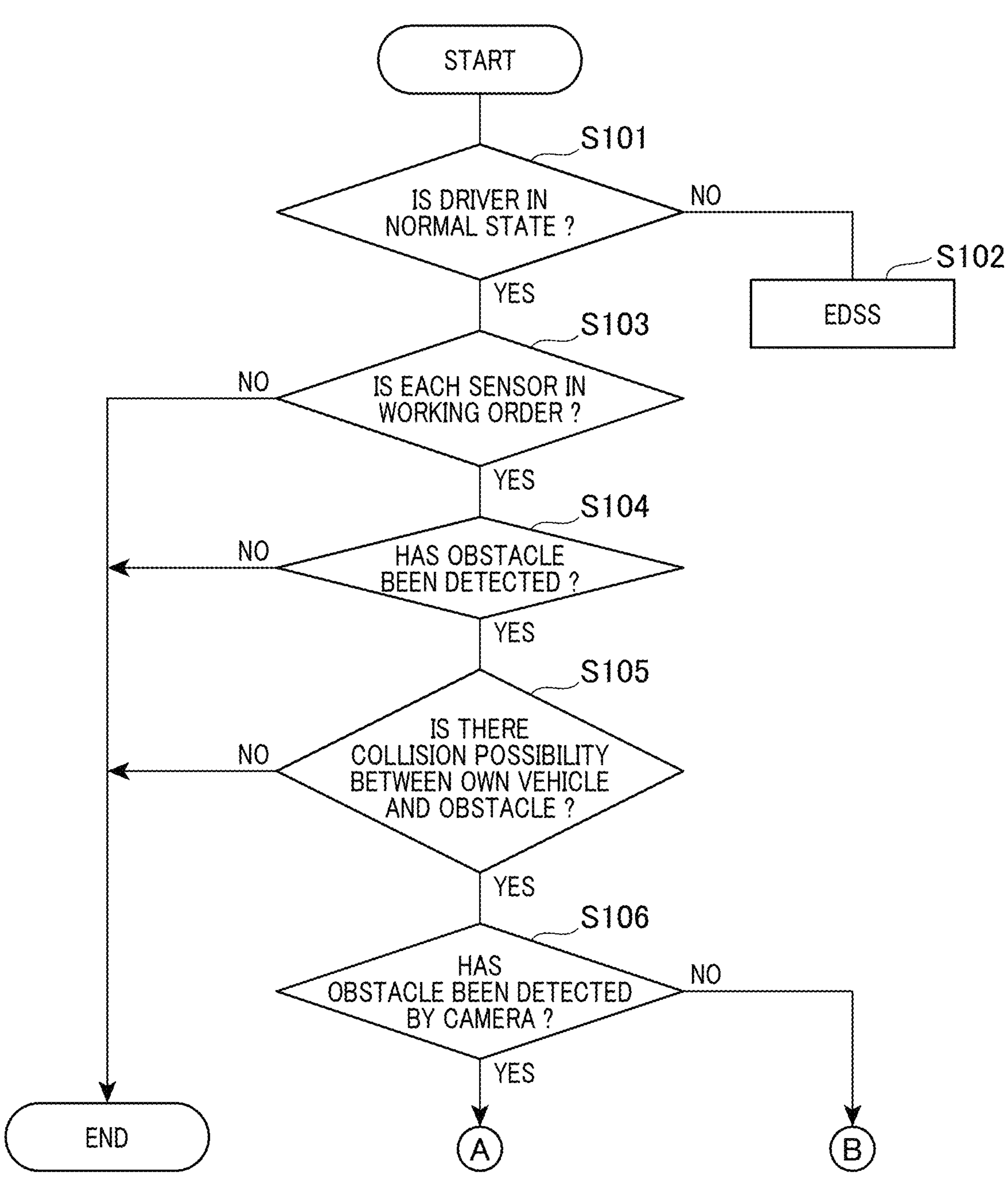
Figure 32:
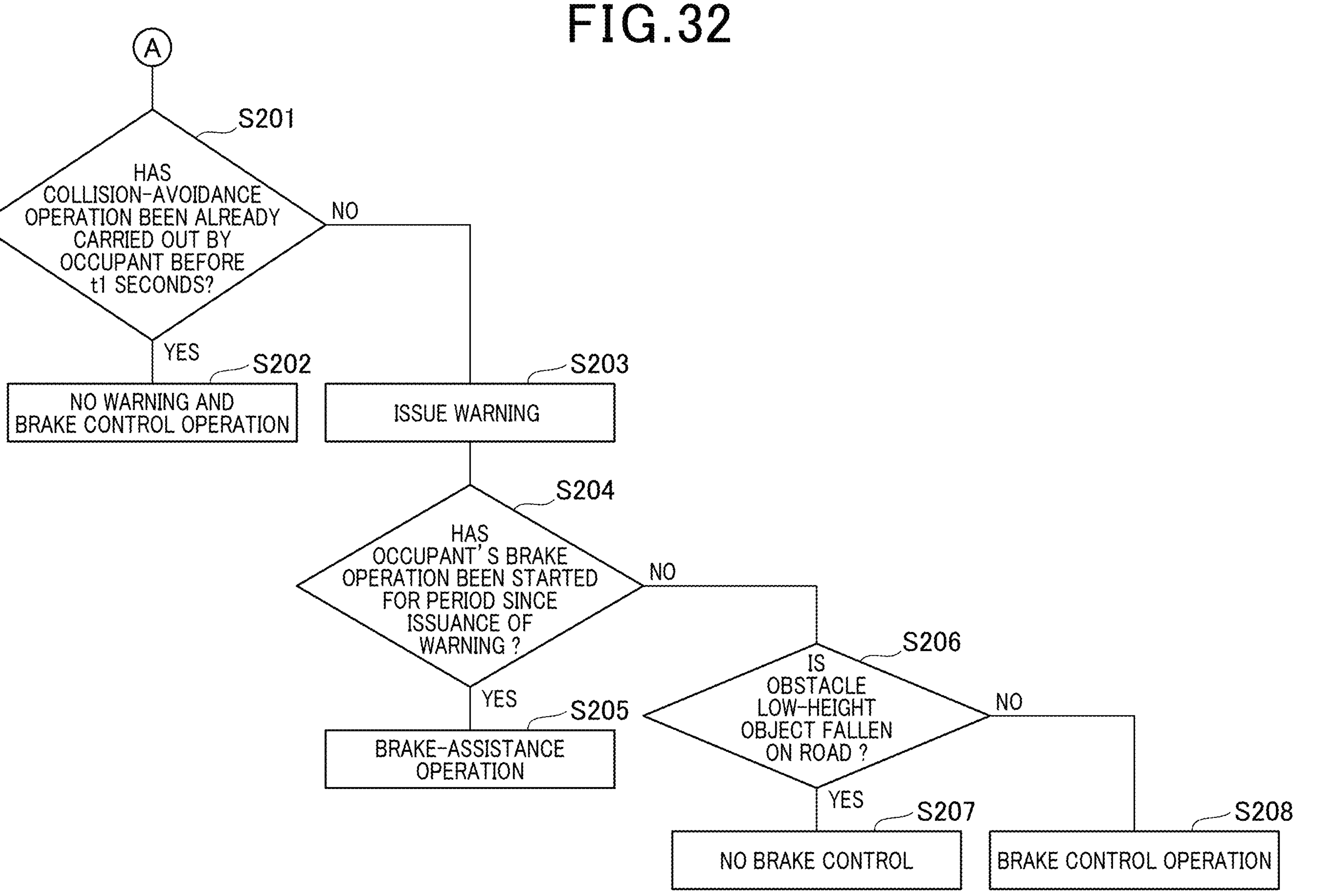

The following describes a first specific functional configuration of the driving ECU 2 in accordance with FIGS. 31 to 33. In FIG. 31 and the subsequent figures, reference character S is an abbreviate for Step. For example, the processor 21 is programmed to cyclically read a vehicle control program, i.e., vehicle control program instructions, stored in the memory device 22 to sequentially execute, for each cycle, operations of a vehicle control routine illustrated in FIGS. 31 to 33 corresponding to the vehicle control program instructions.

When starting the vehicle control routine illustrated in FIG. 31, the processor 21 determines whether an overall state of the driver D is normal in accordance with, for example, the driver's state parameters detected by the driver-state monitor 37 in step S101. Specifically, the processor 21 determines whether the overall state of the driver D is an abnormal state required to cause the own vehicle V to emergency-travel in a limp-home mode toward a selected road shoulder LNs (see FIG. 21) or a selected emergency parking zone EZ (see FIG. 22).

In response to determination that the overall state of the driver D is not normal, i.e., is the abnormal state (NO in step S101), the processor 21 serves as an Emergency Driving Stop System (EDSS) to cause the own vehicle V to emergency-travel in the limp-home mode toward a selected road shoulder LNs or a selected emergency parking zone EZ in step S102, and thereafter terminates the vehicle control routine.

Otherwise, in response to determination that the overall state of the driver D is normal, i.e., is a normal state (YES in step S101), the processor 21 determines that the driver D holds a posture suitable for the present SAE level being executed or is ready to immediately take up the posture suitable for the present SAE level being executed. The vehicle control routine proceeds to step S103 after the determination of step S102 is affirmative.

In step S103, the processor 21 determines whether each of the radar sensor 32 and the at least one camera 34 is in working order, i.e., functions normally. In other words, the processor 21 determines whether no anomaly and malfunction has been found in each of the radar sensor 32 and the at least one camera 34 in step S103.

In response to determination that at least one of the radar sensor 32 and the at least one camera 34 is out of working order, i.e., an anomaly or a malfunction has been found in at least one of the radar sensor 32 and the at least one camera 34 (NO in step S103), the processor 21 temporarily terminates the vehicle control routine.

Otherwise, in response to determination that each of the radar sensor 32 and the at least one camera 34 is in working order, i.e., no anomaly and malfunction has been found in each of the radar sensor 32 and the at least one camera 34 (YES in step S103), the vehicle control routine proceeds to step S104.

In step S104, the processor 21 determines whether an obstacle has been detected thereby, i.e., the identifying module 2001 thereof based on the information items inputted from, for example, at least one of the radar sensor 32 and the at least one camera 34.

In response to determination that no obstacles have been detected thereby (NO in step S104), the processor 21 temporarily terminates the vehicle control routine.

Otherwise, in response to determination that an obstacle has been detected thereby (YES in step S104), the processor 21 recognizes, based on the information items inputted from at least one of the radar sensor 32 and the at least one camera 34, a height, a lateral width, and a depth of the obstacle in step S104. Thereafter, the vehicle control routine proceeds to step S105.

In step S105, the processor 21 determines, using one of collision determination methods, whether there is a collision possibility between the own vehicle V and the obstacle in accordance with, for example, (i) the absolute speed, moving direction, relative speed, and relative moving direction of the obstacle and (ii) the moving speed and moving direction of the own vehicle V. Because the collision determination methods are well known by skilled persons in the art, more detailed descriptions of each of the well-known collision determination methods are omitted in the present disclosure.

In response to determination that there is no collision possibility between the own vehicle V and the obstacle (NO in step S105), the processor 21 temporarily terminates the vehicle control routine.

Otherwise, in response to determination that there is a collision possibility between the own vehicle V and the at least one obstacle (YES in step S105), the processor 21 predicts, based on, for example, (i) the absolute speed, moving direction, relative speed, and relative moving direction of the obstacle and (ii) the moving speed and moving direction of the own vehicle V, (i) a collision position on the road Rd at which the own vehicle V will collide with the obstacle and (ii) a collision point of time at which the own vehicle V will collide with the obstacle at the predicted collision position.

Additionally, the processor 21 determines whether the obstacle, which is determined to be likely to collide with the own vehicle V, has been detected by the at least one camera 34 in step S106.

In response to determination that the obstacle, which is determined to be likely to collide with the own vehicle V, has been detected by the at least one camera 34 (YES in step S106), the vehicle control routine proceeds to step S201 illustrated in FIG. 32.

Specifically, referring to FIG. 32, the processor 21 determines whether at least one collision-avoidance operation has been already carried out by the one or more occupants including the driver D a predetermined time t1 before the predicted collision point of time in step S201. For example, the predetermined time t1 can be set to, for example, 3 seconds, but can be varied depending on, for example, the relative speed of the obstacle relative to the own vehicle V.

In response to determination that at least one collision-avoidance operation has been already carried out by the one or more occupants including the driver D the predetermined time t1 before the predicted collision point of time (YES in step S201), the vehicle control routine proceeds to step S202.

In step S202, the processor 21 determines not to instruct the motion control system 9 to execute the collision-avoidance action assistance operations, such as a warning operation and/or a brake control operation. This enables the collision-avoidance task to be left for the at least one collision-avoidance operation of the one or more occupants including the driver D.

Otherwise, in response to determination that no collision-avoidance operations have been carried out by the one or more occupants including the driver D yet the predetermined time t1 before the predicted collision point of time (NO in step S201), the vehicle control routine proceeds to step S203.

In step S203, the processor 21 determines to instruct the vehicular system 1 to issue a warning related to the collision possibility between the own vehicle V and the obstacle, resulting in the HMI system 7 issuing a warning related to the collision possibility between the own vehicle V and the obstacle.

Following the operation in step S203, the processor 21 determines whether an occupant's brake operation as one of the collision-avoidance operations has been started for a predetermined period since the issuance of the warning in step S204.

In response to determination that an occupant's brake operation has been started for the predetermined period since the issuance of the warning (YES in step S204), the vehicle control routine proceeds to step S205.

In step S205, the processor 21 determines to instruct the vehicular system 1, i.e., the braking system 93, to execute the brake-assistance operation.

Otherwise, in response to determination that no occupant's brake operation has been started for the predetermined period since the issuance of the warning (NO in step S204), the vehicle control routine proceeds to step S206.

In step S206, the processor 21 determines whether the obstacle, which is determined to be likely to collide with the own vehicle V, is a low-height object B31; the low-height object B31 is defined as an object that has fallen on the road Rd and has a height that is sufficiently low that the own vehicle (V) is enabled to pass over the obstacle.

For example, the processor 21 determines that the obstacle, which is determined to be likely to collide with the own vehicle V, is the low-height object B31 upon determination that (I) The height of the obstacle recognized in step S104 is within the predetermined height range (II) The lateral width of the obstacle recognized in step S104 is within the predetermined lateral-width range (III) The depth of the obstacle recognized in step S104 is within the predetermined depth range As another example, the processor 21 can determine that the obstacle, which is determined to be likely to collide with the own vehicle V, is the low-height object B31 upon determination that the height of the obstacle recognized in step S104 is within the predetermined height range.

In response to determination that the obstacle, which is determined to be likely to collide with the own vehicle V, is the low-height object B31 (YES in step S206), the vehicle control routine proceeds to step S207.

In step S207, the processor 21 determines not to instruct the vehicular system 1 to execute the brake control operation, which is an example of the collision-avoidance action assistance operations. This results in the brake system 93 executing no braking operation, i.e., no collision-avoidance braking.

Otherwise, in response to determination that the obstacle, which is determined to be likely to collide with the own vehicle V, is not the low-height object B31 (NO in step S206), the vehicle control routine proceeds to step S208.

In step S208, the processor 21 determines to instruct the vehicular system 1 to execute the brake control operation, which is an example of the collision-avoidance action assistance operations. This results in the brake system 93 executing the braking operation, i.e., the collision-avoidance braking.

Otherwise, in response to determination that the obstacle, which is determined to be likely to collide with the own vehicle V, has not been detected by the at least one camera 34, in other words, has been detected by only the radar sensor 32 (NO in step S106), the vehicle control routine proceeds to step S301 illustrated in FIG. 33.

Specifically, referring to FIG. 33, the processor 21 determines whether a predicted collision scene between the own vehicle V and the obstacle, which is determined to be likely to collide with the own vehicle V, is a frontal collision scene in step S301. The frontal collision scene represents a scene where the front portion V11 of the own vehicle V will collide with the obstacle.

In response to determination that the predicted collision scene is not the frontal collision scene (NO in step S301), the vehicle control routine proceeds to step S302.

In step S302, the processor 21 determines not to instruct the vehicular system 1 to execute the brake control operation.

Otherwise, in response to determination that the predicted collision scene is the frontal collision scene (YES in step S301), the vehicle control routine proceeds to step S303.

In step S303, the processor 21 determines whether at least one collision-avoidance operation has been already carried out by the one or more occupants including the driver D a predetermined time t2 before the predicted collision point of time. For example, the predetermined time t2 can be set to, for example, 3 seconds, but can be varied depending on, for example, the relative speed of the obstacle relative to the own vehicle V.

In response to determination that at least one collision-avoidance operation has been already carried out by the one or more occupants including the driver D the predetermined time t2 before the predicted collision point of time (YES in step S303), the vehicle control routine proceeds to step S302. This results in the vehicular system 1 executing no brake control operation (see step S302).

Otherwise, in response to determination that no collision-avoidance operation has been carried out by the one or more occupants including the driver D yet the predetermined time t2 before the predicted collision point of time (NO in step S303), the vehicle control routine proceeds to step S304.

In step S304, the processor 21 determines to instruct the vehicular system 1 to issue a warning related to the collision possibility between the own vehicle V and the obstacle, resulting in the HMI system 7 issuing a warning related to the collision possibility between the own vehicle V and the obstacle.

Following the operation in step S304, the processor 21 determines whether the obstacle, which is determined to be likely to collide with the own vehicle V, is moving in step S305. In other words, the processor 21 determines whether the ground speed of the obstacle is more than or equal to a predetermined threshold speed in step S305.

In response to determination that the ground speed of the obstacle is less than the predetermined threshold speed, the processor 21 determines that the obstacle is in a resting state (NO in step S305), so that the vehicle control routine proceeds to step S302. This results in, after the warning is issued in step S304, the vehicular system 1 executing no brake control operation (see step S302).

Otherwise, in response to determination that the ground speed of the obstacle is more than or equal to the predetermined threshold speed, the processor 21 determines that the obstacle is moving (YES in step S305), the vehicle control routine proceeds to step S306.

In step S306, the processor 21 determines whether an occupant's brake operation as one of the collision-avoidance operations has been started for a predetermined period since the issuance of the warning.

In response to determination that an occupant's brake operation has been started for the predetermined period since the issuance of the warning (YES in step S306), the vehicle control routine proceeds to step S307.

In step S307, the processor 21 determines to instruct the vehicular system 1 to perform the brake-assistance operation, resulting in the brake system 93 to execute a brake-assistance operation.

Otherwise, in response to determination that no occupant's brake operation has been started for the predetermined period since the issuance of the warning (NO in step S306), the vehicle control routine proceeds to step S308.

In step S308, the processor 21 determines not to instruct the vehicular system 1 to execute the brake control operation. This results in the brake system 93 executing no braking operation, i.e., no collision-avoidance braking. This enables, in step S308, the collision-avoidance task to be left for the at least one collision-avoidance operation of the one or more occupants including the driver D.

Second Specific Functional Configuration

Figure 34:
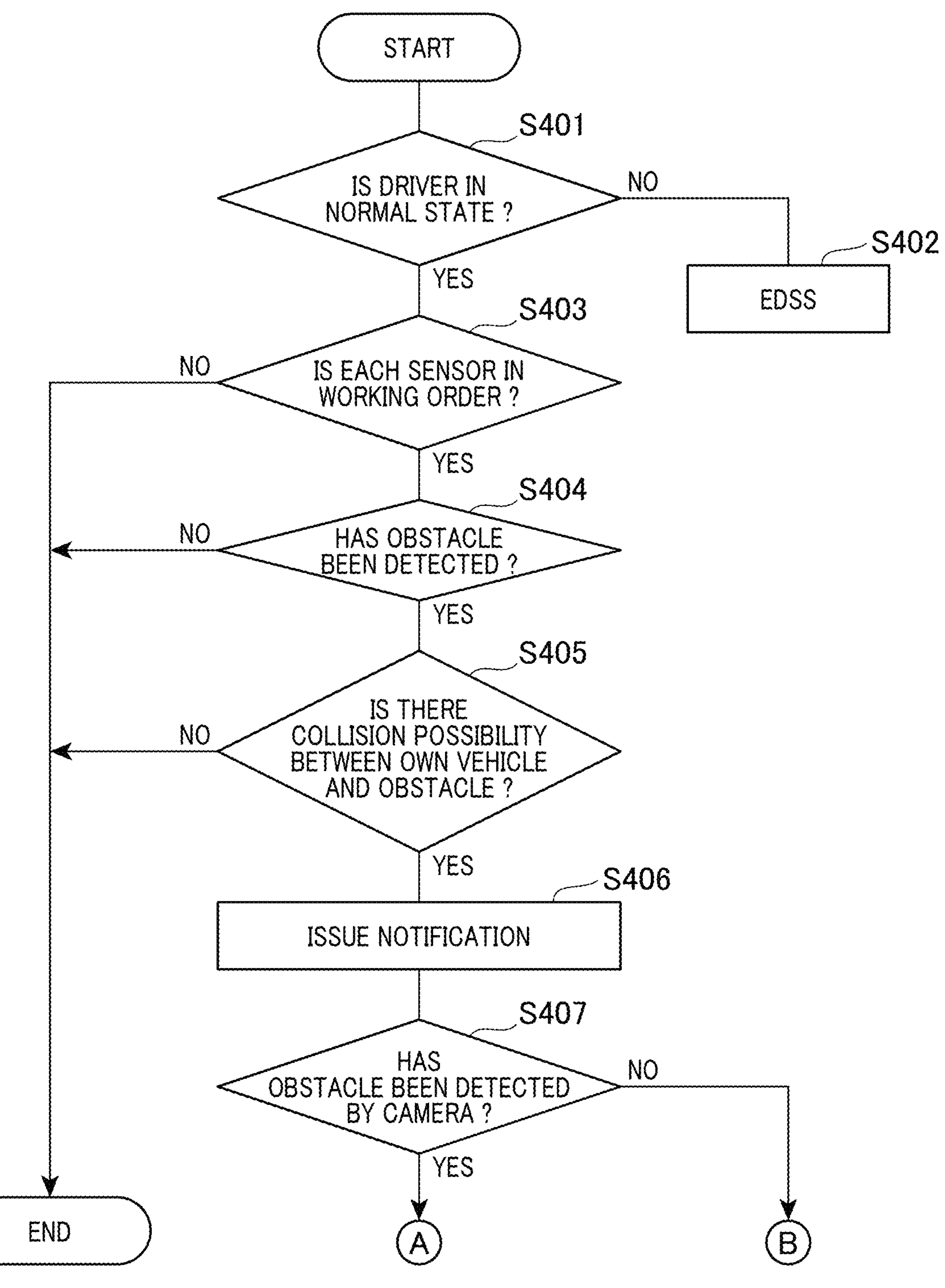
FIG. 34 is a flowchart schematically illustrating a part of a vehicle control routine according to a second specific functional configuration of the present embodiment.

The following describes a second specific functional configuration of the driving ECU 2 in accordance with FIG. 34. A part of the first specific functional configuration illustrated in FIG. 31 is modified to constitute the second specific functional configuration.

Because the operations in steps S401 to S404 of FIG. 34 are respectively identical to those in steps S101 to S104 of FIG. 31, the descriptions of the operations in steps S101 to S104 are employed to describe the operations in steps S401 to S404 of FIG. 34, and therefore additional descriptions of the operations in steps S401 to S404 are omitted.

In response to determination that an obstacle has been detected thereby (YES in step S404), the vehicle control routine proceeds to step S405.

Like the operation in step S105, the processor 21 determines, using one of the collision determination methods, whether there is a collision possibility between the own vehicle V and the obstacle in accordance with, for example, (i) the absolute speed, moving direction, relative speed, and relative moving direction of the obstacle and (ii) the moving speed and moving direction of the own vehicle V in step S405.

In response to determination that there is no collision possibility between the own vehicle V and the obstacle (NO in step S405), the processor 21 temporarily terminates the vehicle control routine.

Otherwise, in response to determination that there is a collision possibility between the own vehicle V and the obstacle (YES in step S405), the processor 21 predicts, based on, for example, (i) the absolute speed, moving direction, relative speed, and relative moving direction of the obstacle and (ii) the moving speed and moving direction of the own vehicle V, (i) a collision position on the road Rd at which the own vehicle V will collide with the obstacle and (ii) a collision point of time at which the own vehicle V will collide with the obstacle at the predicted collision position in step S406.

Then, the processor 21 determines to instruct the vehicular system 1 to issue the notification related to the collision possibility between the own vehicle V and the obstacle; the warning level of the notification is lower than the warning in step S406. This results in the HMI system 7 executing the notification related to the collision possibility between the own vehicle V and the obstacle.

Following the operation in step S406, the processor 21 determines whether the obstacle, which is determined to be likely to collide with the own vehicle V, has been detected by the at least one camera 34 in step S407, and thereafter the processor 21 executes the operations in steps S201 to S207 and S301 to S308 described above.

That is, the processor 21 according to the second specific functional configuration of the driving ECU 2 is programmed to determine whether the collision-avoidance operation determination operation in step S201 or S203 has been carried out since the issuance of the notification in step S406.

As described above, the second specific functional configuration of the driving ECU 2 includes the operation of executing the notification related to the collision possibility between the own vehicle V and the obstacle in step S406, which is added, i.e., inserted, between the operations in steps S105 and S106 of the first specific functional configuration of the driving ECU 2. The second specific functional configuration of the driving ECU 2 therefore results in the collision-avoidance operation determination operation in step S201 or S203 being carried out after the execution of the notification in step S406.

That is, the processor 21 serves as the operation determiner 2002 to determine whether the one or more occupants including the driver D has executed at least one collision-avoidance operation since the issuance of the notification.

Additionally, the processor 21 serves as the operation determiner 2002 to determine whether the obstacle, which is determined to be likely to collide with the own vehicle V, is the low-height object B31 after both (i) the determination in step S407 is affirmative and the determination in step S201 is negative. That is, the processor 21 serves as the operation determiner 2002 to determine whether the obstacle, which is determined to be likely to collide with the own vehicle V, is the low-height object B31 upon determination that there is no occupant's collision-avoidance operation until a predetermined period has elapsed since the issuance of the notification.

As described above, each of the first and second specific functional configurations of the driving ECU 2 described above checks whether the one or more occupants perform at least one collision-avoidance operation after the notification, and determines whether the obstacle, which is determined to be likely to collide with the own vehicle V, is the low-height object B31 when the checking result represents that the one or more occupants perform no collision-avoidance operations after the notification. Then, each of the first and second specific functional configurations of the driving ECU 2 permits interventions of the vehicular system 1 to driving control of the own vehicle V or avoids the interventions of the vehicular system 1 to driving control of the own vehicle V in accordance with the determination result of whether the obstacle, which is determined to be likely to collide with the own vehicle V, is the low-height object B31.

Each of the first and second specific functional configurations of the driving ECU 2 avoids smoothly undesired vehicular-system's interventions to driving control of the own vehicle V, making it possible to improve convenience of the vehicular system 1 to the one or more occupants.

Third Specific Functional Configuration

Figure 35:
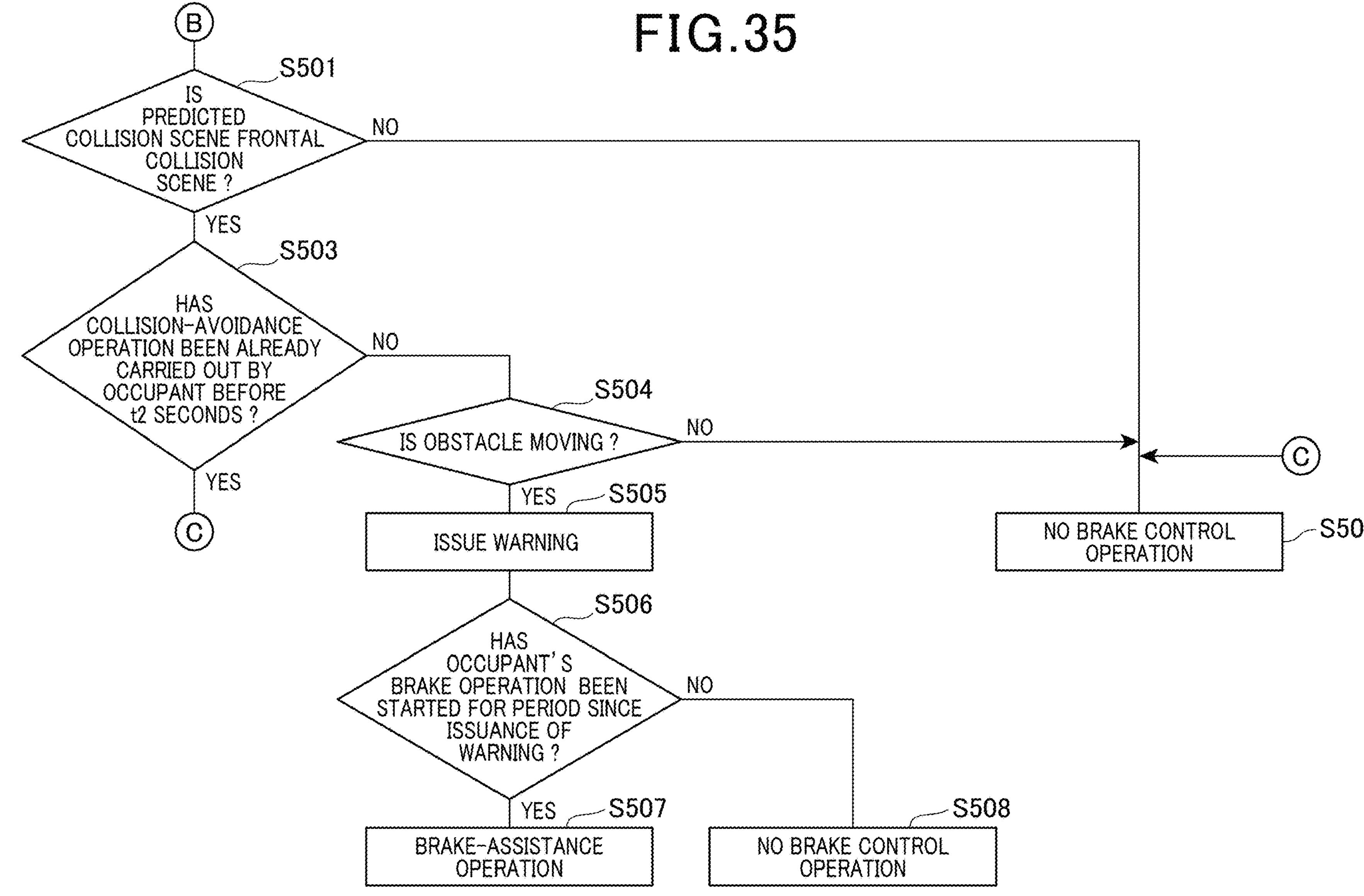
FIG. 35 is a flowchart schematically illustrating a part of a vehicle control routine according to a third specific functional configuration of the present embodiment.

The following describes a third specific functional configuration of the driving ECU 2 in accordance with FIG. 35. A part of the first specific functional configuration illustrated in FIG. 33 is modified to constitute the third specific functional configuration. Specifically, the flowchart illustrated in the combination of FIGS. 31, 32, and 35 shows the third specific functional configuration, or the flowchart illustrated in the combination of FIGS. 32, 34, and 35 shows the third specific functional configuration.

Because the operations in steps S501 and S502 of FIG. 35 are respectively identical to those in steps S301 and S302 of FIG. 33, the descriptions of the operations in steps S301 and S302 are employed to describe the operations in steps S501 and S502 of FIG. 35, and therefore additional descriptions of the operations in steps S501 and S502 are omitted.

In response to determination that the predicted collision scene is the frontal collision scene (YES in step S501), the vehicle control routine proceeds to step S503.

In step S503, the processor 21 determines whether at least one collision-avoidance operation has been already carried out by the one or more occupants including the driver D the predetermined time t2 before the predicted collision point of time. For example, the predetermined time t2 can be set to, for example, 3 seconds, but can be varied depending on, for example, the relative speed of the obstacle relative to the own vehicle V.

In response to determination that at least one collision-avoidance operation has been already carried out by the one or more occupants including the driver D the predetermined time t2 before the predicted collision point of time (YES in step S503), the vehicle control routine proceeds to step S302. This results in the vehicular system 1 executing no brake control operation (see step S502).

Otherwise, in response to determination that no collision-avoidance operation has been carried out by the one or more occupants including the driver D yet the predetermined time t2 before the predicted collision point of time (NO in step S503), the vehicle control routine proceeds to step S504.

In step S504, the processor 21 determines whether the obstacle, which is determined to be likely to be in frontal collision with the own vehicle V, is moving. In other words, the processor 21 determines whether the ground speed of the obstacle is more than or equal to the predetermined threshold speed in step S504.

In response to determination that the ground speed of the obstacle is less than the predetermined threshold speed, the processor 21 determines that the obstacle is in a resting state (NO in step S504), so that the vehicle control routine proceeds to step S502. This results in the vehicular system 1 executing no brake control operation (see step S502).

Otherwise, in response to determination that the ground speed of the obstacle is more than or equal to the predetermined threshold speed, the processor 21 determines that the obstacle is moving (YES in step S504), the vehicle control routine proceeds to step S505.

In step S505, the processor 21 determines to instruct the vehicular system 1 to issue a warning related to the collision possibility between the own vehicle V and the obstacle, resulting in the HMI system 7 issuing a warning related to the collision possibility between the own vehicle V and the obstacle.

Following the operation in step S505, the processor 21 determines whether an occupant's brake operation as one of the collision-avoidance operations has been started for a predetermined period since the issuance of the warning in step S506.

In response to determination that an occupant's brake operation has been started for the predetermined period since the issuance of the warning (YES in step S506), the vehicle control routine proceeds to step S507. Otherwise, in response to determination that no occupant's brake operation has been started for the predetermined period since the issuance of the warning (NO in step S506), the vehicle control routine proceeds to step S508.

Because the operations in steps S507 and S508 of FIG. 35 are respectively identical to those in steps S307 and S308 of FIG. 33, the descriptions of the operations in steps S307 and S308 are employed to describe the operations in steps S507 and S508 of FIG. 35, and therefore additional descriptions of the operations in steps S507 and S508 are omitted.

As described above, the third specific functional configuration of the driving ECU 2 is substantially identical to the second specific functional configuration of the driving ECU 2 except that the order of the moving-state determination operation in step S504 and the warning operation in step S505 in the third specific functional configuration is opposite to the order of the warning operation in step S304 and the moving-state determination operation in step S305 in the second specific functional configuration. The third specific functional configuration of the driving ECU 2 accordingly achieves the same advantageous benefits as those achieved by the second specific functional configuration of the driving ECU 2.

Fourth Specific Functional Configuration

The following describes a fourth specific functional configuration of the driving ECU 2 in accordance with FIGS. 36A and 36B.

Table-like information illustrated in FIG. 36A can be stored in the memory device 22 or incorporated in the vehicle control program. The table-like information represents a relationship between each of first to third height ranges for any detected obstacle and a corresponding information item indicative of whether the processor 21 executes at least one of the collision-avoidance assistance operations.

Specifically, the first height range is defined to be smaller than a first threshold height h1 of, for example, 15 cm. The second height range is defined to be greater than or equal to the first threshold height h1 and smaller than or equal to a second threshold height h2 of, for example, 50 cm; the second threshold height h2 is greater than the first threshold height h1. The third height range is defined to be greater than the second threshold height h2.

In the table-like information, the information item linked to the first height range shows no execution of the collision-avoidance action assistance operations when the height of the detected obstacle is within the first height range, and the information item linked to the third height range shows execution of at least one of the collision-avoidance action assistance operations when the height of the detected obstacle is within the third height range.

In the table-like information, the information item linked to the second height range represents that the detected obstacle is a low-height object on the road when the height of the detected obstacle is within the second height range.

FIG. 36B illustrates the fourth specific functional configuration of the driving ECU 2. A part of the first specific functional configuration illustrated in FIG. 32 is modified to constitute the fourth specific functional configuration. Specifically, the flowchart illustrated in the combination of FIGS. 31, 33, and 36B shows the fourth specific functional configuration, the flowchart illustrated in the combination of FIGS. 33, 34, and 36B, or the flowchart illustrated in the combination of FIGS. 34, 35, and 36B shows the fourth specific functional configuration.

Referring to FIG. 36B, following the operation in step S203, the processor 21 refers to the table-like information to accordingly determine whether the height of the obstacle recognized in step S104 is within any one of the first to third height ranges in step S206A.

In response to determination that the height of the obstacle recognized in step S104 is within the first height range, the processor 21 determines not to instruct the vehicular system 1 to execute the brake control operation or the brake-assistance operation, which is an example of the collision-avoidance action assistance operations in step S210.

Otherwise, in response to determination that the height of the obstacle recognized in step S104 is within the third height range, the processor 21 determines to instruct the vehicular system 1 to execute the brake control operation or the brake-assistance operation, which is an example of the collision-avoidance action assistance operations in step S211.

Otherwise, in response to determination that the height of the obstacle recognized in step S104 is within the second height range, the processor 21 recognizes that the obstacle, which is determined to be likely to collide with the own vehicle V, is the low-height object B31.

Then, the processor 21 determines whether an occupant's brake operation as one of the collision-avoidance operations has been started for the predetermined period since the issuance of the warning in step S204.

In response to determination that an occupant's brake operation has been started for the predetermined period since the issuance of the warning (YES in step S204), the vehicle control routine proceeds to step S205.

In step S205, the processor 21 determines to instruct the vehicular system 1, i.e., the braking system 93, to execute the brake-assistance operation.

Otherwise, in response to determination that no occupant's brake operation has been started for the predetermined period since the issuance of the warning (NO in step S204), the vehicle control routine proceeds to step S207.

In step S207, the processor 21 determines not to instruct the vehicular system 1 to execute the brake control operation, which is an example of the collision-avoidance action assistance operations. This results in the brake system 93 executing no braking operation, i.e., no collision-avoidance braking.

Accordingly, the fourth specific functional configuration of the driving ECU 2 makes it possible to appropriately determine whether to instruct the vehicular system 1 to intervene in driving control of the own vehicle V in accordance with the height of the obstacle.

Fifth Specific Functional Configuration

The following describes a fifth specific functional configuration of the driving ECU 2 in accordance with FIGS. 37A and 37B.

The fifth specific functional configuration of the driving ECU 2 changes the driving-control tasks of the own vehicle V and the timing of executing each driving-control task in accordance with (i) the type of an obstacle detected by the at least one camera 34 and/or the radar sensor 32 and (ii) the detection state of the obstacle by the at least one camera 34 and/or the radar sensor 32.

Table-like information illustrated in FIG. 37A can be stored in the memory device 22 or incorporated in the vehicle control program. The table-like information includes, for example, previously defined first to sixth cases, each of which shows a relationship among (I) The variable indicative of the detection state of the obstacle by the radar sensor 32

(II) The variable indicative of the detection state of the obstacle by the at least one camera 34

(III) The variable indicative of the ground speed of the obstacle (IV) The variable indicative of the type of the obstacle (V) The variable indicative of the driving-control task of the own vehicle V (VI) The variable indicative of the timing of executing the corresponding driving-control task (VII) The variable indicative of the corresponding traffic scene between the own vehicle V and the obstacle Specifically, in FIG. 37A, circular symbol "○" as the variable indicative of the detection state of the obstacle by each of the radar sensor 32 and the at least one camera 34 represents that the obstacle is continuously detected by the corresponding one of the radar sensor 32 and the at least one camera 34. Triangular symbol "Δ" as the variable indicative of the detection state of the obstacle by each of the radar sensor 32 and the at least one camera 34 represents that the obstacle, which was detected by the corresponding one of the radar sensor 32 and the at least one camera 34, is lost. Bar symbol "-" as the variable indicative of the detection state of the obstacle by each of the radar sensor 32 and the at least one camera 34 represents that the obstacle cannot be detected by the corresponding one of the radar sensor 32 and the at least one camera 34.

Note that the situation where the obstacle cannot be detected by both the radar sensor 32 and the at least one camera 34, that is, the Triangular symbols "Δ" or the bar symbols "-" are set for both the radar sensor 32 and the at least one camera 34, is unlikely to occur. This is because, if no obstacles were detected or lost by both the radar sensor 32 and the at least one camera 34, the driving ECU 2 could not execute the collision-avoidance assistance operations, and therefore could not carry out the PCS control.

The variable indicative of the type of the detected obstacle includes the type "VEHICLE", the type "STRUCTURE", the type "ON-ROAD OBJECT", and "UNKNOWN". The type "VEHICLE" represents the type of the other vehicles B2, and the type "STRUCTURE" represents the type of the structures, such as the road-side structures B13 and the buildings B34. The type "ON-ROAD OBJECT" represents the type of the on-road fallen objects B31. The type "UNKNOWN" represents an unknown type.

A circular symbol "○" for each of the type "VEHICLE", the type "STRUCTURE", the type "ON-ROAD OBJECT", and the type "UNKNOWN" represents that the detected obstacle is the corresponding one of the type "VEHICLE", the type "STRUCTURE", the type "ON-ROAD OBJECT", and the type "UNKNOWN". A bar symbol "-" for each of the type "VEHICLE", the type "STRUCTURE", the type "ON-ROAD OBJECT", and the type "UNKNOWN" represents that the detected obstacle is not the corresponding one of the type "VEHICLE", the type "STRUCTURE", the type "ON-ROAD OBJECT", and the type "UNKNOWN".

Referring to FIG. 37, the following describes the first to sixth cases.

The first case is that the detection state of the radar sensor 32 or the at least one camera 34 is set to the circular symbol "○" or the triangular symbol "Δ", and the detected obstacle is one of the other vehicles B2 or one of the structures.

The second case is that the detection state of the radar sensor 32 or the at least one camera 34 is set to the circular symbol "○" or the triangular symbol "Δ", and the detected obstacle is one of the on-road fallen objects B31.

The third case is that the obstacle is detected by only the radar sensor 32, so that the detection state of the radar sensor 32 is only set to the circular symbol "○", the ground speed of the detected obstacle is lower than the predetermined threshold speed, and the type of the detected obstacle is unknown. The detected obstacle whose ground speed is less than the predetermined threshold speed is one for which the ground speed of the detected obstacle is low or the detected obstacle is in a resting state.

The fourth case is that the obstacle is detected by only the radar sensor 32, so that the detection state of the radar sensor 32 is only set to the circular symbol "○", the ground speed of the detected obstacle is more than or equal to the predetermined threshold speed, and the type of the detected obstacle is unknown.

The fifth case is that the obstacle is detected by only the at least one camera 34, so that the detection state of the at least one camera 34 is only set to the circular symbol "○", and the detected obstacle is one of the other vehicles B2 or one of the structures.

The sixth case is that the obstacle is detected by only the at least one camera 34, so that the detection state of the at least one camera 34 is only set to the circular symbol "○", and the detected obstacle is one of the on-road fallen objects B31.

FIG. 37B illustrates the fifth specific functional configuration of the driving ECU 2.

Referring to FIG. 37B, following the affirmative determination in step S105 of FIG. 31, the processor 21 refers to the table-like information to accordingly determine that the current situation belongs to any one of the first to sixth cases in step S601.

In response to determination that the current situation belongs to the first case, the processor 21 instructs the vehicular system 1 to issue, at predetermined standard warning timing, a warning related to the collision possibility between the own vehicle V and the obstacle, and instructs the braking system 93 to execute, at predetermined standard brake timing, autonomous braking of the own vehicle V upon determination that there is no occupant's braking operation in step S602. The predetermined standard warning timing is set to, for example, 3 seconds before the predicted collision point of time, but can be varied depending on, for example, the relative speed of the obstacle relative to the own vehicle V. The predetermined standard brake timing is set to, for example, 1.4 seconds before the predicted collision point of time, but can be varied depending on, for example, the relative speed of the obstacle relative to the own vehicle V.

The first case is estimated to be used when the current traffic situation of the own vehicle V is one of the following scenes, i.e., the following scenarios, including the frontal collision scene, a traversing scene, a right-turn collision scene, an oncoming collision scene, a cut-in scene, a bumping scene, and an after-turning scene.

The traversing scene is that a moving object, such as one of other vehicles B2, as the obstacle traverses in front of the own vehicle V, i.e., moves in a direction intersecting with the traveling direction of the own vehicle V.

The right-turn collision scene is that one of the own vehicle V and the obstacle, which is turning right, will collide with the other thereof, which is traveling straight forward.

The oncoming collision scene is that an oncoming vehicle, which is one of the other vehicles B2, will collide with the own vehicle V.

The cut-in scene is that the obstacle cuts in in front of the own vehicle V.

The bumping scene is that the own vehicle V and one of the other vehicles B2 as the obstacle, which is traveling toward an intersection from a road will bump into each other at the intersection.

The after-turning scene is that, after turning right or left, the own vehicle V will collide with a traversing pedestrian or a two-wheel vehicle as the obstacle.

In response to determination that the current situation belongs to the second case, the processor 21 instructs (I) The vehicular system 1 to issue, at the predetermined standard warning timing, a warning related to the collision possibility between the own vehicle V and the obstacle (II) The braking system 93 to execute, at predetermined standard brake-assist timing, the brake assistance operation upon determination that there is an occupant's braking operation (III) The braking system 93 to execute no braking operations and no brake assistance operations upon determination that there is no occupant's braking operation in step S603

The predetermined standard brake-assist timing is set to, for example, 2 seconds before the predicted collision point of time, but can be varied depending on, for example, the relative speed of the obstacle relative to the own vehicle V.

The second case is estimated to be used when the current traffic situation of the own vehicle V is the frontal collision scene.

In response to determination that the current situation belongs to the third case, the processor 21 instructs the vehicular system 1 to issue, at predetermined delay warning timing, a warning related to the collision possibility between the own vehicle V and the obstacle without control operations related to the braking; the delay warning timing is set to be delayed relative to the standard warning timing in step S604. The third case is estimated to be used when the current traffic situation of the own vehicle V is the frontal collision scene.

In response to determination that the current situation belongs to the fourth case, the processor 21 instructs the vehicular system 1 to issue, at the predetermined delay warning timing, a warning related to the collision possibility between the own vehicle V and the obstacle, and instructs the braking system 93 to execute, at predetermined delay brake timing, autonomous braking of the own vehicle V upon determination that there is no occupant's braking operation in step S605; the delay brake timing is set to be delayed relative to the standard brake timing. The fourth case is estimated to be used when the current traffic situation of the own vehicle V is the frontal collision scene.

The predetermined delay warning timing is set to, for example, 2 seconds before the predicted collision point of time, but can be varied depending on, for example, the relative speed of the obstacle relative to the own vehicle V. The predetermined delay brake timing is set to, for example, 1.2 seconds before the predicted collision point of time, but can be varied depending on, for example, the relative speed of the obstacle relative to the own vehicle V.

As described above, the fifth specific functional configuration of the driving ECU 2 delays the timing of executing the collision-avoidance assistance operations upon the obstacle being detected by only the radar sensor 32, i.e., the third or fourth case, as compared with the timing of executing the collision-avoidance assistance operations upon the obstacle being detected by both the at least one camera 34 and the radar sensor 32, i.e., the first or second case.

In response to determination that the current situation belongs to the fifth case, the processor 21 instructs the vehicular system 1 to issue, at the predetermined standard warning timing, a warning related to the collision possibility between the own vehicle V and the obstacle, and instructs the braking system 93 to execute, at the predetermined standard brake timing, autonomous braking of the own vehicle V upon determination that there is no occupant's braking operation in step S606. Like the first case, the fifth case is estimated to be used when the current traffic situation of the own vehicle V is one of the following scenes including the frontal collision scene, the traversing scene, the right-turn collision scene, the oncoming collision scene, the cut-in scene, the bumping scene, and the after-turning scene.

In response to determination that the current situation belongs to the sixth case, the processor 21 instructs (I) The vehicular system 1 to issue, at the predetermined standard warning timing, a warning related to the collision possibility between the own vehicle V and the obstacle (II) The braking system 93 to execute, at the predetermined standard brake-assist timing, the brake assistance operation upon determination that there is an occupant's braking operation (III) The braking system 93 to execute no braking operations and no brake assistance operations upon determination that there is no occupant's braking operation in step S607

The predetermined standard brake-assist timing is set to, for example, 2 seconds before the predicted collision point of time, but can be varied depending on, for example, the relative speed of the obstacle relative to the own vehicle V.

The sixth case is estimated to be used when the current traffic situation of the own vehicle V is the frontal collision scene.

Modifications

While the exemplary embodiment of the present disclosure has been described above, the present disclosure is not limited to the exemplary embodiment. Specifically, the present disclosure includes various modifications and/or alternatives of the exemplary embodiment within the scope of the present disclosure.

The following describes typical modifications of the exemplary embodiment. In the typical modifications, to the same parts or equivalent parts of the exemplary embodiment, like reference characters are assigned, so that, as the descriptions of each of the same or equivalent parts of the typical modifications, the descriptions of the corresponding one of the same or equivalent parts of the exemplary embodiment can be employed unless technical contradiction or otherwise specified.

The present disclosure is not limited to specific structures described in the exemplary embodiment. For example, the shape and/or the configuration of the body V1 of the system-installed vehicle V are not limited to a boxed shape, i.e., a substantially rectangular shape in plan view. The body panel V15 can be configured not to cover the top of the interior V2 or a part of the body panel V15, which covers the top of the interior V2, can be removable. Various applications of the system-installed vehicle V, the location of each of the driver's seat V23 and the steering wheel V24, and the number of occupants in the system-installed vehicle V may not have any limitations applied.

The definition of the autonomous driving, the driving levels of the autonomous driving, and various categories of the autonomous driving according to the exemplary embodiment are defined in the SAE J2016 standard, but the present disclosure is not limited thereto.

Specifically, the autonomous driving in each of the SAE levels 3 to 5 represents that the vehicular system 1 serves as the autonomous driving system to execute all dynamic driving tasks in the corresponding one of the SAE levels 3 to 5. For this reason, the above definition of the autonomous driving according to the exemplary embodiment naturally includes no driver's requirement for monitoring the traffic environment around the own vehicle V. The present disclosure is not limited to the above definition.

Specifically, the definition of the autonomous driving can include not only autonomous driving with no driver's requirement for monitoring the traffic environment around the own vehicle V, but also autonomous driving with driver's requirement for monitoring the traffic environment around the own vehicle V. For example, hands-off driving according to the exemplary embodiment can be interpreted as autonomous driving with a driver's requirement for monitoring the traffic environment around the own vehicle V. The concept of autonomous driving with driver's requirement for monitoring the traffic environment around the own vehicle V can include partial autonomous driving in which the driver D executes some of the dynamic driving tasks, such as the task of monitoring the traffic environment around the own vehicle V. The partial autonomous driving can be evaluated to be substantially synonymous with the advanced driving assistance. The road traffic system of each country can have limitations on types of the autonomous driving and/or conditions, such as autonomous-driving executable roads, allowable traveling speed ranges for autonomous driving, and lane-change enabling/disabling. For this reason, the specifications of the present disclosure can be modified to be in conformity with the road traffic system of each country.

The configuration of the vehicular system 1 according to the present disclosure is not limited to that of the vehicular system 1 of the exemplary embodiment described above.

For example, the number of ADAS sensors 31, 32, 33, and 34 and the location of each of the ADAS sensors 31, 32, 33, and 34 can be freely determined. For example, the number of relatively expensive radar sensor 32 and laser-radar sensors 33 can be reduced to be as small as possible, thus contributing to earlier proliferation of autonomous vehicles. The radar sensor 32 and laser-radar sensors 33 can be eliminated.

The locator 39 according to the present disclosure is not limited to the above configuration that includes the inertia detector 392. Specifically, the locator 39 according to the present disclosure can be configured not to include the inertia detector 392 and can be configured to receive (i) the linear accelerations measured by an acceleration sensor provided outside the locator 39 as one of the behavior sensors 36 and (ii) the angular velocities measured by an angular velocity sensor provided outside the locator 39 as one of the behavior sensors 36. The locator 39 can be integrated with the HD map database 5. The locator 39 is not limited to a POSLV system manufactured by Applanix Corporation.

The navigation system 6 can be communicably connected to the HMI system 7 through a subnetwork different from the vehicular communication network 10. The navigation system 6 can include a screen for displaying only navigation images, which is a separate member from the HMI system 7. Alternatively, the navigation system 6 can constitute a part of the HMI system 7. For example, the navigation system 6 can be integrated with the main display device 703.

The HMI system 7 according to the present disclosure is not limited to the above configuration that includes the meter panel 702, the main display device 703, and the head-up display 704. Specifically, the HMI system 7 can be configured to include a single display device, such as a liquid-crystal display device or an organic EL display device, that serves as both the meter panel 702 and the main display device 703. In this modification, the meter panel 702 can be designed as a part of a display region of the single display device. Specifically, the meter panel 702 can be comprised of a graphical tachometer, a graphic tachometer, a graphic speedometer, and a graphic water temperature gauge, each of which is comprised of an image of bezel, an image of a scale on the image of bezel, and an image of an indicator needle on the image of bezel.

The HMI system 7 can be configured not to include the head-up display 704.

Each ECU according to the exemplary embodiment is configured as a vehicular microcomputer comprised of, for example, a CPU and/or an MPU, but the present disclosure is not limited thereto.

Specifically, a part or the whole of each ECU can be configured as one or more digital circuits, such as one or more application specific integrated circuits (ASICs) or one or more field-programmable gate-array (FPGA) processors. That is, each ECU can be concurrently comprised of one or more vehicular microcomputers and one or more digital circuits.

The computer programs, i.e., computer-program instructions, described in the exemplary embodiment, which cause the processor 21 to execute various operations, tasks, and/or procedures set forth above, can be downloaded into the memory device 22 or upgraded using vehicle-to-everything (V2X) communications through the vehicular communication module 4. The computer-program instructions can be downloaded and/or upgraded through terminals; the terminals are provided in, for example, a manufacturing factor of the own vehicle V, a garage, or an authorized distributor. The computer programs can be stored in a memory card, an optical disk, or a magnetic disk, accessible to the processor 21 which can read out. That is, the memory card, optical disk, or magnetic disk can serve as the memory device 22.

The functional configurations and methods described in the present disclosure can be implemented by a dedicated computer including a memory and a processor programmed to perform one or more functions embodied by one or more computer programs.

The functional configurations and methods described in the present disclosure can also be implemented by a dedicated computer including a processor comprised of one or more dedicated hardware logic circuits.

The functional configurations and methods described in the present disclosure can further be implemented by a processor system comprised of a memory, a processor programmed to perform one or more functions embodied by one or more computer programs, and one or more hardware logic circuits.

The one or more computer programs can be stored in a non-transitory storage medium as instructions to be carried out by a computer or a processor. The functional configurations and methods described in the present disclosure can be implemented as one or more computer programs or a non-transitory storage medium that stores these one or more computer programs.

The present disclosure is not limited to the specific operations and/or the specific processes described in the above embodiments. For example, the specification and figures are described on the premise that the drivers keep to the left side of the road in conformity with the Japanese Road Traffic Laws/Regulations, but the present disclosure is not limited thereto. Specifically, the specification and figures of the present disclosure can be modified in accordance with the premise that the drivers keep to the right side of the road in conformity with the other country's Road Traffic Laws/Regulations, such as the US Road Traffic Laws/Regulations.

At least part of the vehicle control routines illustrated in FIGS. 31 to 35, 36B, and 37B can be modified.

For example, the processor 21 can be programmed to calculate a time to collision (TTC), which means a time left until the own vehicle V and the obstacle will collide with each other at the predicted position, and determine whether the calculated TTC is within a predetermined threshold period in the operation in any step after step S105 before step S204.

In this modification, the processor 21 can be programmed to determine whether the obstacle, which is determined to be likely to collide with the own vehicle V, is the low-height object B31 upon determination that (i) the calculated TTC is within a predetermined threshold period and (ii) there is no occupant's collision-avoidance operation until a predetermined period has elapsed since the issuance of the notification.

This modification therefore avoids more smoothly undesired vehicular-system's interventions to driving control of the own vehicle V.

In step S308 of FIG. 33 or in step S508 of FIG. 35, the processor 21 can be programmed to determine to instruct the vehicular system 1 to execute the brake control operation.

That is, the processor 21 can serve as, for example, the operation determiner 2002 to (I) Determine whether the ground speed of the obstacle is more than or equal to the predetermined threshold speed (see step S305 or S504) upon determination that the obstacle, which is determined to be likely to collide with the own vehicle V, has been detected by only the radar sensor 32 (NO in step S106)

(II) Determine to instruct the vehicular system 1 to issue a warning related to the collision possibility between the own vehicle V and the obstacle in response to determination that the ground speed of the obstacle is more than or equal to the predetermined threshold speed (YES in step S305 or S504)

(III) Determine to instruct the vehicular system 1 to execute the collision-avoidance operations in response to determination that no occupant's brake operation has been started for the predetermined period since the issuance of the warning (NO in step S306 or S506)

This modification therefore avoids a collision between the own vehicle V and the obstacle more reliably.

In the warning task in, for example, step S203 of FIG. 32 and/or in the notifying task in, for example, step S406 of FIG. 34, the processor 21 can serve as the operation determiner 2002 to change the information on the warning and/or notification issued thereby in accordance with which of the types, such as the type of the other vehicles B2, the type of the on-road fallen objects B31, or the type of the buildings B34, the obstacle has. This therefore makes it possible for the vehicular system 1 to issue a more pertinent warning or notification to the occupants.

Additionally, the processor 21 can serve as the operation determiner 2002 to change the information on the warning and/or notification issued thereby in accordance with which of the specific information items on the on-road fallen object B31 detected as the obstacle has. The specific information items on the on-road fallen object B31 can include, for example, the height of the on-road fallen object B31 and an information item indicative of whether the own vehicle B can pass over the on-road fallen object B31. This therefore makes it possible for the vehicular system 1 to issue a more pertinent warning or notification to the occupants.

The definitions of a low-height object, i.e., the values of the first and second threshold heights h1 and h2, can be freely changed. Similarly, the dimension-range examples of a low-height object, such as the height-range example, the lateral-width range example, and the depth-range example, can be freely changed.

Similar expressions, such as "obtaining", "calculation", "estimation", "detection", and "determination", can be mutually substituted for one another unless the substitution produces technological inconsistency. The expression that A is more than (greater than or other similar expressions) or equal to B, and the expression that A is more than B can be substituted for one another unless the substitution produces technological inconsistency. Similarly, the expression that A is less than (smaller than or other similar expressions) or equal to B, and the expression that A is less than B can be substituted for one another unless the substitution produces technological inconsistency.

One or more components in the exemplary embodiment are not necessarily essential components except for (i) one or more components that are described as one or more essential components or (ii) one or more components that are essential in principle.

Specific values disclosed in the exemplary embodiment, each of which represents the number of components, a physical quantity, and/or a range of a physical parameter, are not limited thereto except that (i) the specific values are obviously essential or (ii) the specific values are essential in principle.

The specific structure and direction of each component described in the exemplary embodiment are not limited thereto except for cases in which (1) the specific structure and direction are described to be essential or (2) the specific structure and direction are required in principle. Additionally, the specific structural or functional relationship between components described in the exemplary embodiment is not limited thereto except for cases in which (1) the specific structural or functional relationship is described to be essential or (2) the specific structural or functional relationship is required in principle.

Modifications of the present disclosure are not limited to those described set forth above. For example, specific examples described set forth above can be combined with each other unless the combination produces technological inconsistency, and similarly the modifications set forth above can be combined with each other unless the combination produces technological inconsistency. At least part of the exemplary embodiment can be combined with at least part of the modifications set forth above unless the combination produces technological inconsistency.

The present disclosure includes the following technological concepts.

[Technological Concept 1-1]

The technological concept 1-1 provides a control apparatus (2) for controlling a vehicular system (1) installed in a vehicle (V). The control apparatus includes a recognizing unit (2001) configured to recognize an obstacle located around the vehicle, and an operation determiner (2002) configured to determine whether the obstacle has a collision possibility that the obstacle is likely to collide with the vehicle, and determine, in response to determination that the obstacle is likely to collide with the vehicle, to instruct a notification system (7) installed in the vehicular system to issue, to at least one occupant (D) of the vehicle, a notification related to the collision possibility with the obstacle in at least one of a visible format and an audible format.

The operation determiner is configured to determine whether at least one collision-avoidance operation has been carried out by the at least one occupant since the issuance of the notification related to the collision possibility, and determine not to instruct the vehicle motion control system (9) to execute a collision-avoidance assistance operation upon determination that (i) no collision-avoidance operations have been carried out by the at least one occupant since the issuance of the notification related to the collision possibility, and (ii) the obstacle having the collision possibility is a low-height object (B31), the low-height object being defined as an object that has fallen on a road and has a height that is sufficiently low that the vehicle is enabled to pass over the obstacle.

[Technological Concept 1-2]

The technological concept 1-2 depends from the technological concept 1-1.

The operation determiner of the control apparatus of the technological concept 1-2 is configured to determine whether the obstacle having the collision possibility is the low-height object upon determination that no collision-avoidance operations have been carried out by the at least one occupant for a predetermined period since the issuance of the notification related to the collision possibility.

[Technological Concept 1-3]

The technological concept 1-3 depends from the technological concept 1-1.

The operation determiner of the control apparatus of the technological concept 1-3 is configured to calculate a time left until the vehicle and the obstacle having the collision possibility will collide with each other, and determine whether the obstacle having the collision possibility is the low-height object upon determination that (i) the calculated time is within a predetermined first period, and (ii) no collision-avoidance operations have been carried out by the at least one occupant for a predetermined second period.

[Technological Concept 1-4]

The technological concept 1-4 depends from any one of the technological concepts 1-1 to 1-3.

The operation determiner of the control apparatus of the technological concept 1-4 is configured to determine to instruct the vehicle motion control system to execute a brake assistance operation as the collision-avoidance assistance operation upon determination that a brake operation as the collision-avoidance operations has been carried out by the at least one occupant since the issuance of the notification related to the collision possibility.

[Technological Concept 1-5]

The technological concept 1-5 depends from any one of the technological concepts 1-1 to 1-4.

The operation determiner of the control apparatus of the technological concept 1-5 is configured to determine to instruct the vehicle motion control system to execute the collision-avoidance assistance operation upon determination that the obstacle having the collision possibility is not the low-height object.

[Technological Concept 1-6]

The technological concept 1-6 depends from any one of the technological concepts 1-1 to 1-5.

The operation determiner of the control apparatus of the technological concept 1-5 is configured to determine whether the obstacle having the collision possibility is the low-height object by determining whether a height of the obstacle being likely to collide with the vehicle is greater than or equal to a first threshold height and smaller than or equal to a second threshold height that is greater than the first threshold height. The operation determiner is configured to determine that the obstacle having the collision possibility is the low-height object upon determination that the height of the obstacle having the collision possibility is greater than or equal to the first threshold height and smaller than or equal to the second threshold height.

[Technological Concept 1-7]

The technological concept 1-7 depends from the technological concept 1-6.

The operation determiner of the control apparatus of the technological concept 1-7 is configured to determine (i) not to instruct the vehicle motion control system to execute the collision-avoidance assistance operation upon determination that the height of the obstacle having the collision possibility is smaller than the first threshold height, and (ii) to instruct the vehicle motion control system to execute the collision-avoidance assistance operation upon determination that the height of the obstacle having the collision possibility is greater than the second threshold height.

[Technological Concept 1-8]

The technological concept 1-8 depends from any one of the technological concepts 1-1 to 1-7.

The operation determiner of the control apparatus of the technological concept 1-8 is configured to change the notification related to the collision possibility in accordance with which of predetermined types the obstacle having the collision possibility has.

[Technological Concept 1-9]

The technological concept 1-9 depends from any one of the technological concepts 1-1 to 1-8.

The vehicular system of the control apparatus of the technological concept 1-9 includes a radar sensor (32) and a camera (34). The operation determiner is configured to determine whether a ground speed of the obstacle having the collision possibility is more than or equal to a predetermined threshold speed upon determination that the obstacle having the collision possibility is detected by only the radar sensor. The operation determiner is configured to determine to instruct the notification system to issue the notification related to the collision possibility upon determination that the ground speed of the obstacle having the collision possibility is more than or equal to the predetermined threshold speed.

The operation determiner is configured to determine, upon determination that the ground speed of the obstacle having the collision possibility is more than or equal to the predetermined threshold speed, to instruct the vehicle motion control system to issue the notification related to the collision possibility upon determination that no collision-avoidance operations have been carried out by the at least one occupant since the issuance of the notification related to the collision possibility.

[Technological Concept 1-10]

The technological concept 1-10 depends from the technological concept 1-9.

The operation determiner of the control apparatus of the technological concept 1-10 is configured to determine to instruct the notification system to issue the notification related to the collision possibility while determining not to instruct the vehicle motion control system to execute the collision-avoidance assistance operation upon determination that the ground speed of the obstacle having the collision possibility is less than the predetermined threshold speed.

[Technological Concept 1-11]

The technological concept 1-11 depends from any one of the technological concepts 1-9 and 1-10.

The operation determiner of the control apparatus of the technological concept 1-11 is configured to delay first timing of executing the collision-avoidance assistance operation in a first case where the obstacle having the collision possibility is detected by only the radar sensor as compared with second timing of executing the collision-avoidance assistance operation in a second case where the obstacle having the collision possibility is detected by both the radar sensor and the camera.

[Technological Concept 2-1]

A method of controlling a vehicular system (1) installed in a vehicle (V) includes (I) Detecting an obstacle located around the vehicle (II) Determining whether the obstacle has a collision possibility that the obstacle is likely to collide with the vehicle (III) Determining, in response to determination that the obstacle has the collision possibility, to instruct a notification system (7) installed in the vehicular system to issue, to at least one occupant (D) of the vehicle, a notification related to the collision possibility with the obstacle in at least one of a visible format and an audible format (IV) Determining whether at least one collision-avoidance operation has been carried out by the at least one occupant since an issuance of the notification related to the collision possibility (V) Executing a collision-avoidance assistance determination of whether to instruct a vehicle motion control system installed in the vehicular system to execute a collision-avoidance assistance operation The executing determines not to instruct the vehicle motion control system to execute the collision-avoidance assistance operation upon determination that (i) no collision-avoidance operations have been carried out by the at least one occupant since the issuance of the notification related to the collision possibility, and (ii) the obstacle having the collision possibility is a low-height object (B31), the low-height object being defined as an object that has fallen on a road and has a height that is sufficiently low that the vehicle is enabled to pass over the obstacle.

[Technological Concept 2-2]

The technological concept 2-2 depends from the technological concept 2-1.

The method of the technological concept 2-2 further includes determining whether the obstacle having the collision possibility is the low-height object upon determination that no collision-avoidance operations have been carried out by the at least one occupant for a predetermined period since the issuance of the notification related to the collision possibility.

[Technological Concept 2-3]

The technological concept 2-3 depends from the technological concept 2-1.

The method of the technological concept 2-3 further includes calculating a time left until the vehicle and the obstacle having the collision possibility will collide with each other, and determining whether the obstacle having the collision possibility is the low-height object upon determination that (i) the calculated time is within a predetermined first period, and (ii) no collision-avoidance operations have been carried out by the at least one occupant for a predetermined second period.

[Technological Concept 2-4]

The technological concept 2-4 depends from any one of the technological concepts 2-1 to 2-3.

In the method of the technological concept 2-4, the executing determines to instruct the vehicle motion control system to execute a brake assistance operation as the collision-avoidance assistance operation upon determination that a brake operation as the collision-avoidance operations has been carried out by the at least one occupant since the issuance of the notification related to the collision possibility.

[Technological Concept 2-5]

The technological concept 2-5 depends from any one of the technological concepts 2-1 to 2-4.

In the method of the technological concept 2-5, the executing determines to instruct the vehicle motion control system to execute the collision-avoidance assistance operation upon determination that the obstacle having the collision possibility is not the low-height object.

[Technological Concept 2-6]

The technological concept 2-6 depends from any one of the technological concepts 2-1 to 2-5.

The method of the technological concept 2-6 further includes determining whether the obstacle having the collision possibility is the low-height object by determining whether a height of the obstacle being likely to collide with the vehicle is greater than or equal to a first threshold height and smaller than or equal to a second threshold height that is greater than the first threshold height.

The determining whether the obstacle having the collision possibility is the low-height object determines that the obstacle having the collision possibility is the low-height object over which the vehicle is enabled to pass upon determination that the height of the obstacle having the collision possibility is greater than or equal to the first threshold height and smaller than or equal to the second threshold height.

[Technological Concept 2-7]

The technological concept 2-7 depends from the technological concept 2-6.

In the method of the technological concept 2-7, the executing determines (i) not to instruct the vehicle motion control system to execute the collision-avoidance assistance operation upon determination that the height of the obstacle having the collision possibility is smaller than the first threshold height, and (ii) to instruct the vehicle motion control system to execute the collision-avoidance assistance operation upon determination that the height of the obstacle having the collision possibility is greater than the second threshold height.

[Technological Concept 2-8]

The technological concept 2-8 depends from any one of the technological concepts 2-1 to 2-7.

In the method of the technological concept 2-8, the executing changes the notification related to the collision possibility in accordance with which of predetermined types the obstacle having the collision possibility has.

[Technological Concept 2-9]

The technological concept 2-9 depends from any one of the technological concepts 2-1 to 2-8.

In the method of the technological concept 2-9, the vehicular system includes a radar sensor and a camera. The method further includes determining whether a ground speed of the obstacle having the collision possibility is more than or equal to a predetermined threshold speed upon determination that the obstacle having the collision possibility is detected by only the radar sensor.

The determining to instruct the notification system instructs the notification system to issue the notification related to the collision possibility upon determination that the ground speed of the obstacle having the collision possibility is more than or equal to the predetermined threshold speed.

The executing determines, upon determination that the ground speed of the obstacle having the collision possibility is more than or equal to the predetermined threshold speed, to instruct the vehicle motion control system to issue the notification related to the collision possibility upon determination that no collision-avoidance operations have been carried out by the at least one occupant since the issuance of the notification related to the collision possibility.

[Technological Concept 2-10]

The technological concept 2-10 depends from the technological concept 2-9.

In the method according to the technological concept 2-10, the executing determines to instruct the notification system to issue the notification related to the collision possibility while the executing determines not to instruct the vehicle motion control system to execute the collision-avoidance assistance operation upon determination that the ground speed of the obstacle having the collision possibility is less than the predetermined threshold speed.

[Technological Concept 2-11]

The technological concept 2-11 depends from any one of the technological concepts 2-9 and 2-10.

In the method of the technological concept 2-11, the executing delays first timing of executing the collision-avoidance assistance operation in a first case where the obstacle having the collision possibility is detected by only the radar sensor as compared with second timing of executing the collision-avoidance assistance operation in a second case where the obstacle having the collision possibility is detected by both the radar sensor and the camera.

[Technological Concept 3-1]

A processor program product includes a non-transitory storage medium (22) readable by a processor (21) for controlling a vehicular system installed in a vehicle, and control program instructions stored in the non-transitory storage medium. The control program instructions cause the processor to (I) Detect an obstacle located around the vehicle (II) Determine whether the obstacle has a collision possibility that the obstacle is likely to collide with the vehicle (III) Determine, in response to determination that the obstacle has the collision possibility, to instruct a notification system installed in the vehicular system to issue, to at least one occupant of the vehicle, a notification related to the collision possibility with the obstacle in at least one of a visible format and an audible format (IV) Determine whether at least one collision-avoidance operation has been carried out by the at least one occupant since an issuance of the notification related to the collision possibility (V) Determine not to instruct a vehicle motion control system installed in the vehicular system to execute a collision-avoidance assistance operation upon determination that (i) no collision-avoidance operations have been carried out by the at least one occupant since the issuance of the notification related to the collision possibility, and (ii) the obstacle having the collision possibility is a low-height object (B31), the low-height object being defined as an object that has fallen on a road and has a height that is sufficiently low that the vehicle is enabled to pass over the obstacle.

[Technological Concept 3-2]

The technological concept 3-2 depends from the technological concept 3-1.

The control program instructions of the processor program product of the technological concept 3-2 cause the processor to determine whether the obstacle having the collision possibility is the low-height object upon determination that no collision-avoidance operations have been carried out by the at least one occupant for a predetermined period since the issuance of the notification related to the collision possibility.

[Technological Concept 3-3]

The technological concept 3-3 depends from the technological concept 3-1.

The control program instructions of the processor program product of the technological concept 3-3 cause the processor to calculate a time left until the vehicle and the obstacle having the collision possibility will collide with each other, and determine whether the obstacle having the collision possibility is the low-height object upon determination that (i) the calculated time is within a predetermined first period, and (ii) no collision-avoidance operations have been carried out by the at least one occupant for a predetermined second period.

[Technological Concept 3-4]

The technological concept 3-4 depends from any one of the technological concepts 3-1 to 3-3.

The control program instructions of the processor program product of the technological concept 3-4 cause the processor to determine to instruct the vehicle motion control system to execute a brake assistance operation as the collision-avoidance assistance operation upon determination that a brake operation as the collision-avoidance operations has been carried out by the at least one occupant since the issuance of the notification related to the collision possibility.

[Technological Concept 3-5]

The technological concept 3-5 depends from any one of the technological concepts 3-1 to 3-4.

The control program instructions of the processor program product of the technological concept 3-5 cause the processor to determine to instruct the vehicle motion control system to execute the collision-avoidance assistance operation upon determination that the obstacle having the collision possibility is not the low-height object.

[Technological Concept 3-6]

The technological concept 3-6 depends from any one of the technological concepts 3-1 to 3-5.

The control program instructions of the processor program product of the technological concept 3-6 cause the processor to determine whether the obstacle having the collision possibility is the low-height object by determining whether a height of the obstacle being likely to collide with the vehicle is greater than or equal to a first threshold height and smaller than or equal to a second threshold height that is greater than the first threshold height. The control program instructions cause the processor to determine that the obstacle having the collision possibility is the low-height object upon determination that the height of the obstacle having the collision possibility is greater than or equal to the first threshold height and smaller than or equal to the second threshold height.

[Technological Concept 3-7]

The technological concept 3-7 depends from the technological concept 3-6.

The control program instructions of the processor program product of the technological concept 3-7 cause the processor to determine (i) not to instruct the vehicle motion control system to execute the collision-avoidance assistance operation upon determination that the height of the obstacle having the collision possibility is smaller than the first threshold height, and (ii) to instruct the vehicle motion control system to execute the collision-avoidance assistance operation upon determination that the height of the obstacle having the collision possibility is greater than the second threshold height.

[Technological Concept 3-8]

The technological concept 3-8 depends from any one of the technological concepts 3-1 to 3-7.

The control program instructions of the processor program product of the technological concept 3-8 cause the processor to change the notification related to the collision possibility in accordance with which of predetermined types the obstacle having the collision possibility has.

[Technological Concept 3-9]

The technological concept 3-9 depends from any one of the technological concepts 3-1 to 3-8.

The vehicular system of the control apparatus of the technological concept 3-9 includes a radar sensor (32) and a camera (34). The control program instructions cause the processor to determine whether a ground speed of the obstacle having the collision possibility is more than or equal to a predetermined threshold speed upon determination that the obstacle having the collision possibility is detected by only the radar sensor. The control program instructions cause the processor to determine to instruct the notification system to issue the notification related to the collision possibility upon determination that the ground speed of the obstacle having the collision possibility is more than or equal to the predetermined threshold speed.

The control program instructions cause the processor to determine, upon determination that the ground speed of the obstacle having the collision possibility is more than or equal to the predetermined threshold speed, to instruct the vehicle motion control system to issue the notification related to the collision possibility upon determination that no collision-avoidance operations have been carried out by the at least one occupant since the issuance of the notification related to the collision possibility.

[Technological Concept 3-10]

The technological concept 3-10 depends from the technological concept 3-9.

The control program instructions of the processor program product of the technological concept 3-10 cause the processor to determine to instruct the notification system to issue the notification related to the collision possibility while causing the processor to determine not to instruct the vehicle motion control system to execute the collision-avoidance assistance operation upon determination that the ground speed of the obstacle having the collision possibility is less than the predetermined threshold speed.

[Technological Concept 3-11]

The technological concept 3-11 depends from any one of the technological concepts 3-9 and 3-10.

The control program instructions of the processor program product of the technological concept 3-11 cause the processor to delay first timing of executing the collision-avoidance assistance operation in a first case where the obstacle having the collision possibility is detected by only the radar sensor as compared with second timing of executing the collision-avoidance assistance operation in a second case where the obstacle having the collision possibility is detected by both the radar sensor and the camera.

[Technological Concept 4]

A processor-readable non-transitory storage medium is configured to store the control program instructions of any one of the technological concepts 3-1 to 3-11.

[Technological Concept 5]

A vehicular system (1) installed in a vehicle is configured to (I) Detect an obstacle located in a traveling course of the vehicle (II) Determine whether the obstacle has a collision possibility that the obstacle is likely to collide with the vehicle (III) Determine, in response to determination that the obstacle has the collision possibility, to issue, to at least one occupant of the vehicle, a notification related to the collision possibility with the obstacle in at least one of a visible format and an audible format (IV) Determine whether at least one collision-avoidance operation has been carried out by the at least one occupant since an issuance of the notification related to the collision possibility (V) Determine not to instruct a vehicle motion control system installed in the vehicular system to execute a collision-avoidance assistance operation upon determination that (i) no collision-avoidance operations have been carried out by the at least one occupant since the issuance of the notification related to the collision possibility, and (ii) the obstacle having the collision possibility is a low-height object (B31), the low-height object being defined as an object that has fallen on a road and has a height that is sufficiently low that the vehicle is enabled to pass over the obstacle.

[Technological Concept 6]

A vehicular system (1) installed in a vehicle is configured to (I) Detect an obstacle located in a traveling course of the vehicle (II) Determine whether the obstacle has a collision possibility that the obstacle is likely to collide with the vehicle (III) Determine, in response to determination that the obstacle has the collision possibility, to issue, to at least one occupant of the vehicle, a notification related to the collision possibility with the obstacle in at least one of a visible format and an audible format (IV) Determine whether at least one collision-avoidance operation has been carried out by the at least one occupant since an issuance of the notification related to the collision possibility (V) Determine to instruct a vehicle motion control system installed in the vehicular system to execute a collision-avoidance assistance operation upon determination that (i) at least one collision-avoidance operations has been carried out by the at least one occupant since the issuance of the notification related to the collision possibility, or (ii) the obstacle having the collision possibility is not a low-height object (B31), the low-height object being defined as an object that has fallen on a road and has a height that is sufficiently low that the vehicle is enabled to pass over the obstacle.

The invention claimed is:

1. A method of controlling a vehicular system installed in a vehicle, the method comprising:

detecting an obstacle located around the vehicle;

determining whether the obstacle has a collision possibility that the obstacle is likely to collide with the vehicle;

determining, in response to determination that the obstacle has the collision possibility, to instruct a notification system installed in the vehicular system to issue, to at least one occupant of the vehicle, a notification related to the collision possibility with the obstacle in at least one of a visible format and an audible format;

determining whether at least one collision-avoidance operation has been carried out by the at least one occupant since an issuance of the notification related to the collision possibility; and executing a collision-avoidance assistance determination of whether to instruct a vehicle motion control system installed in the vehicular system to execute a collision-avoidance assistance operation, the executing determining not to instruct the vehicle motion control system to execute the collision-avoidance assistance operation upon determination that:

(i) no collision-avoidance operations have been carried out by the at least one occupant since the issuance of the notification related to the collision possibility; and (ii) the obstacle having the collision possibility is a low-height object, the low-height object being defined as an object that has fallen on a road and has a height that is sufficiently low that the vehicle is enabled to pass over the obstacle, wherein the method further comprises:

determining whether the obstacle having the collision possibility is the low-height object by determining whether a height of the obstacle being likely to collide with the vehicle is greater than or equal to a first threshold height and smaller than or equal to a second threshold height that is greater than the first threshold height, wherein the determining whether the obstacle having the collision possibility is the low-height object determines that the obstacle having the collision possibility is the low-height object upon determination that the height of the obstacle having the collision possibility is greater than or equal to the first threshold height and smaller than or equal to the second threshold height.

2. The method according to claim 1, further comprising:

determining whether the obstacle having the collision possibility is the low-height object upon determination that no collision-avoidance operations have been carried out by the at least one occupant for a predetermined period since the issuance of the notification related to the collision possibility.

3. The method according to claim 1, further comprising:

calculating a time left until the vehicle and the obstacle having the collision possibility will collide with each other; and determining whether the obstacle having the collision possibility is the low-height object upon determination that:

the calculated time is within a predetermined first period; and no collision-avoidance operations have been carried out by the at least one occupant for a predetermined second period.

4. The method according to claim 1, wherein:

the executing determines to instruct the vehicle motion control system to execute a brake assistance operation as the collision-avoidance assistance operation upon determination that a brake operation as the collision-avoidance operations has been carried out by the at least one occupant since the issuance of the notification related to the collision possibility.

5. The method according to claim 1, wherein:

the executing determines to instruct the vehicle motion control system to execute the collision-avoidance assistance operation upon determination that the obstacle having the collision possibility is not the low-height object.

6. The method according to claim 1, wherein:

the executing determines:

(i) not to instruct the vehicle motion control system to execute the collision-avoidance assistance operation upon determination that the height of the obstacle having the collision possibility is smaller than the first threshold height; and (ii) to instruct the vehicle motion control system to execute the collision-avoidance assistance operation upon determination that the height of the obstacle having the collision possibility is greater than the second threshold height.

7. The method according to claim 1, wherein:

the executing changes the notification related to the collision possibility in accordance with which of predetermined types the obstacle having the collision possibility has.

8. The method according to claim 1, wherein:

the vehicular system includes a radar sensor and a camera; and the method further comprising:

determining whether a ground speed of the obstacle having the collision possibility is more than or equal to a predetermined threshold speed upon determination that the obstacle having the collision possibility is detected by only the radar sensor, and wherein:

the determining to instruct the notification system instructs the notification system to issue the notification related to the collision possibility upon determination that the ground speed of the obstacle having the collision possibility is more than or equal to the predetermined threshold speed; and the executing determines, upon determination that the ground speed of the obstacle having the collision possibility is more than or equal to the predetermined threshold speed, to instruct the notification system to issue the notification related to the collision possibility upon determination that no collision-avoidance operations have been carried out by the at least one occupant since the issuance of the notification related to the collision possibility.

9. The method according to claim 8, wherein:

the executing determines to instruct the notification system to issue the notification related to the collision possibility while the executing determines not to instruct the vehicle motion control system to execute the collision-avoidance assistance operation upon determination that the ground speed of the obstacle having the collision possibility is less than the predetermined threshold speed.

10. The method according to claim 8, wherein:

the executing delays first timing of executing the collision-avoidance assistance operation in a first case where the obstacle having the collision possibility is detected by only the radar sensor as compared with second timing of executing the collision-avoidance assistance operation in a second case where the obstacle having the collision possibility is detected by both the radar sensor and the camera.

11. A non-transitory storage medium readable by a processor for controlling a vehicular system installed in a vehicle, the non-transitory storage medium comprising control program instructions that cause the processor to:

detect an obstacle located around the vehicle;

determine whether the obstacle has a collision possibility that the obstacle is likely to collide with the vehicle;

determine, in response to determination that the obstacle has the collision possibility, to instruct a notification system installed in the vehicular system to issue, to at least one occupant of the vehicle, a notification related to the collision possibility with the obstacle in at least one of a visible format and an audible format;

determine whether at least one collision-avoidance operation has been carried out by the at least one occupant since an issuance of the notification related to the collision possibility; and determine not to instruct a vehicle motion control system installed in the vehicular system to execute a collision-avoidance assistance operation upon determination that:

(i) no collision-avoidance operations have been carried out by the at least one occupant since the issuance of the notification related to the collision possibility; and (ii) the obstacle having the collision possibility is a low-height object, the low-height object being defined as an object that has fallen on a road and has a height that is sufficiently low that the vehicle is enabled to pass over the obstacle, wherein the control program instructions further cause the processor to:

determine whether the obstacle having the collision possibility is the low-height object by determining whether a height of the obstacle being likely to collide with the vehicle is greater than or equal to a first threshold height and smaller than or equal to a second threshold height that is greater than the first threshold height, wherein the determining whether the obstacle having the collision possibility is the low-height object determines that the obstacle having the collision possibility is the low-height object upon determination that the height of the obstacle having the collision possibility is greater than or equal to the first threshold height and smaller than or equal to the second threshold height.

12. A control apparatus for controlling a vehicular system installed in a vehicle, the control apparatus comprising:

a recognizing unit configured to recognize an obstacle located around the vehicle; and an operation determiner configured to:

determine whether the obstacle has a collision possibility that the obstacle is likely to collide with the vehicle;

determine, in response to determination that the obstacle is likely to collide with the vehicle, to instruct a notification system installed in the vehicular system to issue, to at least one occupant of the vehicle, a notification related to the collision possibility with the obstacle in at least one of a visible format and an audible format;

determine whether at least one collision-avoidance operation has been carried out by the at least one occupant since an issuance of the notification related to the collision possibility; and determine not to instruct a vehicle motion control system to execute a collision-avoidance assistance operation upon determination that:

(i) no collision-avoidance operations have been carried out by the at least one occupant since the issuance of the notification related to the collision possibility; and (ii) the obstacle having the collision possibility is a low-height object, the low-height object being defined as an object that has fallen on a road and has a height that is sufficiently low that the vehicle is enabled to pass over the obstacle, wherein the operation determiner is further configured to:

determine whether the obstacle having the collision possibility is the low-height object by determining whether a height of the obstacle being likely to collide with the vehicle is greater than or equal to a first threshold height and smaller than or equal to a second threshold height that is greater than the first threshold height, wherein the determining whether the obstacle having the collision possibility is the low-height object determines that the obstacle having the collision possibility is the low-height object upon determination that the height of the obstacle having the collision possibility is greater than or equal to the first threshold height and smaller than or equal to the second threshold height.

* * * * *